United States Patent [19]

Carbrey

[11] 4,387,458

[45] Jun. 7, 1983

[54] HIGH CAPACITY SECURE ADDRESS LOOP NETWORK

[75] Inventor: Robert L. Carbrey, Boulder, Colo.

[73] Assignee: Bell Telephone Laboratories, Incorporated, Murray Hill, N.J.

[21] Appl. No.: 268,123

[22] Filed: May 28, 1981

[51] Int. Cl.³ .......................... H04J 6/02; G08B 5/00; H04L 5/14

[52] U.S. Cl. ........................................ 370/88; 370/86

[58] Field of Search ........................ 370/86, 88, 92, 94

[56] References Cited

U.S. PATENT DOCUMENTS

| Re. 28,811 | 5/1976 | Pierce | 370/88 |
|---|---|---|---|
| 3,597,549 | 8/1971 | Farmer et al. | 370/88 |
| 3,943,283 | 3/1976 | Caragliano et al. | 370/86 |
| 4,287,592 | 9/1981 | Paulish et al. | 370/88 |

OTHER PUBLICATIONS

IEEE Transactions on Computers, vol. C-29, No. 5, May 1980, pp. 385-392, "Simulation of a Class of Ring-Structured Networks".

2nd Annual Symposium on Computer Architecture, Sponsored by IEEE Computer Society & Assoc. for Computing Machinery, Jan. 20-22, 1975, pp. 7-12, "A Loop Network for Simultaneous Transmission of Variable Length Messages".

21st IEEE Computer Society International Conference Proceedings, Sep. 23-25, 1980, pp. 179-184, "A Fail--Soft Distributed Processing System".

Primary Examiner—Thomas A. Robinson
Attorney, Agent, or Firm—H. R. Popper

[57] ABSTRACT

A loop network is disclosed in which the ports have access to time slots on each of two buses. The buses carry the time slots in opposite directions. Ports are addressed by marking a bit of a time slot word on one bus and a bit of a time slot word on the other bus so that the two marked bits will arrive within a predetermined number of bit intervals of each other at the addressed port. Time slots are seized by an upstream port writing a predetermined pattern into an arriving idle time slot and by the downstream port recognizing the arrival of that predetermined pattern. A time slot may be reused during the remainder of its passage around the loop after it is rendered idle by the downstream port of a connection.

39 Claims, 29 Drawing Figures

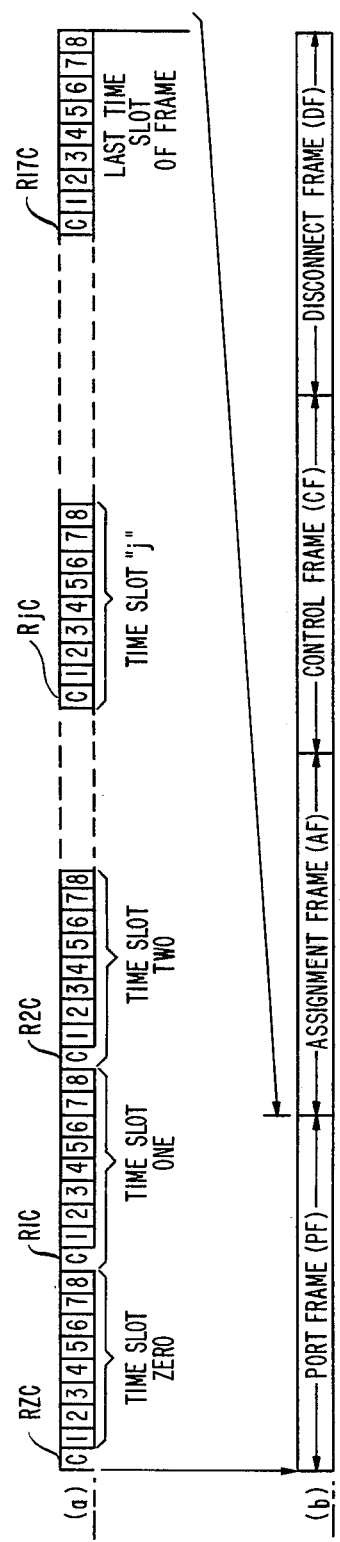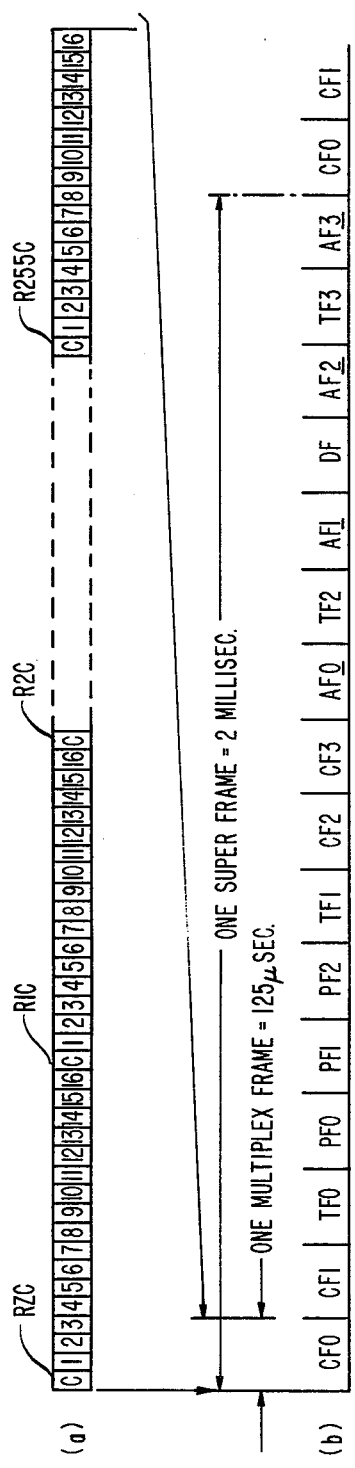

FIG. 13 (TRANSFER DELAY DUE TO SLOT 0 OR SLOT 1 OVERLAP)

| FIG. 17 | FIG. 18 |
| --- | --- |
| FIG. 19 | |
| FIG. 20 | |
| FIG. 21 | FIG. 22 |
| FIG. 23 | |

| FIG. 26 | FIG. 27 | FIG. 28 |

HIGH CAPACITY SECURE ADDRESS LOOP NETWORK

TECHNICAL FIELD

This invention relates to time division switching systems, and more particularly to networks which may be arranged in the form of a loop in which the time slots, rather than being instantaneously defined so that they are simultaneously present at all ports, are suitably delayed so that they make successive appearances at each of the ports.

BACKGROUND OF THE INVENTION

A loop network consists of a high speed digital communication channel to which processors, peripherals, or terminals are attached through interfaces called ports. Messages, in these known systems, are sent from a source port in the form of addressed blocks of data that travel around the loop from interface to interface until picked-off by the destination port. It is a characteristic of the serial loop network that any port need serve as a driver for only the next port in the loop and is therefore not troubled with the time required to charge the distributed capacity of all of the open port switches of the network as in the common bus type of time division network.

Heretofore various serial loop arrangements have been proposed. Among the more well-known loop networks are the so-called Newhall loop, disclosed in U.S. Pat. No. 3,597,549, issued Aug. 3, 1971, and the so-called Pierce loop shown in U.S. Pat. No. 28,811, of May 11, 1976. Other types of loop networks are described in the article, "Simulation in a Class of Ring Structured Networks", *Institute of Electrical and Electronics Engineers Transactions on Computers* Vol. C-29, May 1980, pages 385-392.

The so-called Newhall loop has been described as a system in which a "control token" circulates around the loop and allows only one port at a time to transmit an arbitrary length message through the loop while the rest of the ports wait. This structure has the disadvantage that the queueing times of the ports are cumulative but each port is permitted to transmit a message which is fairly unrestricted as to length. The Pierce loop improves network line utilization through the use of fixed length time slots and allows each port to place a message "packet" into the first available time slot. A bit in the control field of each time slot specifies if that time slot is busy or idle. The Pierce loop has the advantage of allowing the use of different portions of the loop for the simultaneous transmission of different one-way messages. However, if two ports (a and b) on the Pierce loop are to be permitted to communicate fully, a time slot must be assigned for exclusive use by these two ports alone, and the time slot must then traverse the entire loop. Thus, even if the ports are adjacent to each other on the loop so that one part of the connection (a to b) involves only a single bit delay, the other part of the connection (b to a) takes the remainder of the frame interval. It would be of some advantage to increase the switching capacity (the ratio of effectively available time slots to ports) of the Pierce loop. It should be appreciated that, in a Pierce loop, in order for a port to be able to exchange its coded signal for the one being received in the time slot going around the loop, the loop delay must be padded-out to to exactly equal a frame interval, or multiple thereof. It would be of some advantage if the degree pad-out of required could somehow be lessened.

Other forms of loop network architecture are known which employ variable length shift registers at each port interface to accommodate the transmission of variable length messages. The maximum length of an output message that can be transmitted at any moment is determined by the available space in the delay buffer as described, for example, in the article by Reams and Liu entitled, "A Loop Network for Simultaneous Transmission of Variable Length Messages" in the *Second Annual Symposium on Computer Architecture*, Jan. 20-22, 1975, sponsored jointly by the IEEE Computer Society and the Association for Computer Machinery.

All of the foregoing loop networks are based on the assumptions that an individual port in the loop can be defined by a discrete address, that some of the bits of each message packet are devoted to addressing, and that an addressed port (or its loop interface) can recognize its address in the transmitted bit stream so that it can pick off the appropriate message destined for it. These prior art systems therefore require the use of an address decoder at each port or port interface. When a port is first installed in such a loop network, its address decoder must be set to the unique combination that will distinguish that port from all other ports in the network. While the setting of such a decoder is a conceptually easy matter involving simply the use of switches, solder-point strapping, or plug-in devices, the procedure suffers from several drawbacks. First it is necessary to obtain physical possession of the decoder to make the actual setting. This may necessitate a field trip to the port location, and, of course, settable circuits are subject to unauthorized tampering. Secondly, even the use of a factory adjustment means that the decoder unit cannot be fabricated as a completely sealed integrated circuit. Lastly, such a decoder must be designed to recognize its address word from the bit stream at the information bit rate. It would be most advantageous if a loop network could be provided in which the transmitted bit stream did not require an "address-per-packet", in which no physical setting of address decoders had to be made at any of the ports of the loop, and in which address decoding was not susceptible to unauthorized tampering. Further, it would be advantageous to permit each port to obtain access to as many time slots as the bandwidth of its message required and thereby, in effect, achieve the prior art goal of permitting variable length message transmission without undue complexity.

A question that must be answered in the design of a loop network employing assignable time slots is how does the system actually find and assign a time slot which is available over the span between the ports to be connected together. A system connection map could be maintained, and the common control (CC) could then search that map until a suitable time slot was found which it would then assign by addressing each port in the selected time slot. The complexity of a map which allows an indeterminate number of connections to be assigned to a given time slot makes this a rather cumbersome process as well as requiring a lot of fast acting random access memory and processing time. Some significant amount of maintenance and signal verification effort must also be used to insure that the map and the network remain in agreement. Accordingly, it would be advantageous to provide a communications system in which common control was not required to maintain a time slot usage map.

SUMMARY OF THE INVENTION

The foregoing and other objects are achieved in one illustrative embodiment of my invention in which a plurality of port circuits are provided with access to each other and to a common control port via a pair of transmission line buses over which sequences of recurrent frames comprised of time slots each having a uniform number of bits are transmitted in opposite directions. The ports are physically located an integral number of bit positions (of delay) apart from each other on the loops. Advantageously, the ports may be located only one bit position apart, or any number greater than one.

So that a given time slot may be used for more than one connection, and thereby offer the the possibility of increased switching capacity, calls between ports are normally established so that the shortest distance transmission paths between the two ports are selected by the common control. For example, assuming that the ports at the "two o'clock" and "five o'clock" positions are to be connected, common control issues an "opcode" to the ports instructing that the port at the two 0'clock position should transmit on the clockwise bus and that the port at the five o'clock position should transmit on the counterclockwise bus. The port at the five o'clock position renders the time slot idle that was used for the call on the clockwise bus, and the port at the two o'clock position renders idle the time slot that was used on the counterclockwise bus.

The transmission line buses and ports function by typically including a one-bit shift register delay at each port so that a given port is always located a unique number of bit intervals distant from the common control port in each of the buses. The bit count distance in one direction from the common control point to a port via one bus is the complement of its distance to the same port in the other direction via the other bus. Since the port address depends on its loop position, the address cannot be falsified from any other positions on the loop.

Conceptually, a given port could be addressed from the common control by marking a single pulse or bit position on one bus and then marking one on the other so that the two pulses or marked bit positions would coincide only at the given port. To permit such a method of coincident pulse addressing to be used to address any port on the loop network would mean that each bit position comprising a complete frame of time slots would have to be available for addressing purposes with no possibility of using any of the bit positions of the frame for the transmission of intelligence. It is an aspect of the illustrative embodiment, however, to conserve bit capacity for data transmission purposes by restricting the marking of port addressing bits on the two buses to only a predetermined (advantageously, the first) bit (hereinafter called the C-bit) of the time slots. According to this aspect, the position of a port on the loop, and hence its address, is defined in terms of the whole number of time slot intervals that the port is distant from common control plus the remaining number of bit intervals not exceeding a time slot's span.

The implementation of this mode of addressing is advantageously accomplished by using two different kinds of frames of time slots. During one of these frames, called the Port Frame, common control gathers information about the location of a service-requesting port and during the other kind of frame, called the Control Frame, common control gains access to that port. During the Port Frame common control ascertains the number of time slot intervals that a service-requesting port is distant from common control and the port ascertains its bit interval distance within the time slot span (hereinafter called the port's Vernier Number). The port locally stores its Vernier Number and also furnishes it to common control by suitably encoding the ensuing C-bits of subsequent time slots. Advantageously, such a service-requesting port may also transmit further information about itself, such as class of service, customer identity, etc., as well as predialed information identifying the called port, the type of channel required on the particular call, etc.

During the Control Frame, common control may access a port by transmitting a marked C-bit on one bus and then delaying the marking of a C-bit on the other bus so that the two marked C-bits will arrive at the addressed port within a time slot's interval of each other. This means that those ports lying within the distance spanned by a time slot are alerted. The alerted ports then observe the ensuing pattern of C-bits sent by common control over the two buses and check the received sequences against each other and against their own previously stored Vernier Numbers. The port actually being accessed then decodes the C-bit lists including the opcode which identifies the buses to be used for transmission and reception. When common control accesses a called port during the Control Frame the called port, may either execute the opcode instruction if it is idle or return a busy-status indication to common control by encoding the returning stream of C-bits.

It is an aspect of the illustrative embodiment that the above-mentioned and other control functions may be performed without requiring the dedication of any specific number of time slots in any frame for such control functions and while permitting most if not all of the time slot of each frame to be used for transmitting digital signals representing intelligence among the ports. Illustrative frames called Port, Control, Assignment, Disconnect and Transfer frames are hereinafter described which permit, respectively, a service requesting port to gain access to common control, to permit common control to gain access to any port, to permit a port to seize an idle time slot and to facilitate the use of time slot bit capacity for data or encoded voice communications. The Port, Control, and Assignment frames advantageously differ from each other only in the manner in which the C-bits of the time slot words comprising these frames are employed.

It is a further aspect of the illustrative embodiment that time slot assignment is accomplished without using a central time slot assignment map. To assign a time slot for use between a pair of time slot requesting ports separated by one or more intervening ports, the upstream time slot requesting port on each bus tentatively marks each arriving idle time slot. If the marking is correctly received at the downstream time slot requesting port, it is seized for use. The identically numbered time slot is then seized on the other bus to establish two-way communication between the ports. If the marking is not received by the downstream port because, for example, the slot has previously been assigned to an intervening port, the upstream port continues to mark idle time slots until seizure by the downstream port has succeeded. Advantageously, a plurality of idle time slots may be marked and seized in this fashion to supply the bandwidth required for the particular communication.

BRIEF DESCRIPTION OF THE DRAWING

The foregoing and other objects and features of the invention are described in detail in the ensuring specification and drawing in which:

FIGS. 10 and 11 show two alternative arrangements of multiple frame sequences;

FIGS. 17–23 show the details of the common control port;

FIGS. 26–28 are to be arranged.

GENERAL DESCRIPTION—ADDRESSING IN THE BASIC COUNTER-ROTATING NETWORK

Figure 1:
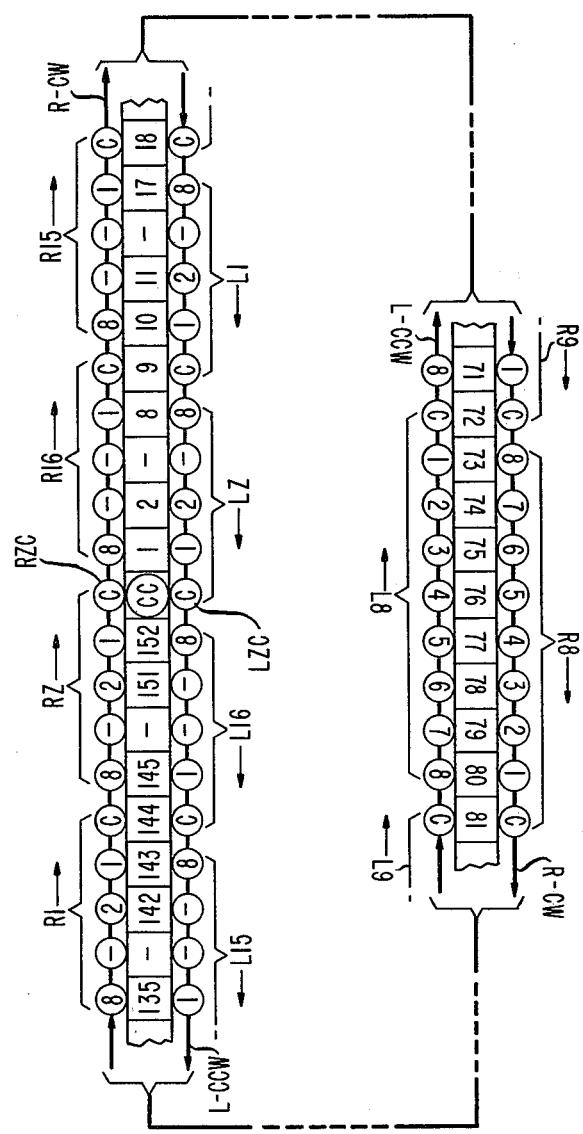
FIGS. 1, 2 and 3 are highly schematic illustrations of the loop switching system of the present invention.

FIG. 1 schematically represents a highly simplified loop network which will be used to introduce some of the concepts of the present invention. Let it be assumed that there are 152 ports disposed along two loops, R-CW (sometimes hereinafter called the R-loop or clockwise transmission line bus) and L-CCW (sometimes hereinafter called the L-loop or counterclockwise transmission line bus). The ports are represented by numbered rectangles 1–152. In addition, there is a common control port CC. Let it be assumed that each of the buses carries a frame of 17 time slots of 9 bits each. The bits of the 9-bit time slots are represented by circles repetitively numbered C, 1 through 8. The C-bit of each time slot is a control bit while bits 1–8 are used for voice or data communication purposes. The control bit should advantageously occupy the first bit position of the time slot to arrive at the ports. The next bit position of the time slot word should advantageously be the least significant bit of the data word to facilitate the serial addition of data words at the ports, as will hereinafter more fully be explained under the heading of "Conference Logic".

FIG. 10 at line (a) shows an illustrative sequence of seventeen of such simplified time slot words for the R-loop. Time slot zero begins with a C-bit labeled RZC and is followed by eight data bits. Time slot one begins with a C-bit labeled R1C followed by eight data bits. Likewise, time slot two begins with a C-bit labeled R2C, etc. An eight bit sequence is chosen because it provides sufficient bit positions for the "chord-law" encoding of analog voice samples. Of course, digital encoding may be employed for the transmission of either voice or data, as is well known.

The time slot bits of the network of FIG. 1 move along the buses in opposite directions and the transmission delay between ports is, for the sake of simplicity, assumed to be exactly one bit interval. Ports may actually be separated by any integral number of bit intervals so long as bit transmission and signaling are synchronized to the bit rate clock to account for the actual number of bit intervals required for the signal to travel to the adjacent port. It may be helpful if the configuration is thought of as being arranged to form a pair of closed loops with the ports 1–152 occupying the position of "railroad stations" situated between the tracks R-CW and L-CCW of a double track "railroad" along which the "trains" (pulses) run in opposite directions. To conserve space in the drawing, certain intermediate ports and certain of the intermediate bits of the time slots have been omitted.

Consider first bus R-CW, sometimes hereinafter called the "R-loop". At the instant of time depicted in FIG. 1, the C-bit RZC of the R-loop time slot zero (RZ) is at common control port CC, and the next two bits RZ1 and RZ2 of this time slot are at ports 152 and 151, respectively. On bus L-CCW, sometimes hereinafter called the "L-loop", the control bit LZC of time slot zero (LZ) is at common control port CC, and bits LZ1 and LZ2 of this time slot are at ports 1 and 2, respectively. Further, it will be observed that, quite coincidentally, a complete frame of 17 time slots is evenly distributed about the loop, one bit at each port. As will be explained shortly, the delay around the loop may quite as readily consist of any integral number of time slots, whether equal to the number of time slots in a frame, or not. Thus, unlike the above-mentioned prior art systems which require that the transit time around the loop be padded-out to equal a frame duration or a integral multiple of frame durations, the illustrative embodiment of my invention need only be padded-out an integral number of time slots.

A port requiring the establishment of a connection to another port and which initiates the connection process is termed the calling port. The other port is, of course, known as the called port. The establishment of a connection between ports requires the assistance of common control, CC. The calling port must signal its need for common control assistance at a time when the signal can be recognized by common control. In accordance with an aspect of this invention, a distinct frame called the Port Frame, hereinafter to be more fully described, is devoted to this purpose. Briefly, however, the Port Frame is one of a sequence of multiplex frames shown in line (b) of FIG. 10 each of which consists of the same number of time slots. In each time slot the eight data bits may be used for the digital transmission of intelligence while only the C-bits serve distinctive control functions. The C-bits of the Port Frame, for example, are used by a service requesting port to get the attention of the common control while the C-bits of the Control Frame are used by common control to access a port. The C-bits of idle time slots in the Assignment Frame, hereinafter to be more fully described, are used in connection with an idle bit pattern inserted into the data bit positions of these time slots to permit the reassignment of such time slots to time slot requesting ports without the need to employ a network map.

When a port wants to indicate a request for central control action, it must wait until the start of the Port Frame arrives at the port. The arrival of a frame at a port is ascertained by the port counting bits, time slots and frames until the count indicates that the first or C-bit of the zeroth time slot of the frame is present. The C-bit of the zeroth time slot of any frame is called the RZC bit. The convention is adopted according to which the arrival of a seizable (idle) Port Frame at a port is indicated by a zero state RZC bit. As the Port Frame is originated at the common control port CC, the C-bits of the zero time slot and of all ensuing time slots of this frame on both the R-loop and the L-loop are sent out as zero. Every port which is trying to get the attention of common control CC writes the RZC of the Port Frame as one as it goes by. (RZC>1). The one state of RZC is repeated in passing through a port if the Port Frame has already been seized by a port further "upstream" on the R-loop.

Figure 4:
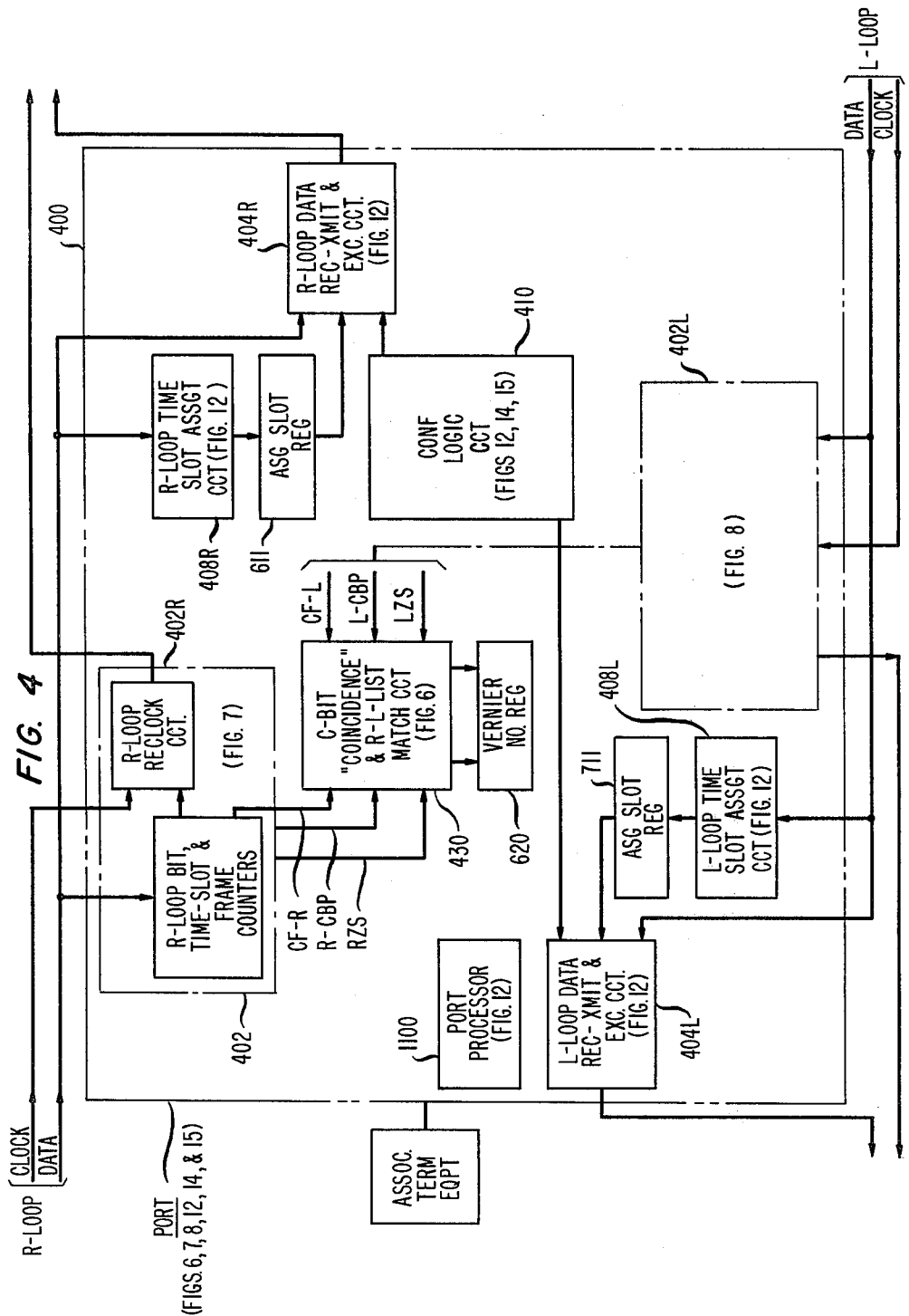
FIG. 4 is a block diagram of a typical port.

A block diagram of the typical port 400 of the illustrative embodiment is shown in FIG. 4. The R-loop clock and data bus leads appear at the top of the figure and the L-loop clock and data leads appear at the bottom. Port 400 comprises a number of individual circuits which are shown in detail in FIGS. 6, 7, 8, 12, 14 and 15 the operations of which are under the control of the port processor 1100. Port 400 selectively transfers intelligence in the form of digitally encoded data voice or other analog communications between associated terminal equipment 401 and the R-loop and L-loop data buses. Logic circuitry 402R under control of clock pulses supplied over the R-loop clock bus counts-off time slots and identifies the RZC bit at the start of the Port Frame. C-bit logic circuit 430 recognizes whether the port has changed the RZC bit from zero to one. If the RZC bit arrives at Port 400 as a one (RZC<1), the port must wait until the next Port Frame in order to try again. If RZC arrived as a zero (RZC<0), C-bit logic circuit 430 controls R-loop data receiver-transmitter and exchange circuit 404R to change RZC to a one (RZC>1) in order to prevent subsequent siezure by some other port. Accordingly, the first service-requesting port to receive RZC as a zero during the Port Frame is the one that is able to seize common control.

During the Port Frame a service requesting port dynamically ascertains that part of the port's equipment location designation, which will be known hereinafter as its Vernier Number. The port ascertains its Vernier Number by counting the bit intervals occurring between the arrival of the RZC bit on the R-loop and the C-bit of the next time slot on the L-loop. C-bit logic circuit 403 in the service requesting port ascertains the ports Vernier Number and enters it into the ports Vernier Number register 620. In addition, C-bit logic circuit 403 encodes the Vernier Number into the C-bit stream returning to common control. Other information about the port such as its class of service, customer identity, etc., together with information about the type and identify of call now being made may be encoded in the remaining C-bits returning to common control. Note that, in accordance with my invention, the address decoder function is accomplished by equipping each port with a similar Vernier Number register 620 which is the same for all ports and which requires no custom alteration of circuit boards, "chip" fabrication on a per port basis or even the intervention of the network programmer.

Figure 5:
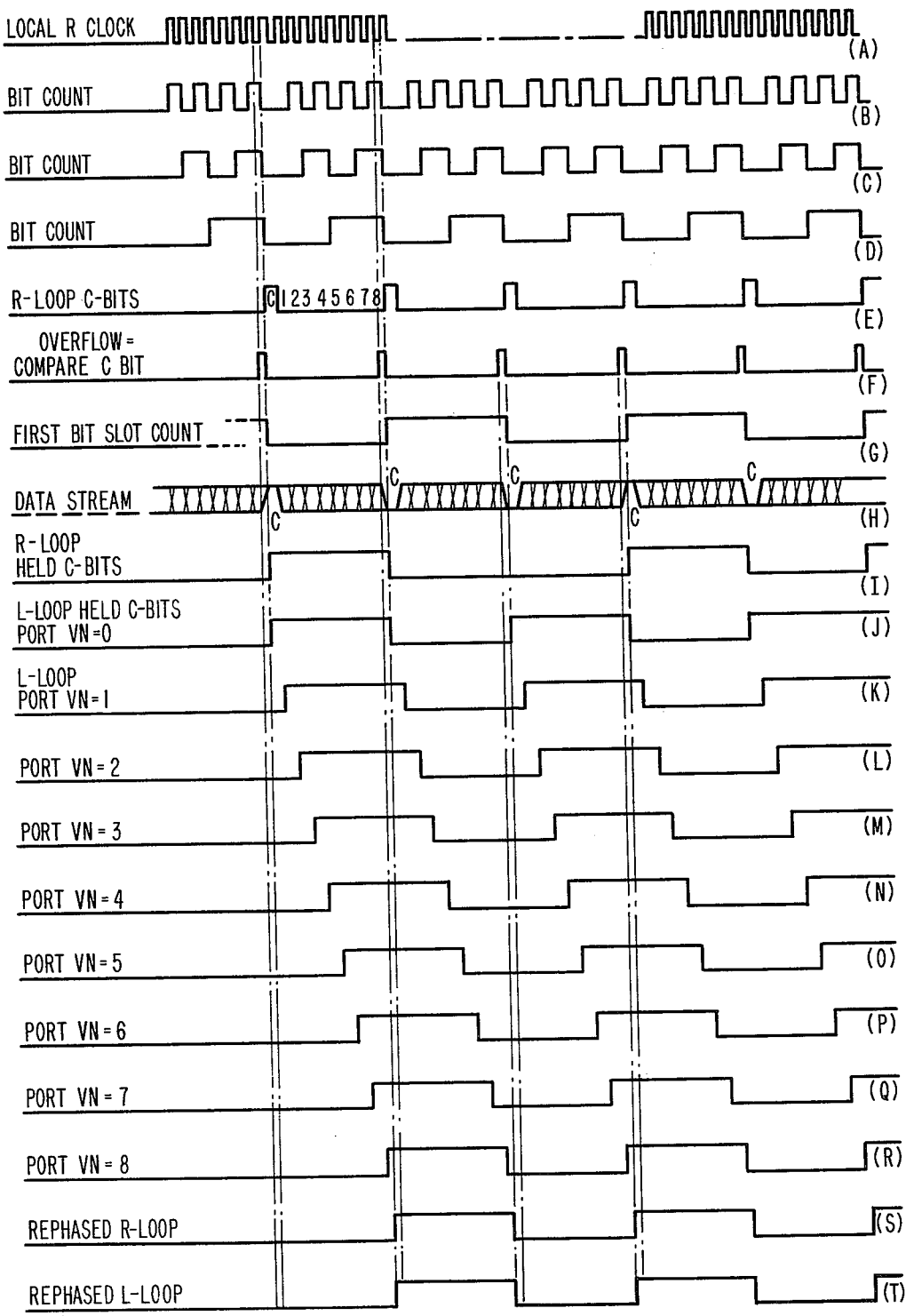
FIG. 5 shows the waveforms illustrating the different phases of the Vernier Numbers which identify the equipment locations of the ports on the switching loops of FIG. 2.

To identify to common control CC which of the ports has seized RZC during the Port Frame, C-bit logic circuit 403 in the seizing port will, after changing RZC from zero to one on the R-loop, write a one into the C-bit of the next time slot that arrives at the port on the L-loop. The C-bit of this L-loop time slot may arrive at any time (within the number of bit intervals of a time slot) after the arrival of RZC. Assume that the RZC-bit arrives over the R-loop as shown in waveform (E) of FIG. 5. To facilitate comparison of R-loop and L-loop C-bits, both C-bits may be stretched or held for an entire time slot interval as shown at waveforms (I) for the R-loop C-bit and at waveforms (J) through (R) for L-loop C-bits corresponding to ports having Vernier Numbers 0 through 8. Circuit 403 of the service requesting port counts the number of bit intervals between the arrivals of the RZC and LjC C-bit positions and enters that number in its Vernier Number register 620, FIG. 4. If, as shown in waveform (J), the C-bit arrives on the L-loop at the same time as RZC arrives on the R-loop, the writing of a one into the L-loop C-bit will be delayed until the start of the next time slot.

For example, assume that port 18 of FIG. 1 wants common control's attention and that RZC of the Port Frame is now located as shown in FIG. 1, i.e., at the common control port CC. Eighteen bit intervals after the time shown in FIG. 1, the R-loop zero slot control bit RZC will have moved to port 18 where it can be changed from zero to a one. At this moment, shown in FIG. 2, the RZC bit is present at port 18 on bus R-CW while, on bus L-CCW, the C-bit, L4C, of time slot L4 is present. C-bit logic circuit 403 (FIG. 4) of port 18, in response to the port's service-requesting state, changes the state of the RZC bit from zero to one but, due to logic and propagation delays, may not have enough time both to verify that the arriving RZC was a zero and also to write L4C as a one. Accordingly, writing in the L-loop must be delayed from one to (as in this example) 9 bits until the arrival at port 18 of the next time slot's C-bit, i.e., the control bit, L5C, of time slot L5. The number of bit intervals elapsing between the arrival of RZC at the port and the arrival of the next time slot's C-bit on the L-loop is the port's "Vernier Number", VN.

Figure 2:
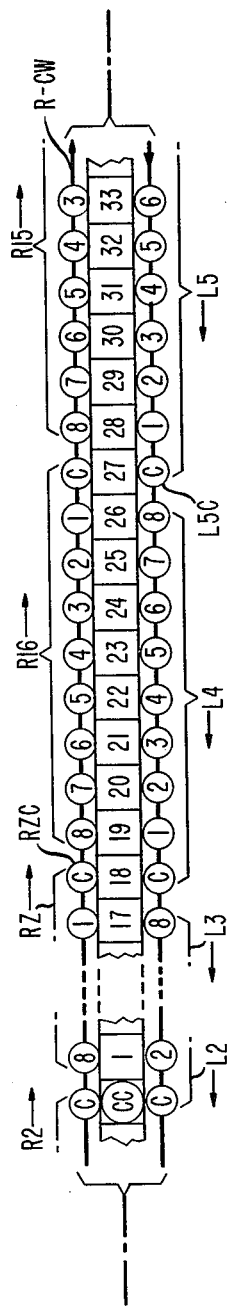

It should be noted that port 27, FIG. 2 which is further "downstream" on the R-loop and which may happen also to be off-hook and in the service-requesting state, cannot mark a C-bit on the L-loop because its logic has not changed the arriving RZC bit from zero to one. Port 27 will not be able to do so during the same Port Frame that port 18 does because port 18 is "upstream" of port 27 on the R-loop. It may also be observed that, in the instant example, where port 18 is the service-requesting port, the L5 time slot C-bit, L5C, will return to the common control port CC (over the L-loop) before the time slot zero control bit RZC arrives over the R-loop. This is because C-bit L5C has a much shorter distance to travel from port 18 to common control than does control bit RZC. In general, C-bits written in L-loop time slot words by service-requesting stations in the right-hand half of the loop, (i.e., those numbered 75 and below in the illustrative simplified case of a system having a total of only 152 ports) will always return to common control before C-bits that are written in R-loop time slot words by these ports.

The other part of a service requesting port's equipment location designation, hereinafter to be called the Arrival Number, is not ascertained by the port but is obtained by common control only upon the return to common control of the pair of marked C-bits that had been set to one during the Port Frame by the service requesting port. For example, a set C-bit which returns to common control over the L-loop before the RZC bit returns over the R-loop, indicates that the service-requesting port is located in the right-hand half of the R-loop. The difference in arrival times is measured in terms of the integral number of time slots (called the Arrival Number, AN), plus a number of bit intervals which is the same as the port's Vernier Number, VN. The Arrival Number can be either positive or negative. It is positive when the seizing port is in the right-hand half of the loop (as viewed from inside) so that the marked L-loop control bit arrives first at common control CC. The Arrival Number is negative when the seizing port is in the left-hand half of the loop so that the marked RZC bit arrives first at common control. Conversely, the sign of the Arrival Number determines which loop common control CC should mark first when addressing the port. The Arrival Number is employed by common control both to access a port by marking a suitable pair of C-bits on the two buses and to derive an opcode that designates to an accessed port the appropriate buses to be used for transmission and reception on a call to another port so as to utilize the shortest distance transmission path between the ports. Assignment of the shortest distance loop path between calling and called ports permits the time slot assigned for that purpose to be reused by other ports on the remainder of its journey around the loop.

The C-bits marked by CC on the two loops to access a port during the Control Frame will actually not exactly coincide at the addressed port but will arrive at the addressed port (and at several nonaddressed ports) a number of bit times of each other that does not exceed the number of bits in a time slot. The marked C-bit on each loop advances one port position per clock pulse. The net effect therefore is the same as if the marked C-bit on one loop remained fixed while the marked C-bit on the other loop advanced two port positions per bit interval. The marked C-bit on one loop side will pass the marked C-bit on the other side after half the number of bit intervals in a time slot. To absolutely identify the accessed port, the pair of marked C-bits must be followed by a sequence of C-bits which furnishes the Vernier Number of the port being accessed. Where the ports are located one bit interval apart from each other on each of the loops, and the time slots contain 9 bits, the number of ports so receiving the marked C-bits is as shown in waveforms (J) thru (R) of FIG. 5. Each of the port's C-bit logic circuits 403, shown in detail in FIG. 6, operates to detect whether the marked C-bits arrived within a time slot's interval of each other, whether the R-loop or L-loop marked C-bit arrive first, and the number of bit times between the arrival of RZC and LjC. Counts exceeding the number of bits in a time slot word mean that the port is outside the range being addressed.

Figure 3:
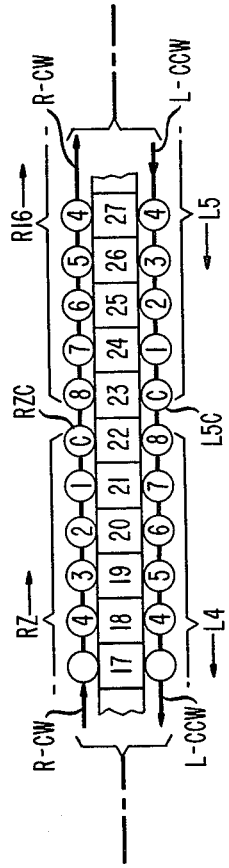

In the illustrative loop network of FIGS. 1-3, RZC will arrive at addressed port 18 before L5C but will also arrive at ports 19, 20, 21 and 22 before L5C. This can be seen to be so from FIG. 3 which shows the segment of the L-loop and of the R-loop in the vicinity of ports 17-27, four bit-times later than that shown in FIG. 2. When, as shown in FIG. 2, RZC is at port 18, L5C is at port 27. As RZC progresses sequentially to ports 19, 20, 21 and 22, L5C progresses sequentially to ports 26, 25, 24, and 23 until, as shown in FIG. 3, RZC has arrived at port 22 and L5C has arrived at port 23.

Depending on the number of time slots in a frame, after transmitting the Vernier Number, common control may employ the C-bit positions of the ensuing time slots of the Control Frame to transmit additional information to an accessed port. Such a C-bit list may contain such information as the aforementioned opcode and the accessed port may recode the C-bits to return to common control information relating to the status of its associated terminal equipment 401, as well as any other desirable types of control information such as the customer identity, etc. In the illustrative frames of FIG. 10 having only 17 time slots per frame there would only be 17 C-bits available during the Port Frame for such encoding. In the more complex embodiment, the circuitry for which is about to be described in detail, the illustrative multiplex frame consist of 256 time slots and, accordingly, there would be 256 C-bits available during each Port Frame for encoding such control information.

DETAILED DESCRIPTION-ADDRESSING

Figure 7:
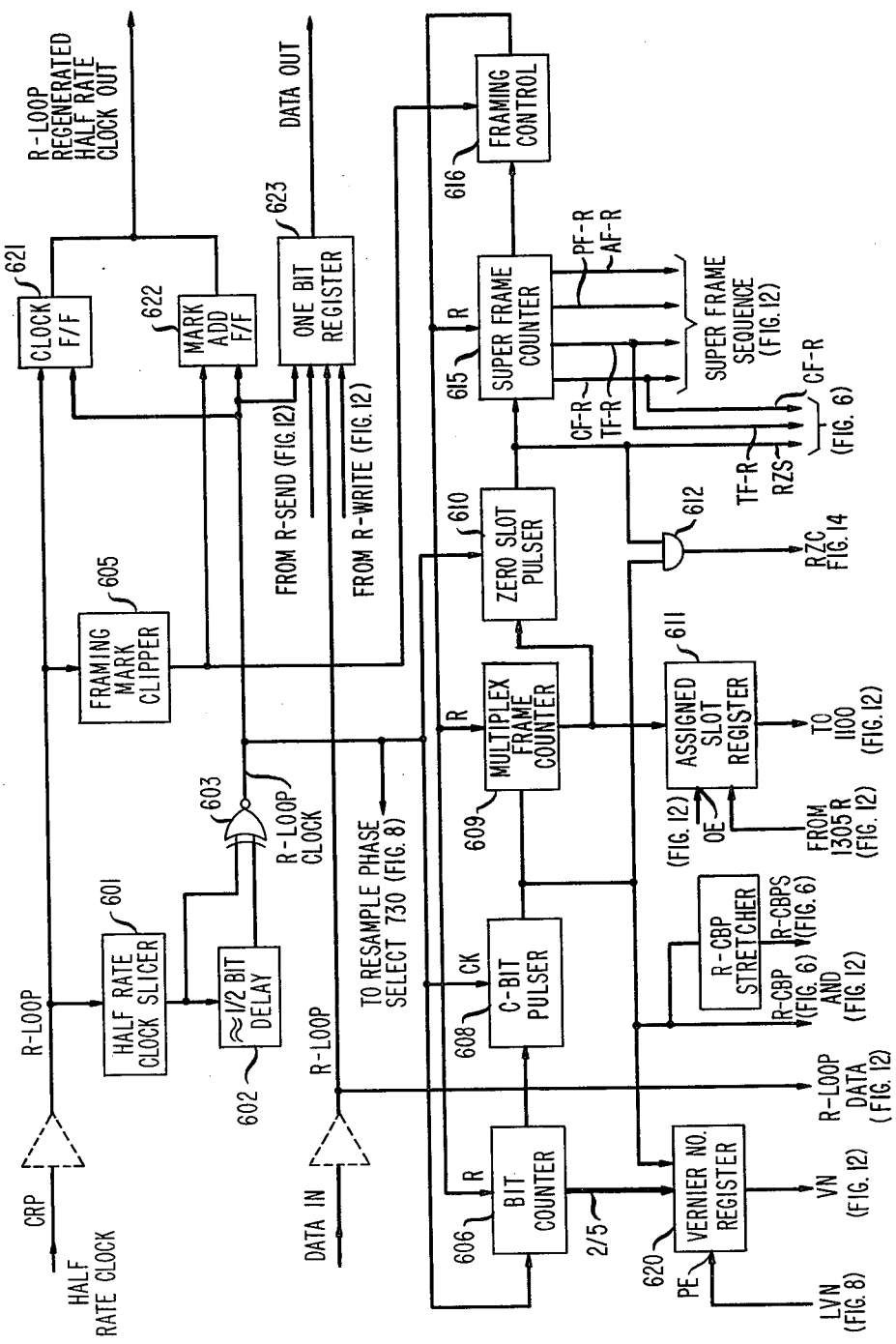
FIG. 7 shows the clock and repeater circuitry associated with the R-loop of a port.
Figure 8:
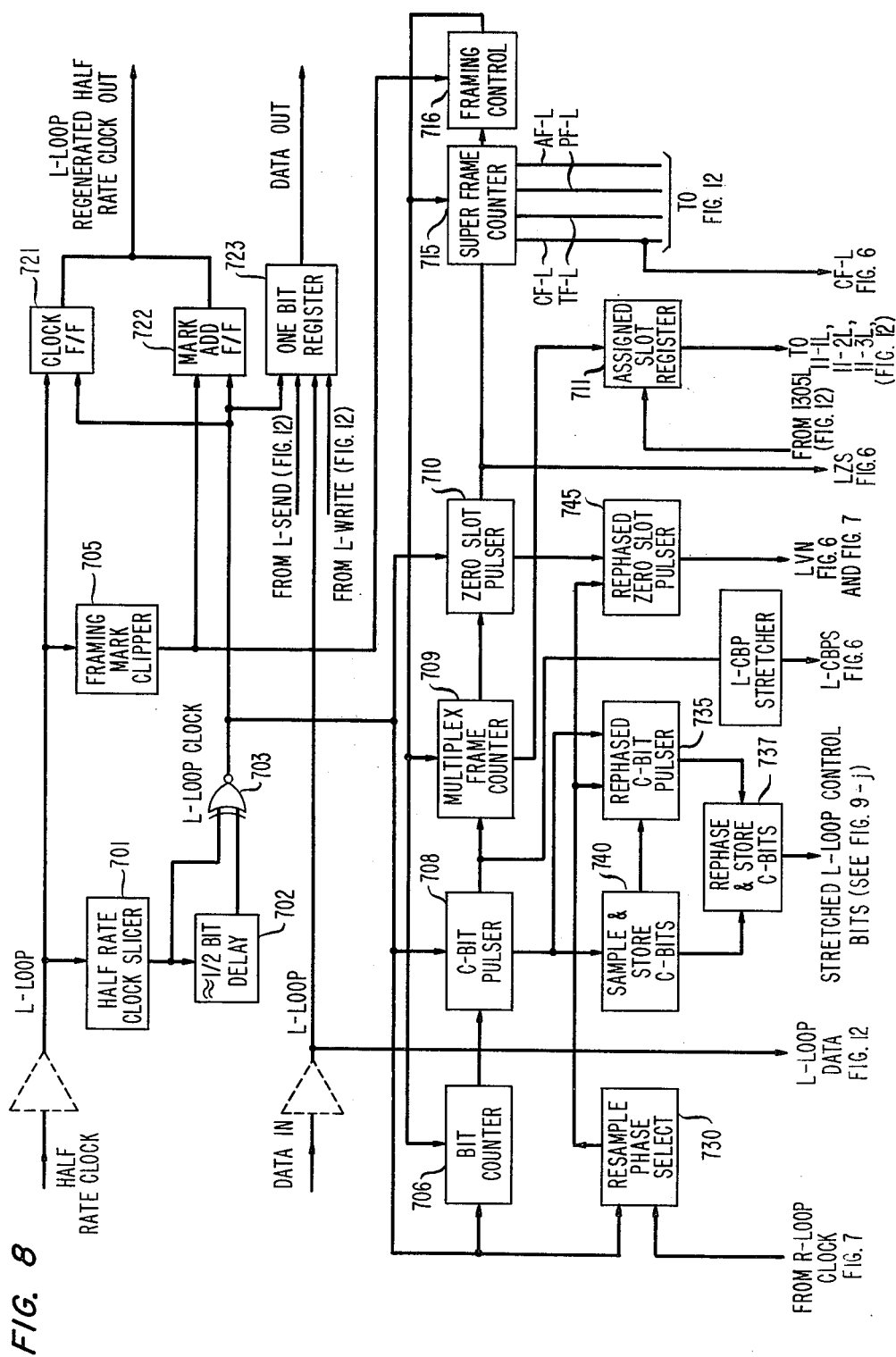
FIG. 8 shows the clock and repeater circuitry associated with the L-loop of a port.

Before describing the addressing function in detail, it will be well to describe the figures which explain the circuit functions generally depicted in FIG. 4. The first of these functions, that of the R-loop bit, time slot and frame counter circuitry 402R of FIG. 4 is shown in detail in FIG. 7. In order to forward the incoming bit stream on each loop to the next port and to inject data from its associated terminal at the appropriate time slot, each port must derive a bit rate clock and a framing signal from the loop signals. FIG. 7 shows the clock and repeater circuitry for the R-loop side while FIG. 8 shows the comparable circuitry for the L-loop side. For simplicity of design, the port-to-port transmission and repeater path for the clock and framing signal is separate from the data signal path. If both positive- and negative-going transitions of the signal on the clock path are employed to generate the local bit rate clock, the rate of the clock path signal on lead CRP need by only half that of the local bit rate clock. The half-bit-rate clock signal on lead CRP is converted to the bit rate clock by slicer 601, half-bit delay 602 and exclusive NOR-gate used at the port and the half-rate clock is transmitted onward. The half-rate clock signals are delayed by the same amount in flip-flop 621 as data bits are delayed in one bit register 623 in the data path. The framing mark modulation is also delayed so that each port has a distinctive time of arrival of the zero time slot.

The output of Exclusive NOR-gate 603 is applied to bit counter 606. After counting the numbers of bits in one time slot, bit counter 606 triggers C-bit pulser 608. C-bit pulser 608 provides an output with an "on" time of one bit interval that identifies the C-bit position of the time slot, as shown by waveforms (E) of FIG. 5 (for a 9-bit time slot) and at waveforms (g) and (n) of FIG. 9 (for a seventeen bit time slot). Multiplex frame counter 609 counts the number of C-bit pulses delivered by pulser 608 and, when a number of such pulses equal to the number of time slots in a frame has been accrued, counter 609 triggers zero slot pulser 610 whose output identifies the commencement of the time zero slot on the R-loop. The coincidence of outputs from the control bit pulser 608 and the zero slot pulser 610 activate AND-gate 612 whose output identifies the RZC pulse. Zero slot pulser 610 is triggered by framing mark clipper 605 which senses the higher amplitude clock pulse (not shown) on the clock path that marks the start of each new full set of control frames which are called a Super frame. The output of zero slot pulse 610 is the RZS pulse which persists for the duration of one time slot durng the zero time slot of each frame. Gate 612 generates the RZC pulse which persists for only the duration of a C-bit interval, the RZC signal at the start of each frame. The zero slot pulser advances super frame counter 615 which identifies the R-loop Control, Transfer, Port and Assignment Frame sequence. An illustrative super frame sequence is shown in FIG. 11.

Figure 6:
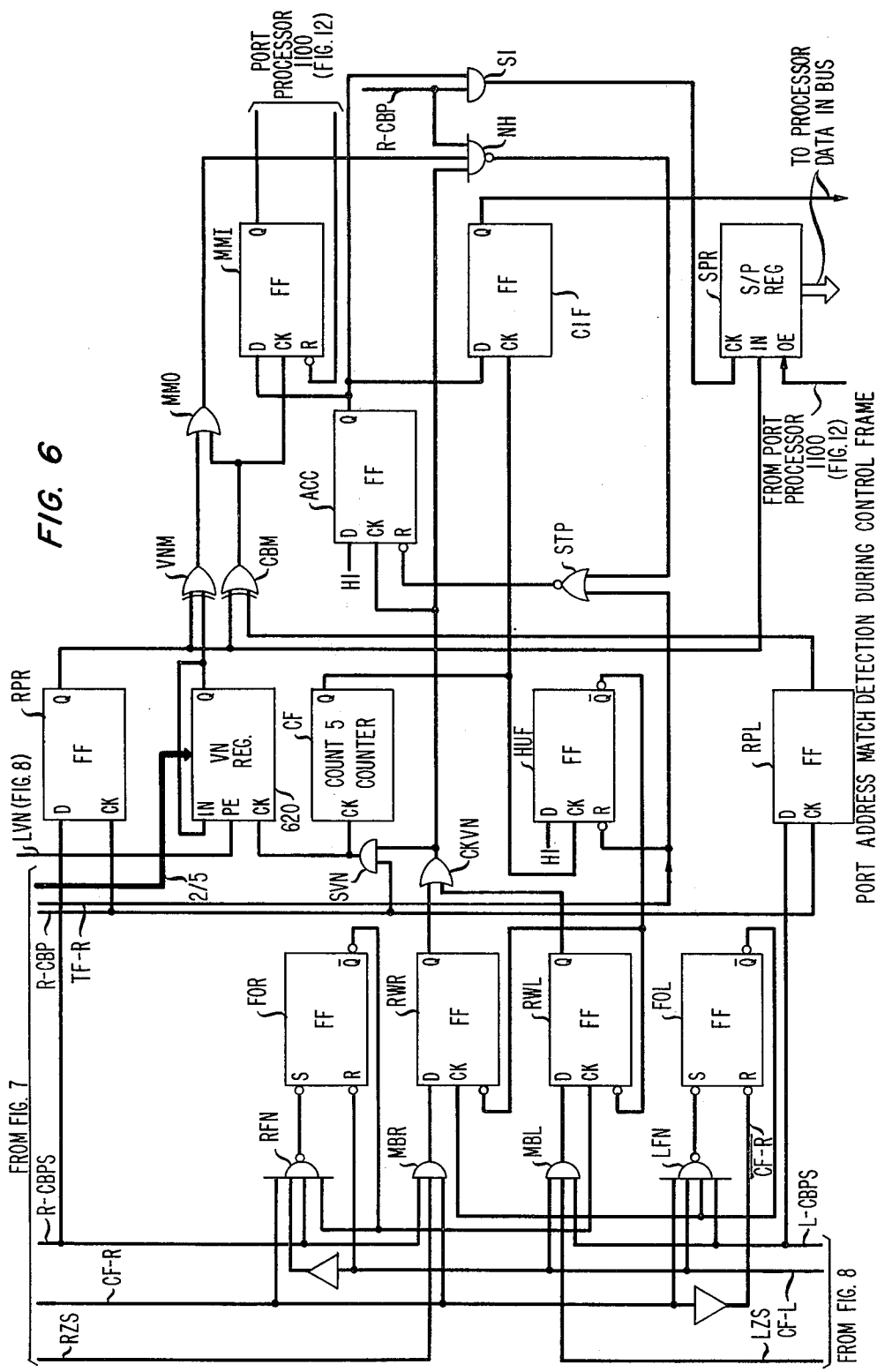
FIG. 6 shows that part of the circuitry for enabling a port to determine if it has been addressed.

It will be recalled that each port automatically stores its Vernier Number in its Vernier Number Register 620, shown in FIG. 4 (and repeated in FIGS. 6 and 7). As described hereinbefore, this number corresponds to the count of the R-loop bit counter 606 at the arrival of the C-bit on the L-loop. Although the Vernier Number does not frequently change, it is convenient to restore it in circuit 620 once per frame at the start of the L-loop zero slot pulse. The pulse from circuit 745 on lead LVN controls the storing of the Vernier Number in register 620 from R-loop bit rate counter 606 when that counter is in a stable state.

The local R-loop clock has arbitrarily been selected to control all operations at a port involving the comparison of bits from the two loops. The R-loop and the L-loop data bits are each held in a respective stretch flip-flop and these stretched bits are then resampled by one or the other of the two phases of the local R-loop clock. That phase is selected which is unlikely to overlap an L-loop data bit transition.

Figure 9:
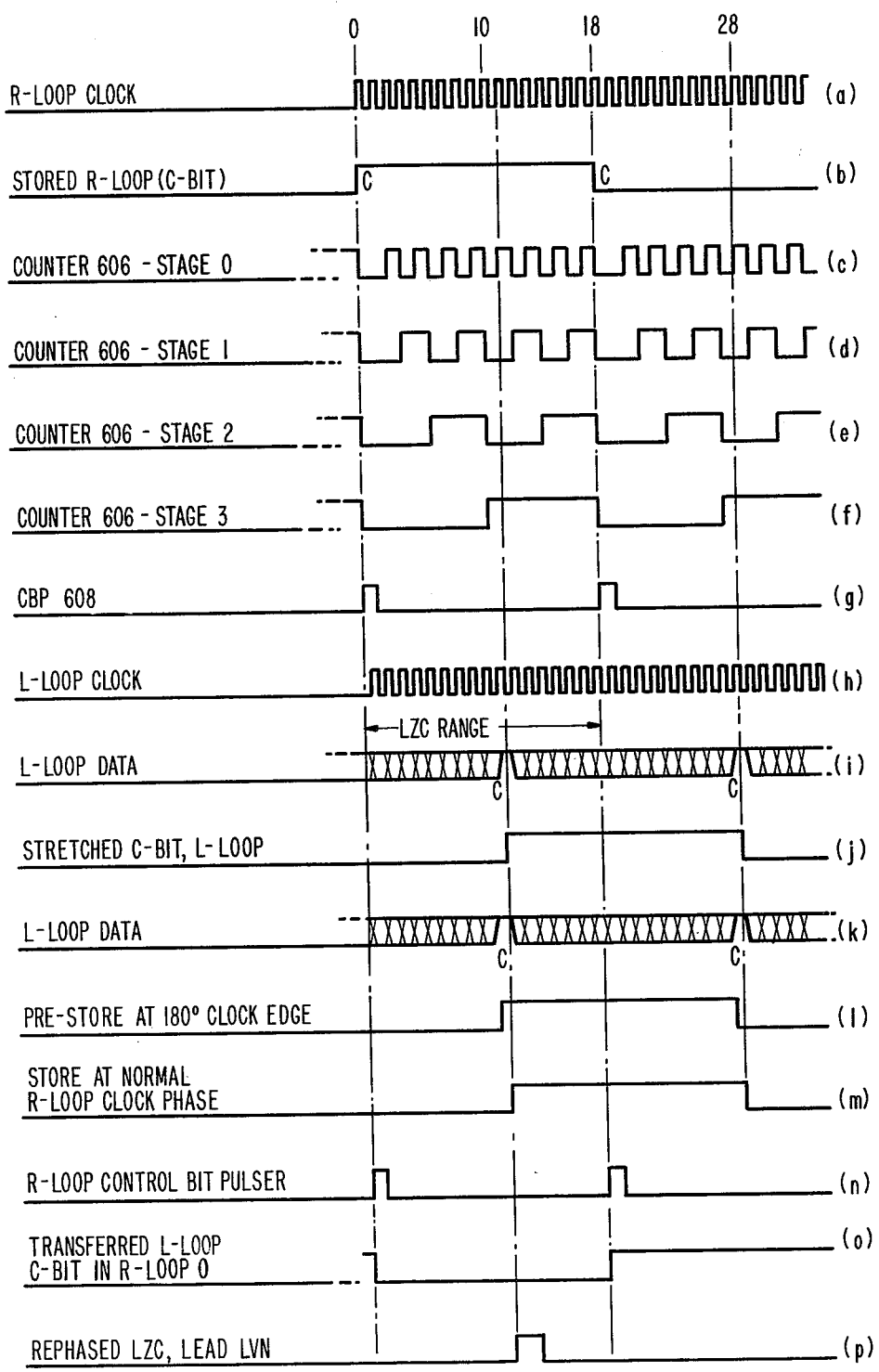
FIG. 9 shows the waveforms explaining the rephasing of the L-loop C-bits at a port to compensate for phase differences between the R-loop and L-loop clocks.

Waveform (a) of FIG. 9 shows the local R-loop bit rate clock. In FIG. 9, it is assumed that there are 17 bits to the time slot, a C-bit plus 16 data bits, rather than the 9-bit time slot which has heretofore been discussed with respect to the simplified loop network of FIGS. 1–3 and 5. Waveforms (c) through (f) represent stages of counter 606. The last stage of the counter identifies the appearance of the C-bit shown at waveform (g). (Waveform (g) is also sometimes hereinafter referred to as the control bit pulse, CBP.) Waveform (b) shows the C-bit stretched for the duration of an R-loop time slot. The L-loop clock at waveform (h) is shown at one of its possible phase relationships with respect to the R-loop clock of waveform (a). The phase relationship of the clocks depends on the propagation delay from the CC to the port as well as logic circuit delays. The C-bit pulse arriving over the L-loop is similarly stretched for a time slot interval as shown in waveform (j). It is useful to resample this stretched pulse (see waveforms l–o) at a known phase of the R-clock in order to permit the comparison of R-loop and L-loop C-bit patterns without the ambiguity which might occur if the L-loop change of state took place just as the decision timed by the R-loop was to be made. If one phase of the R-clock is in a doubtful location, the clock edge 180 degrees away would be well centered. The stretched C-bit shown at waveform (j) can be resampled at either the zero degree or 180 degree clock edge. This stores another stretched version of the L-loop C-bit as shown at either (m) or (l) respectively and permits proper timing of the logic operations under R-loop clock control without regard to the instant of arrival on the L-loop.

Circuitry for selecting either the normal R-loop clock pulse or its complement to allow gating of the L-loop data or timing pulses when the R-loop clock pulse is not undergoing a transition is shown in FIG. 8. In some cases, it may be useful to then delay the rephased L-loop states by another half period in order to bring them into the same phase as the R-loop normal clock cycle. Resample phase select circuit 730 generates a short pulse at one clocking edge and forces an opposite edge selection if a slightly delayed L-loop clock transition falls within the short pulse. Changes should be forced only when enough instances of overlap have occurred to insure against the possibility of a random error or noise. Details of circuitry 730 for guarding against pulse transition errors are well-known and are omitted from the drawing.

The unambiguous phase from circuit 730 is supplied both to the rephased C-bit pulser 735 and to the rephased zero slot pulser 745. L-loop C-bit pulser 708 causes the L-loop C-bits to be stored in sample & store C-bit circuit 740 (which includes a D-type flip-flop). The states appearing at the output of circuit 740 therefore occupy a full time slot interval except for transition times. The output of circuit 730 clocks the state of circuit 708 into circuit 735 at a time when a transition should not occur. The rephased control bit pulse from circuit 735 then controls rephase & store control bits circuit 737 to bring the stretched C-bit states to a phase which can be unambiguously controlled from the R-loop timing circuits.

The circuitry of FIG. 6 operates during the Control Frame to initially determine whether the zero slot C-bit on one loop and the C-bit on the other loop arrive at the port within one time slot (17 bits) of each other. (If the marked C-bits do not arrive within this interval the port has not been addressed.) Then the five subsequently arriving C-bits are matched against each other and against the Vernier Number previously stored in register 620 and, if the matches are successful, the ACCEPT flip-flop ACC is set so that the Vernier Number can be furnished to port processor 1100.

Let it be assumed that the Control Frame first arrives at the port over the R-loop. At the onset of the appearance of the R-loop Control Frame, the lower input of AND gate MBR, FIG. 6 is energized by an output of super frame counter 615, FIG. 7. The center input of gate MBR receives an enabling signal over lead RZS throughout the duration of the zero time slot from zero slot pulser 610, FIG. 7. The C-bit pulse on lead R-CBP from gate 708, FIG. 6 is stretched by a circuit (not shown) and is applied over lead R-CBPS at the upper input of gate MBR. Gate MBR is thereby enabled and its output applies a high signal to the D input of the R-loop Range Window flip-flop RWR. Flip-flop RWR will produce a high signal at its Q output if the C-bit pulse transmitted over the L-loop arrives at the port within the next 17-bit intervals, i.e., before lead RZS goes low. The marked C-bit arriving over the L-loop is stretched by circuit 737, FIG. 8, and is applied to the lower input of L-loop NAND gate LFN. This gate will be enable to apply a low input to set flip-flop FOL if flip-flop FOL has not yet been set, i.e., this is the first marked C-bit of the L-loop Control Frame to arrive at the port. When flip-flop FOL is set, its $\overline{Q}$ output goes low clocking R-loop Range Window flip-flop RWR. The high signal from the Q output of flip-flop RWR is passed by OR gate CKVN to AND gate SVN and to the clock input of flip-flop ACC.

As the next five C-bit signals arrive, the R-CBP pulses are applied to the clock input of Vernier Number register 620 and to rephase flip-flops RPR and RPL. The outputs of flip-flops RPR and RPL are compared with each other in X-OR gate CBM which produces a low (ineffective) input to mismatch OR gate MMO so long as the C-bit signals on the R-loop and L-loop agree. Each bit of the Vernier Number read out of Vernier Number register 620 in response to each signal applied to its clock terminal is compared in X-OR gate VNM with the output of rephase flip-flop RPR. Gate VNM applies a low input to gate MMO so long as the bits of the stored Vernier Number agrees with the bit arriving over the R-loop. If the C-bits mismatch, gate CBM signals an interrupt to the port microprocessor 1100, FIG. 12.

In addition to being applied to gates VNM and CBM, the R-loop C-bit stream defining the arriving Vernier Number and following list of C-bit data is enabled to be serially stored in serial/parallel register SPR so long as flip-flop ACC is enabled. This register will subsequently be enabled by port processor 1100 to transfer its contents to the processor in parallel fashion.

At the end of the 5-bit Vernier Number sequence, count five counter CF clocks both holdup flip-flop HUF and control interrupt flip-flop CIF. Clocking of flip-flop HUF resets range window flip-flops RWR and RWL. Clocking of flip-flop CIF notifies port processor 1100 that the Vernier Number has been successfully entered into register SPR. The signal on lead TF-R directly resets flip-flop HUF and resets flip-flop ACC via NOR gate STP. This prevents acceptance of any more C-bits until the port is again addressed. Flip-flop ACC is reset via NAND gate and NOR gate STP whenever a mismatch of the serially shifted output of the VN REG 620 does not match the first five arriving C-bits which comprise the Vernier Number sent by the CC.

Thus far, marking for "coincident" arrival at the addressed port has been described in terms of common control transmitting the R-loop C-bit "list" starting with the time zero slot C-bit, RZC, set to one and delaying the transmission of the C-bit list on the L-loop so that it will arrive at the addressed port in 37 coincidence" with the R-loop list. Until the moment of "coincidence", therefore, the addressed port should only receive all-zero C-bits on the L-loop. However, until LZC of the Control Frame arrives at the addressed port, the C-bits appearing at that port on the L-loop belong to the preceding frame. These C-bits must therefore be dedicated to such "all-zero" usage and, in the preferred embodiment, the Control Frame CF, FIG. 10, is subdivided into Control Frame pairs CF0, CF1, FIG. 11, (also CF2, CF3). Thus, if the port to be addressed is situated in the "first" half of the R-loop (in terms of the time taken by a C-bit dispatched by common control to reach the port), common control must not mark the RZC bit of CF0 as a one because it will reach the port before LZC of CF0. RZC of CF0 should be dispatched as a zero by common control and so should all subsequent C-bits of CF0 on the R-loop, until that time slot appears whose C-bit on the R-loop arrives within one time slot interval of the arrival of the marked LZC bit on the L-loop dining CF0 arrives at the port. The next C-bit of CF0 on the R-loop side to arrive at the addressed port should be a one, and the ensuing C-bits of CF0 may begin the list that encodes the Vernier Number and other status information. The same Vernier Number plus following C-bits lists are sent on both loops to permit checking for possible errors.

SELF-ASSIGNMENT OF TIME SLOTS—GENERAL

It was mentioned above that, in prior art time division switching systems, a system connection map is usually required in which the identity of each circuit and its assigned time slot is kept. When a connection is to be established, a search is made of the map until a suitable time slot is found. The ports to be connected are then assigned to this time slot by central control. While such an approach can, indeed, be used with a loop switching system, the complexity of a map that would allow for different pairs of (nonoverlapping) ports to use the same time slot makes this prior art memory map arrangement rather cumbersome as well as requiring a considerable amount of fast access random access memory and a large number of central processor operations. In accordance with an aspect of the present invention, therefore, the ports to be connected together are permitted to select their own time slot without recourse to any central memory map.

Before the time slot selection process is undertaken, it will be assumed that the calling port has obtained access to the common control during the Port Frame in order to transmit to it the called port's directory number. It is also assumed that during the Control Frame, common control will access the called port to ascertain its status and to transmit to it an opcode instructing it, if it is idle, on which bus to send and on which it is to receive once it has been assigned an idle time slot. Normally, the opcode will specify that the connection should be made over the shortest distance between the two ports. As has been mentioned, the correct bus to be used by a port for transmission and the bus to be used for reception is normally calculated by the common control port CC from the arrival numbers ANg, ANd of the calling and called ports so as to use the shortest loop path. When the ports between which a connection is to be established both have Arrival Numbers of the same sign, the port with the lower Arrival Number transmits on the R-loop. When the ports have Arrival Numbers of different sign, and the sum of the Arrival Numbers is positive, the port having the algebraically lower Arrival Number transmits on the R-loop. Mathematically, the Arrival Number multiplied by the number of bits per time slot must be equal to the loop length expressed in bit intervals less twice the distance of the seizing port from CC, less the Vernier Number, or:

$$AN \times S = B - 2P - VN,$$

where AN is the arrival difference expressed in integral time slots, S is the number of bits per time slot, B is the total loop length in bit intervals including propagation delay, P is the port distance from CC measured in bit intervals (assuming one bit transit time between actual or virtual ports), and VN is the Vernier Number.

In Table I below, the Arrival Numbers and Vernier Numbers for ports 2, 17, 145, 148, 80 and 73 of FIG. 1 are set forth as examples of employing the above equation. In the Table, it is assumed that port 2 is being called by port 17 on one occasion, and by port 145 on another. Then port 145 is assumed to call port 148. Thereafter, port 2 is assumed to call port 148, and finally port 173 is assumed to call port 80. The Arrival Number of the calling port is listed under the column headed ANg, and the Arrival Number of the called ports are listed under the column headed ANd. Similarly, the Vernier Numbers of the calling ports are listed in the column headed VNg, and the Vernier Numbers of the called ports are listed under the column headed VNd. In FIG. 1, a call between ports 2 and 17 should be connected so that port 2 transmits to port 17 over bus R-CW while port 17 transmits to port 2 over bus L-CCW. This connection achieves the shortest distance loop path between the ports. On a call between port 2 and 145, port 145 should transmit on bus R-CW and port 2 should transmit on bus L-CCW. In the previous example, the Arrival Numbers of ports 2, 17 and 145 are +16, +13, and −16, respectively. The use of Arrival Numbers and Vernier Numbers permits common control to determine the transmission directions for shortest loop span without performing multiplication and division operations.

should transmit on the R-loop for connections which do not cross the CC. The opcode "SORID": Search Open Right if IDle, is assigned to the called port when VNd is greater than VNg. When VNd is less than VNg, the opcode condition is called "SOLID": Search Open Left if IDle. A flow chart depicting these Common Control processes appears in FIGS. 26 and 27, to be hereinafter more fully described.

As an argument of the bus-selecting opcode, common control may also send each of the ports an Assignment Word (AW) which the port will store for use later on during the Assignment Frame. During the Assignment Frame the Assignment Word will be inserted by the upstream time-slot-requesting port in each on-coming idle time slot and will be recognized by the downstream time-slot requesting port.

Having determined the bus over which each port shall transmit to the other port, there remains but two additional procedures to adopt in order to facilitate the self-assignment of available time slots to time slot requesting ports. It was pointed out above that a given time slot need be taken for use only over that segment of the switching loop that connects the calling and called ports. Accordingly, that same time slot may be reused

TABLE I

| Port No. | ANd | VNd | Port No. | ANg | VNg | ANd-ANg Δ Value | Absolute | Δ > 17? | Cross CC? | ANd > ANg? | Opcode: Port to Send on R-loop |
|---|---|---|---|---|---|---|---|---|---|---|---|
| 2 | 16 | 5 | 17 | 13 | 2 | +3 | 3 | NO | NO | YES | 2 |
| 2 | 16 | 5 | 145 | −16 | 7 | 32 | 32 | YES | YES | YES | 145 |
| 148 | −16 | 1 | 145 | −16 | −7 | 0 | 0 | NO | NO | NO | 145 |
| 148 | −16 | 1 | 2 | 16 | 5 | −18 | 18 | YES | YES | NO | 148 |
| 80 | −1 | −2 | 73 | 0 | −7 | −1 | 1 | NO | NO | NO | 73 |

During the Control Frame, common control CC sends a pattern of C-bits defining the bus selecting opcode that will instruct each port as to the bus to be used for transmitting. It will sometimes be convenient hereinafter when considering the relationship of the ports to the two communications buses to refer to the side of a port transmitting control information over one of the buses as the "Open" or "upstream" side of that port and to the side of the other port receiving information over the same bus as the "Close" or "downstream" side of that port. If a connection does not cross the CC, the closest port to the CC on the R-loop is end-marked to Open on the R-loop. This port will be the one with the algebraically largest Arrival Number. The port closest to the CC on the L-loop is the one with the largest negative AN; so it is algebraically the smallest as defined here. The other port is end-marked to Open on the L-side. The situation is reversed if the connection crosses the CC. Then the closest port on the R-loop Opens on the L-side, and the other port Opens on the R-side.

The absolute value of the difference in Arrival Numbers is calculated to determine whether or not the connection crosses the CC. If the Arrival Number difference is not greater than the equivalent loop length in time slots, the connection will not cross the CC. This condition calls for the closest of the two ports on the R-loop to Open on the R-loop. Going clockwise from CC, the Arrival Numbers of ports on the R-loop decreases from the value B/S for the port adjacent to the CC through zero for the port opposite the CC, to -B/S at the last port. As a result, the port with a higher algebraic value of AN will be first on the R-loop. This port to transmit information between other, nonoverlapping pairs of ports. To put this into practice requires, first, that the downstream port of the connection on each bus return the used time slot to idle status. This is partly accomplished by the downstream port writing an Idle Word (IW) in the time slot which has just been used. Advantageously, the Idle Word comprises a zero C-bit followed by all-one bits in the data word. For example, when the port is acting so that it is a Close side port on the R-loop, R-loop time slot assignment circuit 408R operates to change to zero the C-bit of the time slot which had been in use.

The purpose of the downstream port injecting an Idle Word into the time slot is to prevent any data word that had been used over a particular communication span from inadvertently being passed on to some other port that is not part of the call connection. The use of an Idle Word thus provides a high degree of security to internal calls. The Idle Word bit pattern also provides a reliability check against the possibility that a C-bit has inadvertently been set to zero, thus erroneously identifying a time slot as idle.

Accordingly, during the first section of Assignment Frame, all of the idle time slot spans are identified by a zero control bit and a stored idle word IW. Then, before such an idle time slot is actually seized by a port requiring a time slot, a tentative marking scheme is employed in order to insure that the time slot is not one which has previously been selected by an overlapped port. The need for this may be demonstrated as follows.

Let it be assumed that four ports are distributed around a single, clockwise, circular switching loop in alphabetical order, A, B, C and D. Let it be assumed, arbitrarily, that time slot 26 is already in use between ports B and D and that port A wishes to seize an idle slot for use on a call to port C. Port D, as the downstream port on the clockwise bus, returns slot 26 to idle status. If no other ports (besides ports B and D) are using this slot, slot 26 arrives at port A containing the Idle Word written into it by port D. But, ports A and C should not seize slot 26 even though it is idle because this slot is needed on the preexisting call between the overlapped ports B and D. Similarly, if the time slot was in use between two overlapped ports such as B and C, the slot should not be used for communication between port A and D even though the slot may be idle as it arrives at port A and at port D.

To prevent slot seizure when the slot is in use by one or more overlapped ports, the upstream port requiring a time slot must not immediately seize an oncoming time slot merely because it contains the Idle Word. Instead, the upstream port should flag the apparently idle time slot in such a manner that the desired downstream port will recognize the flag and thereupon accomplish the seizure and communicate the fact of its seizure to the upstream port and to common control. Any overlapped intervening port that had priorly been using the time slot and which still requires the time slot in the present frame should overwrite the flag. This flagging of idle time slots is accomplished during the Assignment Frame, AF. The writing of Idle Words and assignment words is done under the control of time slot assignment circuits 408R and 408 L, the details of which are shown in FIG. 12.

SELF-ASSIGNMENT OF TIME SLOTS—DETAILED DESCRIPTION

Figure 12:
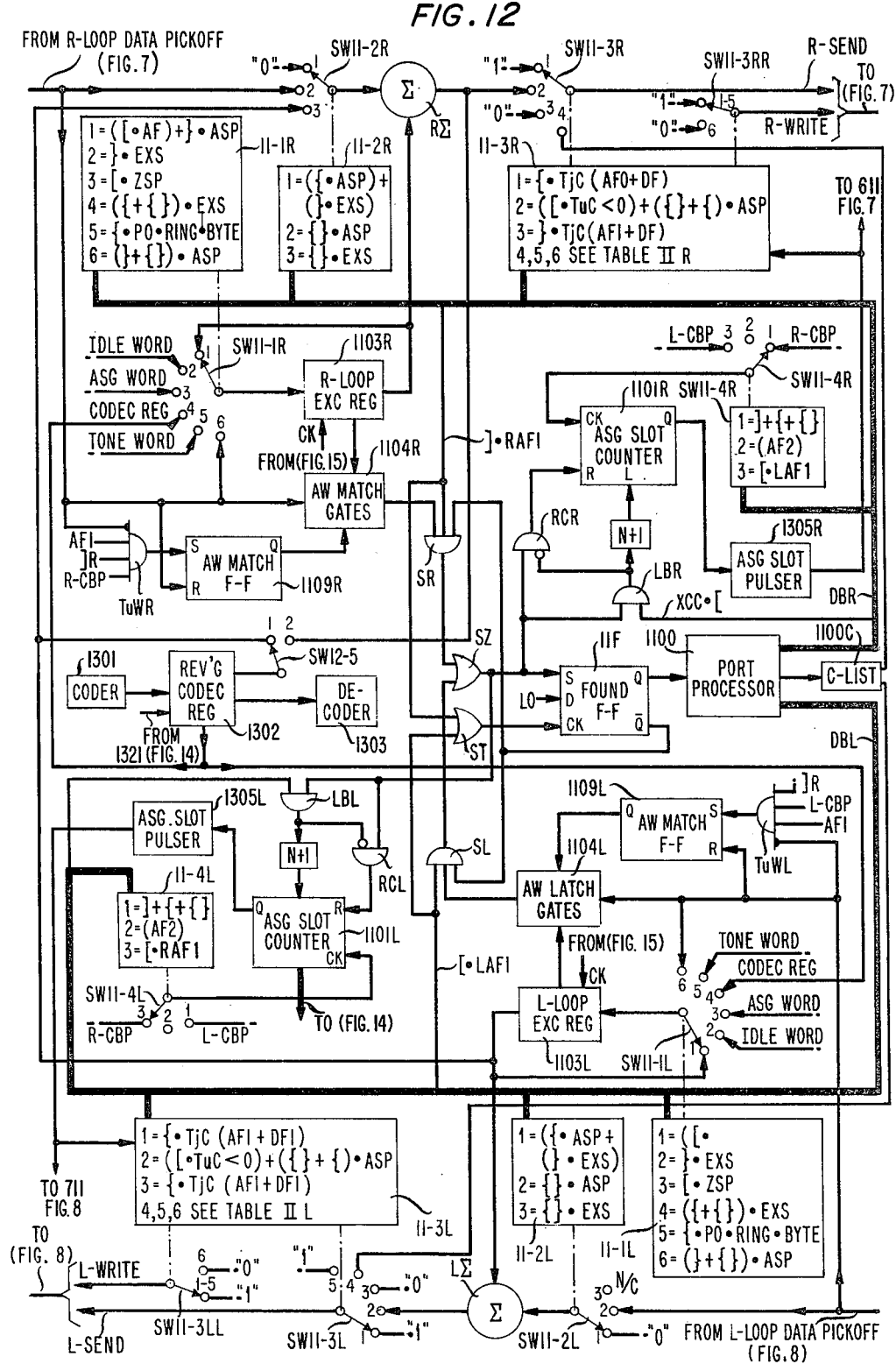
FIG. 12 shows an embodiment of the port logic circuitry for effecting the self-assignment of time slots by using the clock transfer, downcounter or hold-up methods.

In the logic decoders depicted in the port circuit of FIG. 12, certain symbols and abbreviations are used. That side of a port which is the upstream or Open side port on a connection being established (i.e., one which has not yet been assigned a time slot) is indicated by the use of the left-hand square bracket symbol, [. The corresponding downstream or Close side end port which has not yet been assigned a time slot is indicated by the use of the right-hand square bracket symbol,]. Similarly, an intermediate port of a conference connection, sometimes hereinafter referred to an an enclosed port which has not yet been assigned to a time slot is indicated by the use of both square bracket symbols, []. After assignment of a time slot, the corresponding symbols are scroll brackets {,} and {}, respectively. A complete summary of all symbols and abbreviations used in the drawing appears in the Appendix.

With the exception of the circuitry occupying the middle horizontal level of FIG. 12 (principally, coder 1301, reversing codec register 1302, decoder 1303, FOUND flip-flop 11F, and port processor 1100), the remaining elements of the illustrative port circuit have been arranged to exhibit a high degree of symmetry about a pair of imaginary diagonal axes (not shown) extending from each corner of the figure. C-bits and data words not overwritten by the port are passed through via "writeable" one-bit register 623 which is then in the "not-write" state. If the data or C-bit is to be altered by the port, the write state is effected by energization of the lead labelled "from write (FIG. 12)" shown in FIG. 7. The bits to be overwritten appear on the R-SEND or L-SEND leads. Write occurs when either switch SW11-3R (or SW11-3L), FIG. 12 is in position "1."

Beginning at the upper left-hand corner of FIG. 12, data incoming over the R-loop from FIG. 7 may pass through contact 2 of switch SW11-2R, the R-loop summer RΣ and contact 2 of switch SW11-3R and be summed and forwarded onward as a conference call component along the R-loop by exiting to FIG. 7 at the upper right-hand corner of FIG. 12. Similarly, data incoming over the L-loop from FIG. 8 enters FIG. 12 at its lower right-hand corner and, if bits ae to be overwritten, the control logic will cause them to appear at the lower left-hand corner on the L-SEND lead. The write command appears on the WRITE lead at the proper time. Unaltered bits are clocked through register 723 with a delay of one bit interval.

The operation of switches SW11-2R, SW11-3R, and SW11-2L and SW111-3L is under the control of their respective logic decoders 11-2R, 11-3R, and 11-2L and 11-3L, respectively, each of which receives control signals from port processor 1100 via buses DBR and DBL, respectively. The switch positions dictated by the logic decoders are fully explained by the accompanying Boolean expression set forth within the logic decoder blocks, except for logic decoders 11-3R, 11-3L, 11-4R, 11-4L, in which cases the blocks contain abridged statements with references being made to Tables IIR and IIL, which appear below.

As noted above, the abbreviation used in the logic decoders and the tables below are fully set out in the Appendix. Since the Boolean expressions are believed to be self-explanatory, and much more compact, any further elaboration would be redundant. "Translation" into English of the abridged Boolean expression for position 2 of switch 11-3R will make this apparent. This Boolean expression is 2=([TuC<0)+({}+{}). ASP meaning that the switch is in position 2 on the Open side of a port in the search mode, [, of an Assignment Frame during the 16 bit data word following the C-bit when that passing C-bit in an unassigned time slot was read as a zero OR this is the time of the Assigned Slot Pulse for a port which is already assigned as an enclosed, {}, port OR this is the Open side,{, switch 2. The above abridgement (of the full Boolean expression set forth in Table IIR) was used in the logic decoder box 11-3R of FIG. 12 because of space limitations in the drawing figure. The more complete definition of position 2 of switch 11-3R is found in Table IIR below. This definition shows that the switch will be in position 2 provided that the foregoing conditions are met during AF0 or AF1 while the data bit positions of the time slot word are present, i.e., those bit positions when $\overline{CBP}$ is true. The more complete expression for position 2 included Table IIR, namely ({}+{+}) ASP $\overline{CBP}$, means that a switch will also be in position 2 when the assigned slot pulse ASP is present for an Open, Close or Enclosed port, during the assigned time slot, except when the C-bit is present as indicated by $\overline{CBP}$ being true.

TABLE IIR

| (SW11-3R) |
|---|
| 1 = { TjC((AF0+AF1)+DF OFF-HOOK) ASP |
| +(HEYU PF1 RZC)+} ASP $\overline{CBP}$ |
| +[ ASP CBP AF3 (or AF2) |
| 2 = ({}+{+}) ASP $\overline{CBP}$ |
| +[ TuC<0 (AF0+AF1) $\overline{CBP}$ |
| 3 = } TjC ASP (AF0+AF1+DF) |
| +[ TuC<0 <IW $\overline{CBP}$ (AF0+AF1) |
| +{ ASP ON HOOK CBP DF |

TABLE IIR-continued $$4 = \text{HEYU PF CBP RZC}<0\ \overline{\text{RZC}}$$
$$+\text{CF CBP AN-VN-MATCH}$$
(SW11-3RR)

1 = All of above
0 = Else

TABLE IIL (SW11-3L)

$1 = \{\ \text{TjC}((\text{AF0}+\text{AF1})+\text{DF OFF HOOK})\ \text{ASP}$
$\quad +\text{HEYU PF (RZC}<0\ (\text{R SLOT}=0+\text{S1C}).\ \text{CBP}$ $\quad +\}\ \text{ASP}\ \overline{\text{CBP}}$
$\quad +[\ \text{ASP CBP AF3}(+\text{AF2})$ $2 = (\{\} + \{+\})\ \text{ASP}\ \overline{\text{CBP}}$ $\quad +[\ \text{TuC}<0\ (\text{AF0}+\text{AF1})\ \overline{\text{CBP}}$
$3 = \}\ \text{TjC ASP (AF0}+\text{AF1}+\text{DF)}$ $\quad +[\ \text{TuC}<0\ <\text{IW}\ \overline{\text{CBP}}\ (\text{AF0}+\text{AF1})$
$\quad +\{\ \text{ASP ON HOOK CBP DF}$
$4 = \text{HEYU PF CBP (RZC}<0\ \text{for R-PFO)}$
(SW-3LL)

1 = All of above
0 = Else

In addition to the forwarding of data around the R- and L-loops, important aspects of port circuit operation are concerned with the marking of the C-bit positions of the time slot words, the detection of Idle words and Assignment words, the application of the data word provided by the local coder 1301 to the R-loop or L-loop bit stream (or by a data terminal device not shown), and with the delivery of the data word received over the R-loop or L-loop to the local decoder 1303. Of these various operations, the time slot search operation by means of which a time slot-requesting port circuit itself locates and assigns itself to an idle time slot, and informs CC of the result will be described first.

The Assignment Frame is advantageously divided into two or more sections. During the first section, the upstream side of every port which has an assigned time slot TjU automatically overwrites the control bit of the time slot as a 1. This is represented by the Boolean expression which, for example, in logic decoder 11-3R of FIG. 11 when it operates switch SW11-3R to position 1. So long as the C-bit of the time slot word is in the "one" state, the time slot is identified as in use over a particular span of loop. The one state of the C-bit will identify the slot as in use over the span for which it is present. Idle time slots are consequently identifiable by a zero C-bit followed by all-one bits in the remaining (data word) bit positions of the time slot. During this first section of the Assignment Frame, the upstream time-slot-requiring port tentatively flags Idle Words.

Those ports which are requesting assignment of a time slot (i.e., those which had received the solid, sorid, soring, or soling ORIG and TERM opcodes during the previous Control Frame) do not immediately alter the C-bit of any arriving idle time slot to seize that time slot as it passes. Rather, each of these ports, at its upstream (Open) side, "flags" the arriving idle time slot by changing all of the subsequent bits of the idle time slot word to the bits of an Assignment Word. For general purpose use, the all-one idle state data word can be converted to all zeros thus facilitating detection. The combination of the zero C-bit followed by an all-zeros word defines a preferred implementation of the Assignment Word AW.

When the downstream (Close) side of either one of the time slot requesting ports successfully receives the first Assignment Word, it means that this time slot is available for use. The downstream time-slot-requiring port receiving the Assignment Word may then, during the second portion of the Assignment Frame, mark the C-bit of the time slot to accomplish its seizure.

If the flagged time slot had been one which was priorly in use by an intervening port, that port will ignore the Assignment Word and will re-seize its time slot, marking it busy by changing the C-bit to a one and writing into it a data word, thereby "unsetting" the flag. The downstream time slot requesting port in this case will not receive a zero C-bit followed by the Assignment Word in this time slot and must await the receipt of a zero C-bit and an Assignment Word in some other time slot. It may be appreciated that, if the arriving word was not truly idle, but somehow has its C-bit erroneously in the zero state, the slot will still not be accepted at the downstream port unless all bits received correspond to the pre-determined Assignment Word. An assignment operation on the opposite loop may be accepted momentarily, but failure of a checking operation, as hereinafter described, will prevent final establishment of the connection. This affords a strong measure of protection against seizing a time slot word which is not, in fact, idle, even though its C-bit is zero.

When a port which is instructed by the previously received opcode that it is the downstream (Close side) port on its R-loop side for the present connection, AND gate SR is partially enabled during the first portion of the Assignment Frame. The data stream states are applied to the complementing (uppermost) input of gate TuWR, FIG. 12. Assuming an all-zero Assignment Word, gate TuWR is enabled to set its corresponding AW MATCH (positive logic) flip-flop, 1109R when the R-loop C-bit timing pulse R-CBP is present since the arrival of any one-bit incoming over the R-loop will inhibit gate TuWR preventing it from setting the AW match flip-flop 1109R. The uncomplemented data stream states are presented to the reset input of flip-flop 1109R. Flip-flop 1109R will thus be reset should any one-bit arrive over the R-loop when it is searching for the Assignment Word.

If a different pattern of bits were desired to identify the Assignment Word, that pattern could be loaded into register 1103R and, so long as flip-flop 1109R were set, arriving bits on the R-loop could be matched in AW match gate circuit 1104R against the locally circulating Assignment Word provided by the associated R-Loop Exchange Register 1103R. In this case a mismatch output (not shown) from gates 1104R would be connected to the reset R input of flip-flop 1109-R instead of the connection shown at the reset input of flip-flop 1109R.

In either event, when the Assignment Word match is successful, circuit 1104R enables AND gate SR which clocks the Q output of FOUND flip-flop high via OR gate SZ. The port processor 1100 is thereby signalled to take appropriate action. The output of gate SZ also resets assigned slot counter 1101R and the search is terminated. The now low output $\overline{Q}$ FOUND flip-flop inhibits gate SR and gate SL. Assigned slot counter 1101R, which has been assumed to be on the Close side of the port circuit, will then continue to be clocked by the R-loop C-bit pulses which it receives from position 1 of switch SW11-4R and will overflow to repetitively trigger assigned slot pulser 1102R on each repetitive counting of the number of C-bits occurring in a frame.

There are other ways in which the downstream port's successful finding of the Assignment Word may be kept track of. For example, a serial recirculating shift register (not shown) having as many stages as the number of time slots could indicate the assigned time slot by a single circulating one bit. By circulating additional bits, such a register could also permit the multiple assignment of the port to different time slots if greater bandwidth is required. However, the possibility of multiple time slot assignment in a shift register renders the circuitry vulnerable to the possibility of false pulse circulation which entails the possibility of double connection. Where the loop employs a large number of time slots, the cost of providing a register with a large number of stages at each port may become significant.

Once the Assignment Word has been found at the Close side of a port, the number of the assigned time slot must be transferred to the Open side of the port so that two-way communications can employ the time slot with the same time slot number on both the R- and L-loops. There are several ways this can be done. The preferred embodiments each involve the use of two resettable counters at each port circuit, one counter being associated with each loop. In a system having, for example, 256 time slots per frame, each port would have one 8-stage assigned slot counter for the L-loop, and one 8-stage assigned slot counter for the R-loop. If one of the counters is reset when an assignable time slot is found, the counter would repetitively overflow at counts of 256, and thereby automatically re-identify the recurrence of the same time slot during each frame.

SELF-ASSIGNMENT OF TIME SLOTS—CLOCK TRANSFER METHOD

The first of the preferred methods is illustrated in FIG. 12 and may be called the "clock transfer" method. Both counters 1101R and 1101L will initially be clocked by the control bit pulses on one bus (the Close side bus) until the Assignment Word is found on the Close side and then the assigned time slot number will be transferred to the counter on the Open side.

During the first portion of the Assignment Frame, logic decoders 11-4R and 11-4L control switches SW11-4R and SW11-4L to deliver either the same side or opposite side control bit pulses to the assignment slot counters 1101R and 1101L, respectively. If the port circuit shown in FIG. 11 has its R-loop side as the close side for a particular connection it will have received the TERM-R opcode from CC during the preceding control frame. Accordingly, switch SW11-4R will be in position 1 so that the R-loop assigned slot counter 1101R will be clocked by the R-loop control bit pulses R-CBP. (The R-loop C- bit pulses are provided by the circuitry of FIG. 7.) Correspondingly, switch SW11-4L will be in position 3 so that L-loop assigned slot counter 1101L will also be clocked by the R-loop control bit pulses R-CBP since the port is an Open side end port on the L-loop for the assumed connection. Note that this position of switch 11-4L causes assigned slot counter 1101L to be clocked by the same R-loop control bit pulses R-CBP as are clocking assigned slot counter 1101R.

When matching circuit 1104R detects that the Assignment Word is received over the R-loop bus, it resets counter 1101R via gates SR, SZ and RCR as heretofore described. The output of OR-gate SZ also passes through gate RCL to simultaneously reset counter 1101L. Counter 1101R, which is the counter associated with the downstream side of the port for the TERM-R opcode, is however immediately allowed to resume counting since it continues to be clocked by R-CBP control bit pulses from position 1 of switch SW11-4R. It will, therefore, periodically overflow at counts of 256 to mark the reappearance of the assigned time slot. At this time counter 1101R will retrigger its associated assigned slot pulser 1102R.

Counter 1101L, which is the counter associated with the upstream side of the port for the TERM-R opcode, continues to be clocked by R-CBP control bit pulses until time slot zero RZC appears on the R-loop. Clocking of counter 1101L is then interrupted by decoder logic 11-4L moving switch SW11-4L to position 2. At this point, counter 1101L registers the complement of the time slot that had been assigned on the R-loop bus. When time slot zero LZC appears on the L-loop bus in the next frame, switch SW11-4L is moved to position 1 to cause L-loop control bit pulses L-CBP to commence clocking counter 1101L. This counter will now complete its count of 256 and overflow whenever the selected time slot appears on the L-loop bus.

Because the serial checking of the bits of the arriving Assignment Word cannot be completed until the last bit arrives, and this occurs just before the beginning of the next time slot, it is useful to "reset" assigned slot counters 1101R and 1101L to a count of one rather than to zero when the Assignment Word is found. When this is done the output stage overflow transition of the counter will occur at the start of the assigned time slot, rather than at the next time slot. An even earlier reset may advantageously be used to compensate for the operate times of various components in the port circuit.

SELF-ASSIGNMENT OF TIME SLOTS—UP/DOWNCOUNTER METHOD

An alternative method of keeping track of time slot assignments, which may be called the down-counter method, may be employed if the assigned slot counters for the R-loop and L-loop 1101R and 1101L are each replaced by an up/down type counter and logic decoder blocks 11-4R and 11-4L for switches SW11-4R and SW11-4L are modified as shown in Tables IIIR and IIIL below.

TABLE IIIR (SW11-4R) (Up/Down Transfer)

R-CLOCK UP = {}+{+}+] AF+[ FOUND $\overline{AF1}$
WAIT = [ FOUND (AF0+AF1)
L-CLOCK DOWN = [ $\overline{FOUND}$ L-AF1
RESET TO 1 IF $\overline{CROSS}$, LOAD N+1 IF CROSS

TABLE IIIL (SW11-4L) (Up/Down Transfer)

L-CLOCK UP = {}+{+}+] AF+[ FOUND $\overline{AF1}$
WAIT = [ FOUND (AF0+AF1)
R-CLOCK DOWN = [ $\overline{FOUND}$ F-AF1
RESET TO N IF $\overline{CROSS}$, LOAD N+1 IF CROSS During the first portion of the Assignment Frame when time slot zero occurs at the Close side of the port, the Open side counter is reset and is then driven down by the control bit pulses derived from the Close side. For example, if the port circuit in FIG. 12 has its Close side at the R-loop for a particular connection, then the up-/down counter 1101L is the Open side counter of the port for that connection. Logic decoder 11-4L will set switch SW 11-4-L to position 3 to close the Open side counter 1101L to be driven down by the Close side (R-CBP) pulses until the Assignment Word is found on the Close side. At this point, the Open side counter registers the complement of the time slot number which has been found on the Close side. Switch SW11-4-L is then set to open position 2 by logic decoder 11-4L and the Open side counter is allowed to remain at this setting until the second portion of the Assignment Frame when time slot zero LZC arrives on the L-loop (Open side) whereupon switch SW11-4L is set to position 1, and the Open side counter is driven up from the complement of the found time slot number by its "own side" clock pulses, namely L-CBP. Counter 1101R, which for the assumed call, is associated with the Close side, was simply reset when the Assignment Word was found and then immediately allowed to receive its "own side" clock R-CBP as was done in the "clock transfer" method.

Since time slot numbers appearing at the Open and Close sides of a port are complementary and the open side counter is up-counting from the complement of the slot number found at the close side, the all-ones to all-zeroes transition will occur when the assigned slot appears on the Open side bus. The C-bit of this time slot may then be marked as a one by decoder logic 11-3R positioning switch SW11-3RR to position 1. The marked slot C-bit information on the Open side bus is transmitted past intervening ports including the Close side port, and should arrive at common control simultaneously with the C-bit marked in the correspondingly numbered time slot on the Close side bus. This coincidence of singly-marked C-bits on the two buses at common control provides a means of verifying the accuracy of system operation. A check is also provided at each port on the Close side when the marked C-bit arrives in the newly seized slot position.

SELF-ASSIGNMENT OF TIME SLOTS—JAM-SETTING METHOD

An alternative modification (not shown) can be made to the foregoing circuitry which also employs the setting of the upstream (Open side) counter to the complement of the slot number assigned on the downstream (Close side) bus, but which does not require the use of down-counters. When the time slot is found on the downstream side, the upstream counter may simply be jam-set to the complement of the downstream counter's reading and then allowed to commence counting up when time slot zero appears on the upstream side. This method eliminates the need for switching the connections of the counter, but does require that the assigned time slot number be stored in processor 1100, for example, until the arrival of the zero time slot on the upstream bus.

SELF-ASSIGNMENT OF TIME SLOTS—COUNTER HOLD-UP METHOD

There is yet another method of keeping track of the assigned time slots that may be implemented with the circuitry of FIG. 12 which does not require the switching of control bit pulses R-CBP and L-CBP between counters 1101R and 1101L. Logic decoders 11-4R and 11-4L are modified as shown in Tables IVR and IVL below.

TABLE IVR (SW11-4R) (Count Holdup Transfer)

$1 = \{\}+\{+\} +].\text{AF1.FOUND}+([.\overline{\text{FOUND}} .\overline{\text{L-AF1}})$
$2 = (].\text{AF1.}\overline{\text{FOUND}})+([.\overline{\text{FOUND}} .\overline{\text{L-AF1}})$
$3 = \text{OPEN}$ $\text{RCR} = \text{TZC.}(]+[.\overline{\text{CROSS}});$ $\text{LOAD N} = [.\text{TZC.CROSS.}\overline{\text{L-AF1}}$

TABLE IVL (SW11-4L) (Count Holdup Transfer)

$1 = \{\}+\{+\}+].\text{AF1.FOUND}+([.\overline{\text{FOUND}} .\overline{\text{R-AF1}})$
$2 = (].\text{AF1.}\overline{\text{FOUND}})+([.\overline{\text{FOUND}} \text{ R-AF1})$
$3 = \text{OPEN}$
$\text{RCL}=(\{+\}) .\text{TZC}$ $\text{LOAD N}=[.\text{TZC.}\overline{\text{R-AF1}}.\text{CROSS}$ In this arrangement which may be termed the counter hold-up method, the Open side and Close side counters are reset to zero at the first time slot zero appearing on the respective sides after the CLOSE-R, CLOSE-L, TERM-R, or TERM-L status is received. If the connection crosses the CC, the Open side counter is loaded to the initial count N, the length of the loop in time slots. The Assigned Slot Counters 1100 are thus synchronized with their respective multiplex frame counter (FIG. 6 and FIG. 7). As a result, they would normally reset in synchronism with time slot zero for a noncrossing connection. For a crossing connection, the Open side counters would reset early by a count of N time slots. During the Assignment Frame search switches SW11-4R and SW11-4L are both transferred to position 2 during the appearance of time slot zero on the Close side. Both switches remain in this count hold-up position until an assignment word match at the first available time slot n is detected on the Close side. SW11-4R and SW11-4L are then transferred back to position 1 to continue counting under control of their own control bit rate clock. Both counts are thus held up for n counts. Therefore, the counters will return to zero count n time slots later than would have occurred without the count hold-up. This is the assigned time slot. For a noncrossing connection all counters reset at time slot n. Open side counters on a crossing connection reset early by N counts. When time slots zero returns to the CC, time slot N is originating. The AW detected in time slot n on the Close side will have originated with a number definition N slots less on the Open side. Thus n−N becomes n−N+N=n as the CC is crossed.

Alternatively, the Close side counter 1101 may be reset on detection of the Assignment Word as heretofore described. If the connection crosses the CC, the Open side counter is loaded to the initial count N, the loop length in time slots. Counters 1101R and 1101L are thus synchronized with their respective multiplex frame counters, FIGS. 7 and 8, and will normally reset in synchronism with the appearance of time slot zero on their respective side or N time slots early if the Open side counter leads by N. When time slot zero appears on the Close side, both switches SW11-4L and SW11-4R are set to position 2 until the Assignment Word match is detected on the Close side. If the $n^{th}$ time slot is the one containing the Assignment Word, the Open side counter will have been held up for n time slots. Switches SW11-4R and SW11-4L are then transferred back to position 1 to resume counting. The counters will then return to zero count n time slots after they would have reset if the count had not been held up. This is the assigned time slot on the respective side.

The above-described methods for accomplishing the transfer of the assigned slot number from the Close to the Open side may be conveniently summarized as follows:

BY CLOCK TRANSFER

When AF begins, clock both counters from Close side.
When FOUND, reset both counters, unless connection crosses CC—in which case load Close side counter to N+1. Immediately resume clocking of both counters.
At TZC of next frame of AF on Close side, stop Open side counter. (It now registers complement of assigned slot's number).
At TZC of next AF on Open side, re-start Open side counter and continue to drive it with Open side CBPs.

BY COUNTER HOLD-UP

Reset Close and Open side counters during time slot zero if the connection does not cross CC.
Load Open side to count N instead if cross, and inhibit counting of both Close side and Open side counters until Assignment Word is found. Then resume counting on both sides. Note that both counters have been held up for n time slots.

BY UP/DOWN-COUNTER

When AF begins on Close side, reset Open side counter and drive that counter down from Close side. If connection crosses CC, load initial count equal to loop length N in time slots.
When FOUND, stop Open side counter. (It now registers complement of assigned slot's number.) Close side counter is simply reset and driven up from Close side.
At TZC of next AF on Open side, re-start Open side counter and drive it up from Open side.

BY TRANSFER DOWN-COUNTER

When AF begins on Close side, reset TDC and resume counting down.
When FOUND, reset Close side counter for using device in search mode, and stop TDC count.
At next time slot zero on Open side, load held TDC state into assigned slot counter and resume normal counting.

BY JAM SETTING

At TZC of next AF on Open side, jam-set Open side counter to complement of assigned slot's number FOUND on Close side if connection does not cross CC. If connection crosses CC, add loop length N (in time slots) stored in port processor to assigned slot's number FOUND on Close side. Jam-set Open side counter to sum. counter to sum.

MULTIPLEX FRAMES—DEFINITION OF FRAME SEQUENCES ASSIGNMENT FRAME SEQUENCE (FIG. 12)

Heretofore, the Assignment Frame has been described in terms of a "first" portion in which a port searches for the Assignment Word at its downstream (Close) side and a "second" portion in which the downstream port marks the time slot which it has so assigned itself at both its Open and Close sides. It has been tacitly assumed that the downstream (Close side) port on a connection can readily detect and correctly interpret the Assignment Word written on the bus by the upstream port. This poses no problem when the path between an up- and a down-stream port does not cross the common control port. On a path which does cross the CC, however, the transfer of the seized time slot number from the Close side to the Open side of the port must include an adjustment of the assigned slot counter on the Open side which takes into account the transit time around the loop.

Where the transit time around the loop is equal to a frame interval, a marked slot emerges from CC with the same number it had on its approach to CC. Where the transit time around the R-loop (or L-loop which should be the same) differs from the duration of a frame interval, the time slot number being dispatched by CC will be different from the number of the slot marked on its approach to CC. If N is the transit time around the loop in time slot intervals, and S is the number of time slots in a frame, the number, j, of any time slot approaching CC is increased by N upon emerging from CC. The emerging slot is numbered $j'=j+N$ so long as $j+N$ is equal to or less than S. If $j+N$ is greater than S, S must be subtracted from the sum. Such subtraction occurs automatically when a counter overflows.

This may be explained with the simplified system of FIG. 1 which has only 17 rather than 256 time slots, S. Let it be assumed, however, that the loop length, N, is only 10 full time slots instead of the 17 time slots actually depicted. Therefore, slot RZ will return to CC when slot R10 is being originated. Consider the Assignment Frame. If time slot R1 has an Assignment Word written into it by an Open-side port, such as port No. 144 for transmission across the CC to the Close side of some other port, such as port No. 9, the Assignment Word will cross CC and arrive at port No. 9 with the time slot numbered as R11. Port No. 9 will write the Assignment Word on its Open side in time slot L1. This slot crosses CC and arrives at the Close side of port No. 144, renumbered as L11. It might appear that two slots are thus required to transmit across the CC in each direction. However, slots L1 and R1 which were "abandoned" downstream of the CC are in fact used to pass-on another connection that crosses the CC. This occurs when Assignment Words are written in slots R8 and L8 on one side of CC to emerge downstream of CC as slots L1 and R1.

Since CC can readily determine whether it is to be crossed in the connection to be established between the calling and called ports, CC can appropriately alter the argument of the solid, sorid, soring or soling opcode which is sent to the downstream ports by the CC during the previous Control Frame. In response to the opcode argument, the port processor 1100 can control the resetting of the Open side assigned slot counter to B instead of to zero when the connection is one crossing the CC.

In addition, however, it is important during Assignment Frame operations that the time slots being dispatched by CC belong to the same type of frame as that of the time slots approaching CC so that a time slot marked by a port in the Assignment Frame on one side of the CC will also arrive at a port on the other side of the CC during an Assignment Frame with the meaning of the marking unchanged.

The problem may be illustrated through the use of FIG. 1. Let it be assumed that port 144, which is to the left of CC, has just begun to write the Assignment Word into time slot R1 of the "first portion" of an Assignment Frame and that port 9, which is to the right of CC (and "downstream" of port 144 on bus R-CW) is searching for an Assignment Word on the R-loop. The Assignment Word written by port 144 will not arrive at port 9 until two more time slots have elapsed, at which time CC will be dispatching a new frame. Even though CC does not alter the Assignment Word marked by port 144, port 9 has a multiplex frame counter (709, FIG. 8), previously described, which informs the port processor 1100 that it is accruing a time slot count in a new frame. In order for port 9 to take the appropriate previously described actions, including detecting the arrival of the Assignment Word at its Close side, this new frame must also be an Assignment Frame.

The simplest way for the marked time slot to retain its original Assignment Word meaning is for the "first" portion of the Assignment Frame to be divided into two successive multiplex frames, AF0 and AF1, respectively. Upstream service-requesting ports will then write Assignment Words during both AF0 and AF1 and downstream service-requesting ports will search for Assignment Words only during AF1. In those connections not bridging common control, the downstream ports could find Assignment Words during both AF0 and AF1 even though they are, for convenience, restricted to search during AF1. Those connections which do bridge CC, downstream ports will have all time slots returned during AF0 after AF1 has started passed across in a renumbered AF1 slot. The remainder of the time slots will return during AF1 to be passed across in a renumbered AF1 slot. Therefore, the crossing connection has access to all slots during AF1.

It is to be noted that while common control must correctly pass-on during AF1 the markings arriving during AF0, it is not essential that AF0 and AF1 be adjacent. Common control may store the arriving markings and pass them on during an AF1 that is spaced apart from AF0 by one or more integral multiplex frames. When this is done, the port processors 1100 are correspondingly programmed to recognize the spaced sequence of AF frame occurrences.

A preferred embodiment of such spaced frame sequences, called a "Super Frame", is shown in FIG. 11. This Super Frame permits the storage of information at CC and is of particular advantage when the transit time around the loop is longer than the interval of a single multiplex frame. Information incoming to CC during AF0 may then be stored at the CC for the interval of one or more frames. A single multiplex frame, TF2, has been provided between AF0 and AF1 to provide for such an interval during which AF0 information may be stored at the CC. Frame TF2 may advantageously be one of a set of four evenly-spaced frames, TF0, TF1, TF2 and TF3, the C-bits of which are used for control of data transmission. Assuming that 16 bits of each time slot are available for data transmission, the 125 microsecond recurrence interval provides a data transmission rate of 128 kilobits per second for data in each time slot. If it is assumed that user ports will present 8-bit ASCII characters, 128 kbps accommodates 16,000 ASCII characters per second. Since this is far more capacity than is normally required, it is often convenient to allow a number of data ports to share the same time slot.

Demand-only seizure of assigned time slots can be readily controlled by using the C-bits of Transfer Frame time slots as a token to pass on the indication that the assigned slot is or is not available for seizure during the next frame. When a port has a packet ready for transmission, it reads the C-bits arriving during the Transfer Frame. The port then has until the next transfer frame to determine whether the C-bit read was a zero and condition its packet for transmission at the assigned time slot when it occurs during the Next Transfer Frame. The port logic also marks the C-bit of the now assigned time slot in each Transfer Frame with a one until four or fewer words are left to transmit. The port then marks the Transfer Frame-bit with a zero to indicate that it is releasing the time slot at the end of the next four words in that time slot Transfer Frame block. Even if more characters are made ready in the meantime, they must be saved for that ports next opportunity to seize the packet switching slots(s). When a number of ports so share a single time slot, it is advantageous to provide a mechanism for resolving contention for access to the slot.

To transfer seizure priority around the loop among users of a time slot dedicated to the packet switching of data, each such port is equipped with an MN flip-flop. During each TF frame, the C-bit of each time slot assigned for data usage determines which port will be allowed to transmit a character in that time slot during the next three intervening multiplex frame. The port which is going to transmit its block of four or fewer data words of two bytes or characters marks the C-bit as a zero. All other ports assigned to the time slot read the passing C-bit and overwrite it as a one if they have enough buffered characters ready for transmission. Accordingly, only the next successive port requesting permission to transmit will receive an arriving zero C-bit. The arriving zero C-bit sets that port's MN flip-flop. Starting at the next Transfer Frame, that one port which has its MN flip-flop set will then write the C-bit as a zero, insert an identity byte and write its 8-bit character. Prior to the arrival of the next TF frame, flip-flop MN is reset. In this arrangement, therefore, the port has access to the time slot until the following TF frames C-bit arrives. In the illustrative embodiment of FIG. 11, this occurs four multiplex frames later. The average of four 16-bit time slots allows each user port to send and/or receive 8 buffered characters while the port has priority. Priority is advanced once every four multiplex frames. The uniform spacing of the four TF frames throughout the Super Frame allows the data packets to have a uniform base length. Alternatively, the port may be allowed to write much longer packets by writing the Transfer Frame C-bits as ones until it has four or fewer words still to transmit (or a prescribed time has elapsed). The port then marks the TF C-bit as a zero to signal its release of the slot starting at the next TF.

The AF0 information that must be stored at CC for transmission onward in AF1 may be obtained from the C-bit sequence arriving over either loop since both sequences are alike. Identity can be checked before storage. Therefore, only one set need be stored at CC. Although the search during the Assignment Frame is to determine whether a zero C-bit is followed by the Assignment Word (AW), it is not necessary to store the C-bits as well as all 16 data bits of each word, but only a list of the C-bits and a zero or one for each to indicate whether the associated data word was an Assignment Word or not.

Once a port searching for an available time slot has found an Assignment Word at its downstream (Close) side on one loop, it marks that time slot by changing its C-bit to one during what has originally been referred to as the "second" portion of the Assignment Frame. The port must also mark the C-bit of the comparably numbered time slot when it arrives on the other loop at the Open side of the port. The two marked C-bits travel around the rest of their respective loops and arrive simultaneously (because they are identically numbered) at common control. This coincident arrival of marked C-bits may advantageously be used for error checking purposes and to verify that a time slot has been found.

Because the search operation is referenced to the detection of Assignment Words on the Close side, this may require the complete passage of the AF1 frame on the Close side before an Assignment Word is found. The number of the slot in which the Assignment Word was found must be available for transfer to the Open side before the start of the next Assignment Frame on the Open side.

To insure that there will be enough time for the slot assignment to be transferred from the Close side, the "second" portion of the Assignment Frame is subdivided into two multiplex frames, AF2 and AF3 of 125 microseconds each. AF2 merely provides a waiting interval to insure passage of the AF1 search interval on the Close side. During AF3, the port which found an available time slot is permitted to write the C-bit of the selected slot as "one" on each side.

Following AF1, the single Disconnect Frame DF occurs. This frame, which could be located elsewhere in the Super Frame, may be conveniently located at this point in the Super Frame to permit the priority Transfer Frames TF to be uniformly spaced.

PORT FRAME SEQUENCING

The block of three contiguous Port Frames (PF0, PF1, and PF2, FIG. 11) is provided to allow one port in any Super Frame having a state change to seize the Port Frame. As indicated earlier, a port requiring central control attention overwrites the R-loop zero time slot C-bit, RZC, as a one and follows this by writing out a list of up to 255 additional C-bits on the R-loop. This requires that the C-bits of all of the time slots arriving at the seizing port each be zero. The port then duplicates the R-list on the L-loop beginning with the C-bit of the first time slot arriving at the port on the L-loop after RZC has passed on the R-loop. It is essential, however, that the time slot words passing on the L-loop also belong to a Port Frame and not any of the trailing time slot words of the immediately preceding frame of some other type. In order to insure that this is the case, the marking of RZC is postponed until the LZC of a port frame with all zero C-bits has completed its traverse of the L-loop. Accordingly, a Port Frame PF0 is provided on the R-loop and on the L-loop with all zero C-bits. Then a second, immediately contiguous Port Frame PF1 is provided so that the seizing port can overwrite RZC in this frame. The seizing port then overwrites the C-bit of the next time slot word passing on the L-loop. The L-list can, therefore, start out during L-PF0 or L-PF1. If it starts during PF1, the L-loop list cannot be completed until sometime in a next port frame. PF2 is provided for this reason. Since ports in the last half of the R-loop can only start the L-list during PF1 and complete them during PF2, this forces placement of the three Port Frames, PF0, PF1, and PF2, adjacent to each other.

CONTROL FRAME SEQUENCING

Communication from the CC to the ports, which takes place during the Control Frame, only requires a pair of adjacent multiplex frames for addressing, sending the C-bit list, and returning the selected port's list. Because there is no problem of multiple contention when the CC originates the list, writing either RZC or LZC as a one can provide one of the addressing parameters. The time zero slot C-bit LZC or RZC of Control Frame CF0 is marked as a one by the CC on that loop side for which the C-bit will arrive last at the port being addressed. The zero slot C-bit is followed by the transmission of the Vernier Number one bit at a time in the C-bits of subsequent time slot words. The list of such C-bits may, as mentioned include appropriate commands and update or refresh information. Another list headed by a 1 state C-bit is then started in the opposite loop so that it will arrive at the addressed port as the first one-state C-bit following the arrival of the marked zero slot pulse on the other side. Therefore, both time zero C-bits must have reached the addressed port before an address can be accepted.

Obviously, RZC will arrive at ports in the second half of the R-loop after the time zero C-bit, LZC on the L-loop has passed. This group of ports is, then, addressed by sending the R-list so that it just fills CF0. As the delayed list sent on the L-loop is read by the addressed port, the list is overwritten with that port's list following the Vernier Number passage (five Vernier bits for a 16 bit data word). This returns to CC such information as busy/idle status without requiring seizure of another Port Frame. Lists are returned on both sides for comparison. In this case, one list just fills CF0 and the other starts in CF0 and ends sometime in CF1.

Ports in the first half of the R-loop are similarly addressed. But because LZC arrives last, the list starts at the time zero slot of CF0 on the L-loop side. The R-list opening mark is started during CF0 delayed to arrive in "coincidence" with LZC. Again, the return lists are completed during CF0 or CF1. Because communication to the port and return is completed within the two frames, only CF0 and CF1 are required. CF3 and CF4 serve the same function as CF0 and CF1. This allows the CC to communicate to two ports in each Super Frame. Doubling up in this manner permits the CC to mark both ends of a connection before a search for an available time slot can begin. The extra CF pair can allow interrogation and update of the ports more frequently since their return list contains status, slot, button, and lamp data.

MULTIPLE COMMON CONTROLS (LONG LOOPS)

Systems of a few thousand ports can normally be accommodated by loops (of 256 time slots per frame lasting 125 microseconds and of time slots of 17 bits transmitted at any convenient bit rate from 1.024 to 32.768 mHz.) with loop lengths of less than one frame of combined loop delay. However, larger systems or systems with widely dispersed ports will have longer lengths due to both delay at the ports and transmission line propagation delay. An appreciation of how this will affect operations may be gathered by contrasting the impact on Assignment Frame and Port Frame operations. Without the previously described storage of AF0 information at the CC, a long loop might preclude the Complete transit of the AF0 frame until some time after CC had begun to dispatch time slots of frame AF1. Loop delay lengths of up to two multiplex frame intervals can be accommodated in the manner described above for the Assignment Frame by adding an additional multiplex frame. This may be only a partially satisfactory solution because such an initial design may set the maximum number of multiplex frames that can thereafter be readily accommodated in any actual installation without extensive reprogramming of logic decoders of each large loop having a different multiple of "B" time.

For system sizes in excess of a few thousand ports, it may be useful to provide more than one common control switching processor (not shown). Such processors may advantageously be distributed around the loop at separations of less than or equal to one multiplex frame of combined delay. Such an arrangement may include a principal CC processor and auxiliary CC processors so deployed as to be able to treat the loop sections between the main processor and an adjacent auxiliary processor as a loop of less than or equal to one multiplex frame of combined length or delay. The distributed CC processors can then define different types of control operations over the individual spans between processors provided the port-to-port control bit information which is to be passed across each processor is stored temporarily. These port-to-port operations occur during Assignment, Disconnect, and Transfer of Priority frames.

RINGING AND DISCONNECT

Having selected an idle time slot for the completion of a call by changing the C-bit of the time slot from zero to one, the stage is set for applying ringing to the called port and audible tone to the calling port. The signals for controlling the generation of these and other types of tones appear in a dedicated time slot adjacent to time slot zero. The calling port picks-off the bytes of the ringing control time slot, stores them in its Exchange Control Register, EXR, and sends them to the called port when the assigned time slot appears. The called port, which is in the "on-hook" condition, (but has completed selection of the assigned time slot) then decodes the ringing control byte and activates its tone ringer. At the same time, the calling port decodes the ringing control byte and activates its audible tone source to generate the ringback tone.

While ringing is being controlled, the called port is sending an "on-hook" data word signal, such as the Idle Word, or even the ring-back tone, to the calling port. When the called port goes off-hook in response to ringing, its status is changed to "talking", and it sends an off-hook signal, such as a normally coded word, to the calling port. This changes the status of the calling port to "cut-through". The "cut-through" status signifies that a communications path has been established between the calling and called ports, but central control (CC) has not yet been apprised thereof. This will occur as soon as the calling port can seize the Port Frame to signal common control as to its changed status. When this occurs, the calling port's status is changed to "talking". Note, however, that actual conversation can begin as soon as "cut-through" status is reached by the ports.

DISCONNECT

When a connected port goes on-hook, the state change detected by the port processor causes the port to attempt to mark RZC during the Port Frame. The status of the port is "Going". Port processor 1100 attempts to seize the first arriving unmarked time slot zero control bit RZC by controlling logic decoder 11-3R to operate switch SW11-3R to position 4. If the seizure is successful, the seizing port's Vernier Number and status bits are transmitted from the processor's C-list store 1100C over cable DBR and switch SW11-3R, to lead R-SEND and over cable DBL and switch SW11-3L to lead L-SEND during the remainder of the Port Frame. The coded sequence comprises the C-bits of succeeding time slot words on the R-loop and the L-loop.

After the on-hook port has dispatched its control bit stream, its status is referred to as "Gone". Although "gone", as far as its ability to continue conversation, neither the on-hook port nor the other port (which has not yet gone on-hook) has yet released its time slot. The port in the Gone status no longer marks the C-bit of its assigned time slot on the upstream loop with a one during the Disconnect Frame, DF, but writes in a zero instead thereby indicating that the time slot may be idle. (Because the slot has not yet been released, the C-bits for the ports are marked in the assigned time slot in the normal manner during Assignment Frame operation to prevent premature seizure by some other port.) In addition, the Idle Word is written in the remaining data bit positions. However, the time slot will not be seized by any other port until the required Disconnect Frame operations have been completed. The pattern now being written on the upstream loop by the port in the Gone status is called, for convenience, a Disconnect Word, DW, but it is the same type of signal that is dispatched in the assigned time slot over the downstream loop.

Each time the other port receives a Disconnect Word identified in particular by the state of the C-bit in the assigned time slot, over the loop from the Gone port with which it had been in communication, the Disconnect Word counter is incremented. Once this counter has reached some nominally small limit, e.g., four, it returns a Disconnect Word to the Gone port. This timeout count is provided to prevent false disconnects that would otherwise occur due to the accidental conversion of the C-bit from one to zero. When the Disconnect Word is received at the Gone port, its status is changed to Idle and the time slot is released. This status change of the port is communicated to common control during the next available Port Frame.

CONFERENCE LOGIC

In addition to the so-far discussed communications that can be set up between a single calling and a single called port, conference calls involving more than two ports are also possible. Consider in FIG. 2 a 3-port conference call involving ports 1, 9 and 18, for example. Two of the ports, 1 and 18, may be referred to as "end"-]ports, and the intervening port 9 may be referred to as the "enclosed" port. It is also possible to have four-port or more conference calls. In such cases there would be more enclosed ports but still only two end ports.

Conferencing of digitally encoded speech assumes that each conferee port can receive what each of the other conferee ports is transmitting, notwithstanding the fact that more than one of the conferees may in fact be transmitting at the same time. To permit the "hearing" of what is being said by two simultaneous "talkers", the digitally encoded samples of each talker are advantageously algebraically and linearly added together.

At each enclosed port (or ports), three summations must be performed. Firstly, the outgoing speech sample of the enclosed port must be summed with the incoming sample from all of the ports to the "left" for transmission to all of the ports to the "right". Secondly, outgoing speech sample of the enclosed port must also be separately summed with the incoming sample from all of the ports to the right for transmission to all of the ports to the left. Finally, the incoming speech sample from the ports to the right and left ports must be added together to form the composite signal incoming to the enclosed port. In the illustrative embodiment these summations are advantageously performed in successive time intervals.

Consider first a nonconference sequence of operations. Assume that the port circuit in FIG. 12 will be receiving over the L-loop and transmitting over the R-loop. At any convenient time prior to the assigned R-loop time slot, the contents of coder 1301 are entered into reversing codec register 1301 via its left-hand input and its prior contents are shifted out of its lower right-hand output to decoder 1303. During the assigned time slot on the L-loop, L-ASP, the incoming data word is received over the L-loop and is entered into the L-loop Exchange Register 1103L via position 6 of switch SW11-1L. Subsequently, during a time hereinafter referred to as the Exchange Slot, EXS, the contents of the L-loop Exchange Register 1103L are shifted under control of shift sequence circuit SS into the reversing codec register 1302 via position 1 of switch SW12-5. The prior contents of register 1302 are simultaneously shifted-out and stored in R-loop Exchange Register 1103R via position 4 of switch SW11-1R. The contents of R-loop Exchange Register 1103R thus stored will not, however, be shifted out until the assigned slot pulse, R-ASP, occurs on the R-loop.

Since the port circuit of FIG. 12 is assumed to be an Open side port on its R-loop side, the port should receive an Idle Word over the R-loop during R-ASP. (It should also transmit an Idle Word on the L-loop during L-ASP). The contents of the R-loop Exchange Register 1103R, when shifted out during R-ASP, are applied to the lower input of the R-loop summer R$\Sigma$. The left-hand input to summer R$\Sigma$ is held at "0" because switch SW11-2R is held in position number 1 and so the output of the summer is simply the coded word which was originally supplied by coder 1301. This coded word is forwarded through position 2 of switch SW11-3R to the R-loop circuitry of FIG. 6. Accordingly, the port circuit has simply transmitted its locally provided word over the R-loop and received in its decoder 1303 the word received over the L-loop.

It will now be convenient to assume that the port circuit of FIG. 12 is operating in a conference connection in which it is an enclosed port, such as port 9 in the above example. Operations proceed in a manner similar to that just described except that the port receives an opcode from central control during the Control Frame informing it that it must receive incoming signals over the R-loop from the left, sum then with its locally coded signal and then transmit the sum onward over the R-loop to the right. Signals from the right on the L-loop are similarly received and scanned to be sent onward to the left. During AF3 of the Assignment Frame, an enclosed but not yet assigned port checks the C-bit of each passing time slot. Since only the one Open-side port on each loop which found the Assignment Word during AF0 or AF1 is permitted to write a C-bit in AF3, the appearance of that bit at an enclosed port identifies the assigned time slot. The time slot so marked is seized by resetting the assigned slot counters 1101 during initial setup of the conference connection.

During the assigned time slot on the R-loop, switch SW11-2R will be in position 2 so that the left-hand input to the summer R$\Sigma$ will be the data word incoming over the R-loop rather than zero. The incoming data word also enters R-loop exchange register 1103R via position 6 of switch SW11-1R. The previous contents of 1103R, the locally coded word, is applied to the other input of R$\Sigma$, and the sum is dispatched to the right on the R-loop via position 2 switch SW11-3R. The signal incoming from the right over the L-loop is applied to the right-hand input of the L-loop summer L$\Sigma$ via position 2 of switch SW11-2L. The locally coded word, which had priorly been entered in the L-loop exchange register 1103L from reversing codec register 1302 via position 4 of switch SW11-1L is read out and applied to the upper input of L-loop summer L$\Sigma$ as the data word arrives over the L-loop when L-ASP occurs and the arriving data word, via position 6 of switch SW11-1L, replaces the previous contents of 1103L.

In summary, as each of the incoming bits arrives at the enclosed port over the R-loop from the ports to the "left", it is both entered at the input of the R-loop Exchange Register and serially summed in R$\Sigma$ with the locally coded bit expelled from the output of the R-loop exchange register. (This is the first of the three summations.) As each of the bits incoming over the L-loop from ports to the right, it is both entered at the input of the L-loop exchange register and serially summed with the bit expelled from the output of the L-loop exchange register. (This is the second of the three summations).

The R-loop summer R$\Sigma$ is also used at an Enclosed port to perform the third summation by summing the signals received from the left over the R-loop with the signals received from the right over the L-loop to obtain for the port circuit's decoder the sum of all of the other conferee port's contributions. The output of the L-loop exchange register 1103L is switched via position 3 of switch SW11-2R to the left-hand input of the R-loop summer R$\Sigma$ during the exchange interval. The exchange interval may, if desired, be longer than one time slot if the shift rate of reversing codec register 1302 is slower than the system bit rate clock. At the same time as the contents of the L-loop exchange register are being applied to the left-hand input of R$\Sigma$, the contents of the R-loop exchange register are applied to the lower input of R$\Sigma$. The resulting sum is then entered into reversing codec register 1302 via position 2 of switch SW12-5.

Of the three summations, the first two must be performed "on the fly" so as not to interfere with the bit stream progress on each of the buses. However, the third summation may be performed at any convenient time during a frame interval. In the foregoing discussion of conference connections it was assumed that the entire connection had to be set up by assigning an available time slot. Conferences generally evolve from a two way connection. If the port to be Enclosed already falls within the loop span encompassed by the two way call, it is known that the Enclosed port has access to the already assigned time slot. The signaling port requesting addition of the conferee will have sent its assigned time slot as a part of the 255 control bit sequence transmitted during the Port Frame. This slot is therefore known to the CC. If the translated address shows that the port is already enclosed, all that is required is for the CC to send an ENSLOT status command to the port to be added after IDLE status has been verified. The time slot to be used accompanies this status command; so the port circuit processor 1100 simply forces the assigned slot counter on each loop side to the correct position to complete the conference connection.

Adding a conferee when the new port falls outside of the already assigned time slot is somewhat more complex. The most straight forward approach would be to just tear down the existing connection and establish a three way (or more) connection by again end marking the outside ports and the now Enclosed port(s). The only apparent hazard in this method of operation arises if no time slot is available over the expanded span required. In this case, the initial connection should be reestablished for use as required after an audible signal such as fast busy is sent to the port requesting a conference. The previously abandoned time slot will still be available for assignment if the CC does not allow a new connection to be established until it has determined that a conference connection span is available. The method of zero slot C-bit control of AW transmission discussed in an earlier section may be useful for assignment inhibition.

The already assigned time slot could also be held in reserve by the initially connected ports for use in reestablishing a connection if a new slot could not be found. This case actually requires a new slot unless the AW is sent in the reserved slot as well as in the other available time slots. One method of holding the presently assigned slot in reserve requires an op-code which allows the assigned slot counters to continue counting during the assignment search. The transfer down counter method of assignment transfer would be useful with this method of operation. As long as both continue to count without a reset, the assigned time slot will be marked as in use at the Open side and available at the Close side of the initial span. When an AW is detected at the Close side, this shows that a time slot is available over the now required span. Reset or parallel loading of the counters takes place normally, and the reserved slot is automatically abandoned.

EXCHANGE/TRANSFER TIMING

It is to be appreciated that the time of appearance of the assigned time slots on the L-loop and R-loop at a port is dependent on the location of the port. The delay between time slot appearances ranges from a full loop propagation interval, less two bit times, for a port adjacent to the CC to none for a port which is half-way round the loop from the CC. In a non-conference system, the coder functions may conveniently be timed by the Open side loop clock and the assigned slot counter and the decoder could be controlled by the Close side clock and the Assignment Slot Counter. When a port circuit is to be used to handle a conference call, however, the two data words must be referred to just one of the clocks in order to permit conference additions of the third type to be made at the enclosed ports. This referencing to a given clock places some restrictions on the time at which the transfer of data is to take place between the R- and L-loop exchange registers and the reversing codec register 1302. The transfer between the R- and L-loop exchange registers 1103R, 1103L and the reversing codec register 1302 may be allowed to take place in the R-loop zero time slot. Although the R-loop zero time slot is known to be available for transfer at every port, the assigned time slot in the L-loop may be in process of exchanging data with the L-loop during all or part of the R-loop time zero slot. When this occurs, an exchange between the L-loop EXR and the device register must be delayed.

Where the conferencing arrangement shares the R-loop adder, the R-loop and L-loop transfer which shifts the data to be summed through $R\Sigma$ and into register 1302, must also be delayed. This problem is illustrated by the waveform diagrams of FIG. 13. The L-loop assigned time slot can overlap the R-loop zero slot if it arrives early as shown at waveform (d) of FIG. 13. Waveform (h) shows the range of late overlap together with a PRE L-ASP pulse. In either of these overlapping conditions, the transfer is delayed through the use of the circuitry of FIG. 14 so that transfer is accomplished during time slot 1 or time slot 2 of the R-loop. If time slot 1 happens to be the assigned time slot on the R-loop and overlap can occur as illustrated by waveforms (l) through (p) of FIG. 13, the transfer is also delayed to time slot 2 of the R-loop.

Figure 14:
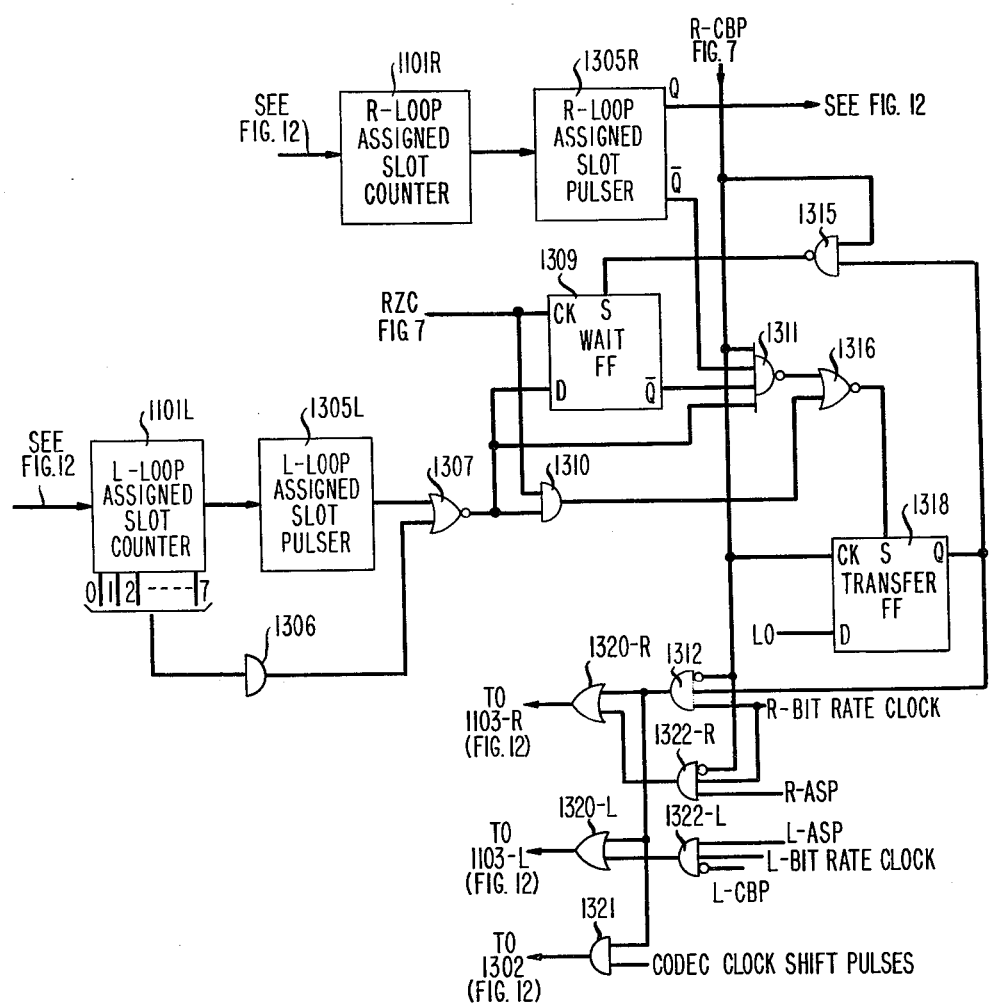
FIG. 14 shows circuitry for overcoming timing problems illustrated in FIG. 12.
Figures 15, 16:
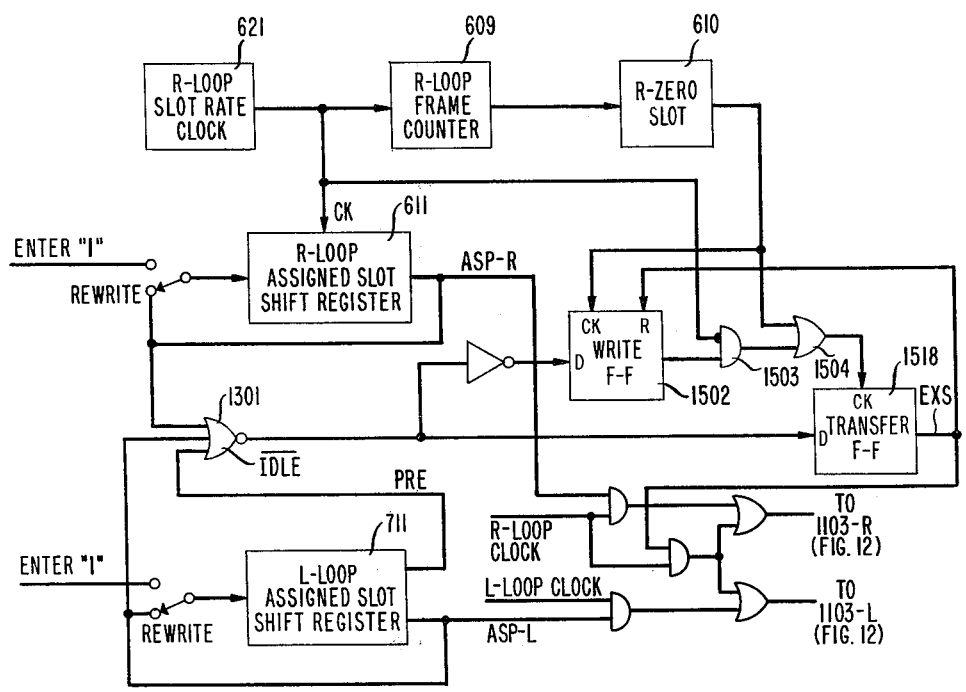
FIG. 15 shows an alternative circuit to that of FIG. 14 which employs assigned slot shift registers which may control the assignment of a plurality of time slots to a port.
FIG. 16 shows how

In FIG. 14 the transfer flip-flop 1318 is normally set by the arrival of the RZC bit. The transfer shift gate 1312 is thus enabled to permit shift pulses to be passed through to the appropriate registers 1302 and 1103-R and 1103-L over OR-gates 1320 and 1321. The other inputs from gates 1322-R and 1322-L time the shifts to and from the respective loops during the assigned time slot.

The L-loop assigned slot pulse $L_j$ and a pulse covering the previous slot (PRE-$L_j$) are NORed together in the overlap range gate 1307. This gate output inhibits the RZC pulse from setting the transfer flip-flop 1318, but allows the RZC pulse to clock the $\overline{Q}$ output of wait flip-flop 1309 high. If time slot 1 is not assigned and $L_j$ is early, the delay timing gate 1311 is enabled to pass an R-CBP pulse thru the set transfer NOR gate 1316 at the start of slot 1. This sets the transfer flip-flop 1318 to allow the transfer to take place during slot 1 as shown at waveform (g) of FIG. 13.

If the $L_j$ pulse is late or slot 1 is assigned, the delay timing gate 1311 is inhibited during R-CBP of slot 1. As a result, the R-CBP pulse at the start of slot 2 will be passed thru the delay timing gate 1311 and set transfer gate 1316 to set the transfer flip-flop 1318. This allows the shift to be delayed to slot 2 as shown at waveform (k) and (p) of FIG. 13.

After the transfer flip-flop 1318 is set, the end wait gate 1315 is enabled. This allows the next R-CBP pulse to be passed thru to force the $\overline{Q}$ output of the wait flip-flop 1309 low. This clock pulse also clocks the transfer flip-flop 1318 to the low state present on its D input thereby limiting the shift to one time slot.

Figure 13:
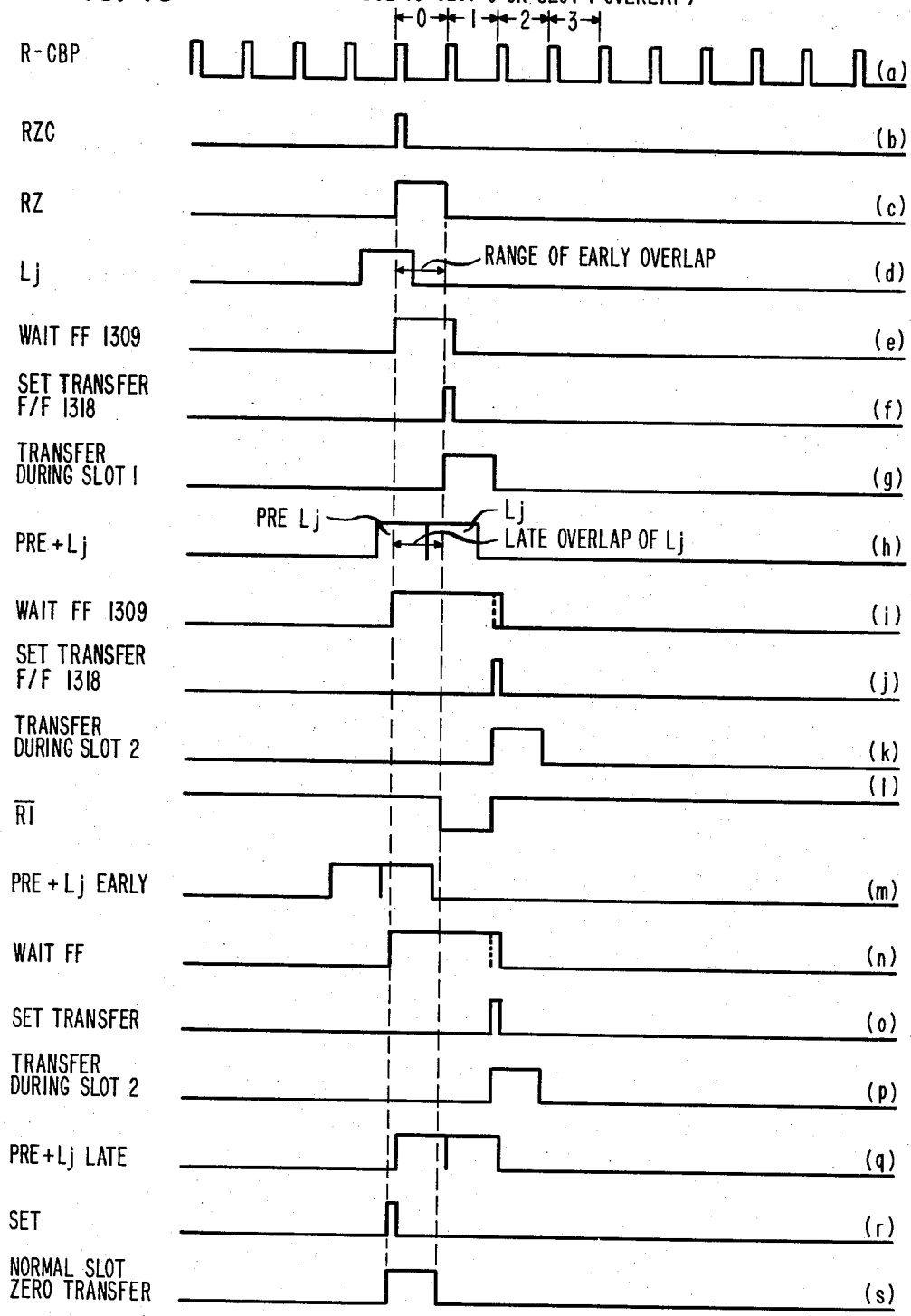
FIG. 13 shows timing waveforms of the port logic circuit pertaining to conference operations.

If the overlap range gate 1307 output does not overlap the leading edge of the R-CBP pulse, as shown at (q) of FIG. 13 the transfer flip-flop 1318 will be set normally to allow the transfer to take place in R-loop time slot zero as shown at (s) of FIG. 13.

If the L-loop assigned time slot $L_j$ overlaps assigned time slot 2 on the R-loop, no problem arises because the assigned L-loop slot would then occur after the R-loop time zero slot and the transfer is made normally during the R-loop zero slot.

In the previous discussion, the exchange and transfer processes have been treated as if they were carried out through the use of shift registers. Obviously, the same objectives can be obtained by writing and reading random access memory locations. Alternatively, MOS technology is advancing to the point where cycle times are becoming sufficiently rapid and are now shorter than the duration of the bit interval which was referred to in the illustrative embodiment.

DETAILED DESCRIPTION OF COMMON CONTROL (FIGS. 16–29) TIMING CIRCUITS

The bit rate clock, TCMV (FIG. 20) provides a square wave at the illustrative bit rate, 34 Mbs. Buffer amplifiers CK1, CK2 and CK3 serve as clock sources for the port circuits as well as Common Control. Using inputs from CK1 and the STRETCH NOR gate, the SKIP AND gate applies a selected train of 34-Mbs clock pulses to the four-stage bit rate counter, BRC (every 17th pulse is inhibited to create the 17th bit-interval). At the end of 16 counts, the positive-going trailing edge of the pulse from the bit rate counter, BRC, clocks the control bit pulser, CBP. (Alternatively, the positive-going edge of the fourth stage output may be used for increased reliability.) The control bit pulser, CBP, is, in effect, a fifth counter stage that is allowed to be high for one bit-interval only. The Q output of the control bit pulser generates a one bit-interval-long pulse after the bit rate counter, BRC, counts to 16. The high output at Q of the control bit pulser, CBP, is applied to the D input of the after C-bit pulser ACP, flip-flop, causing it to generate a one bit-interval pulse following that of the control bit pulser, CBP. Output $\overline{Q}$ of the after C-bit pulser, ACP, flip-flop provides a low-state pulse to reset the control bit pulser, CBP, when the next clock pulse is applied to its CP input after it has set its D input high. Both the control bit pulser, CBP, and after c-bit pulser, ACP, pulses are applied to the STRETCH NOR gate to insure a pulse of sufficient duration to inhibit the SKIP AND gate for the single bit-interval. As a result, the bit rate counter, BRC, remains in the normally all-four-high state for two bit-intervals.

In the illustrative system, with 256 time slots of 17 bits each and a multiplex frame rate of 8000 Hz, the bit-interval is approximately 28.7 nanoseconds and the time slot duration is approximately 488 nanoseconds. It is convenient to divide each 17-bit time slot into four intervals: 5 bits, 4 bits, 4 bits, and 4 bits. This allows separately timed reading and writing of R-loop and L-loop information into and out of various memories and retiming latches since the four intervals provide timing options to cope with logic delays.

Figure 20:
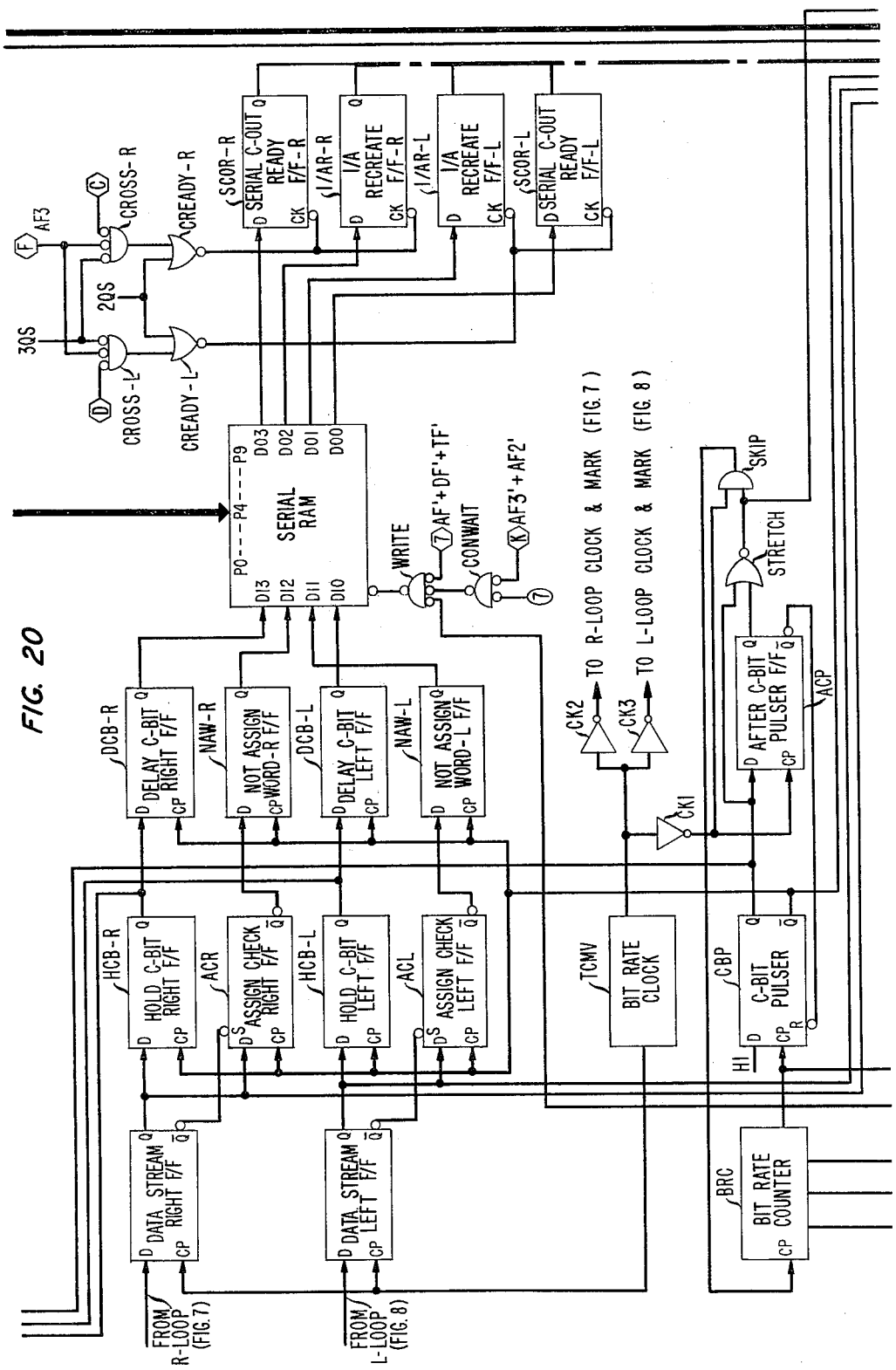

The full quarters and short quarters demultiplexers, FQ and SQ (FIG. 21), receive the two most significant bits of the bit rate counter, BRC, as inputs. The full quarters demultiplexer, FQ, generates, in sequence, four low-output states, having successive durations of 5 bit-intervals, 4 bit-intervals, 4 bit-intervals, and 4 bit-intervals. These four quarter intervals are designated 1Q, 2Q, 3Q, and 4Q. The short quarters demultiplexer, SQ, is similar except that an enabling input restricts the four low output states to the last half of the quarter period. Outputs 2QS and 3QS of SQ are used for timing the READY-R, READY-L, CROSS-R and CROSS-L gates (FIG. 20).

Figure 21:
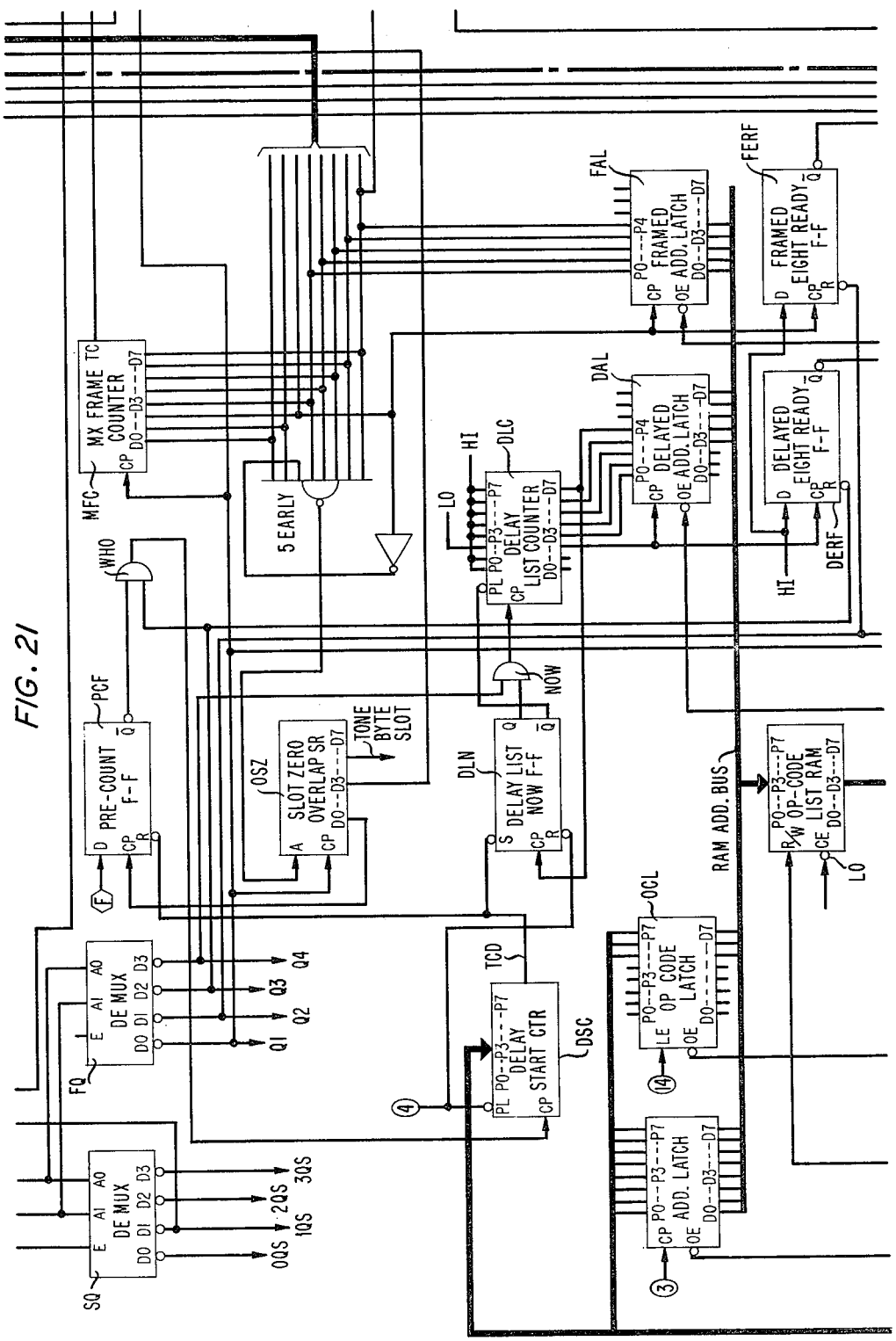
Figure 22:
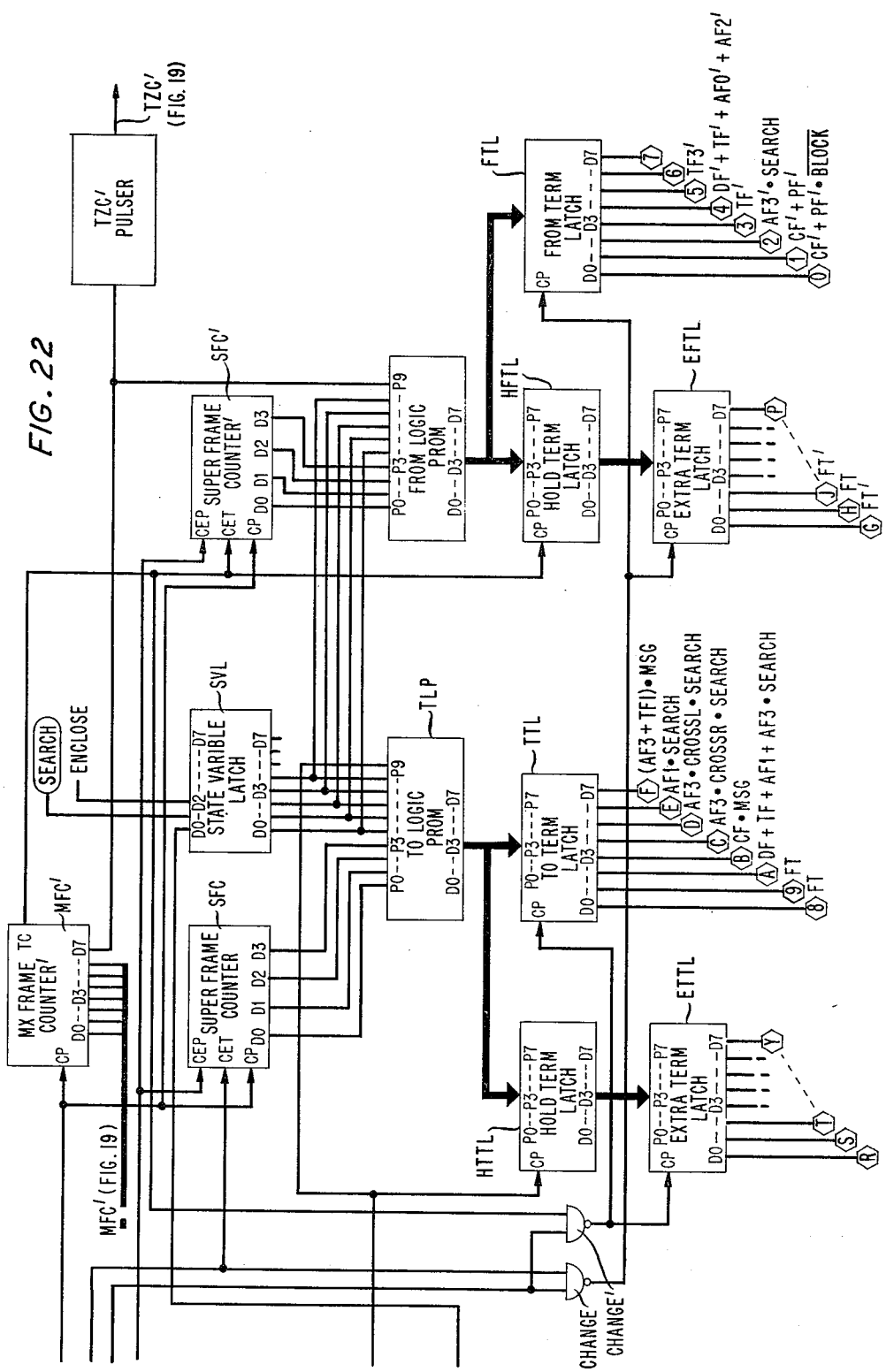

Next of interest are two 8-bit multiplex frame counters, MFC (FIG. 21) and MFC' (FIG. 22). Counter MFC (FIG. 21) is clocked from the 1Q output of the full quarters demultiplexer, FQ, instead of from the most-significant-stage transition of the bit rate counter, BRC, (as is done with counter MFC') to insure that the counter delay and rewriting address operations will be complete prior to the C-bit interval.

The output of the multiplex frame counter, MFC, serves as one of the address generators for the RAMs in which the control bit lists are stored. In this arrangement, both address and data bits are transferred into latches at various locations in FIGS. 17, 19, and 21–23 to minimize the effect of delay variations in the logic circuits and to permit the multiplexing of the latches by means of tri-state gating.

MICROPROCESSOR AND ASSORTED CIRCUITRY

Figure 18:
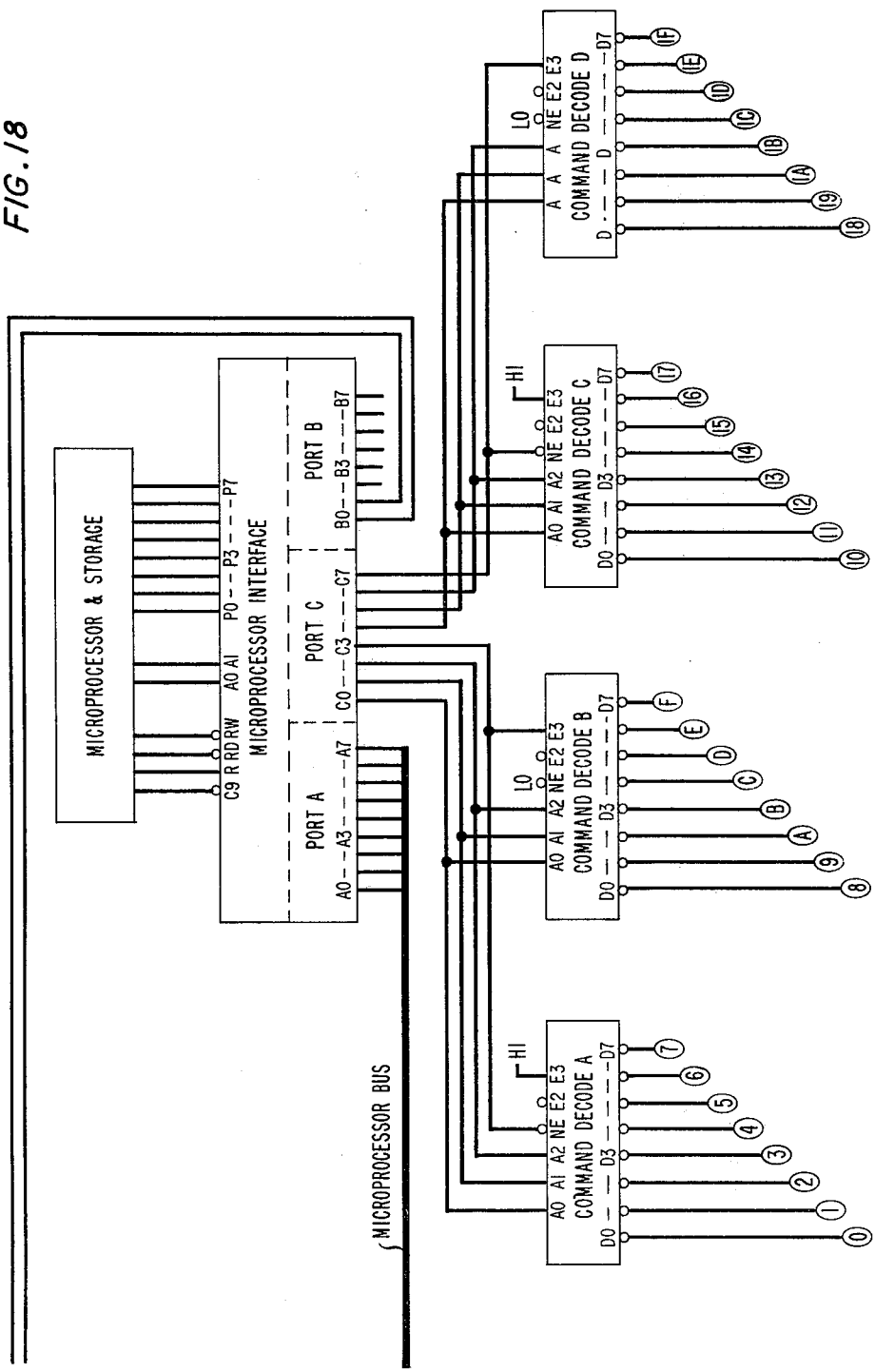

The microprocessor (FIG. 18) bases most of its decisions on information received from the ports during Port Frames as the result of state changes at the ports and on data returned by the ports following communication to an addressed port during a Control Frame. The processor can be programmed to handle various service features or to accept feature commands from another processor (not shown).

An 8-bit parallel-word microprocessor is illustrated, and circuitry is provided, to interface between the parallel-operating processor and the serial stream of C-bits interlaced with the 16-bit data words.

Any of several types of commercially available microprocessors with their associated storage devices and peripheral circuits may be used to control the switching operations. The microprocessor is programmed to control the logic circuits by putting out a combination of 8-bit bytes of addresses and data and 8-bit bytes of commands to be demultiplexed for logic control. A programmable interface, such as the Intel type 8255A, may be used between the microprocessor and the other logic circuits. Logic-state data and addresses that are input to and output from the microprocessor are interfaced by way of the eight Port A leads. Port B is used for interrupts. Port B may also be used as a data interface. Program-controlled command bytes are output via Port C leads. Port C outputs can be split into two four bit-nibbles under processor control. Each nibble can then be decoded.

The primary function of the microprocessor is to respond to the opcodes and status information sent to it as the result of changes of state at the ports. Typically, the changes of state consist of going off-hook or on-hook. Digital switching with the significant digital logic in the port circuit allows dialed numbers to be pre-dialed into a register, or RAM, as part of the list to be sent in the C-bits following the Vernier Number and opcode.

Touch-Tone® decoders (not shown), may be connected to ports associated with incoming telephone trunks (not shown) to convert incoming called telephone numbers to digital signals. These digital signals can then be sent to the port serving the telephone trunk to be used as a "pre-dialed" number. With this pre-dialing feature, the off-hook state change causes all of the information necessary to start processing the call to be sent to Common Control by the port circuit when it is able to seize the Port Frame and code that information into the C-bits. There is, therefore, no need to have a high-speed processor at Common Control to scan all lines for service requests and hang-ups as is done in conventional switching arrangements.

Figure 19:
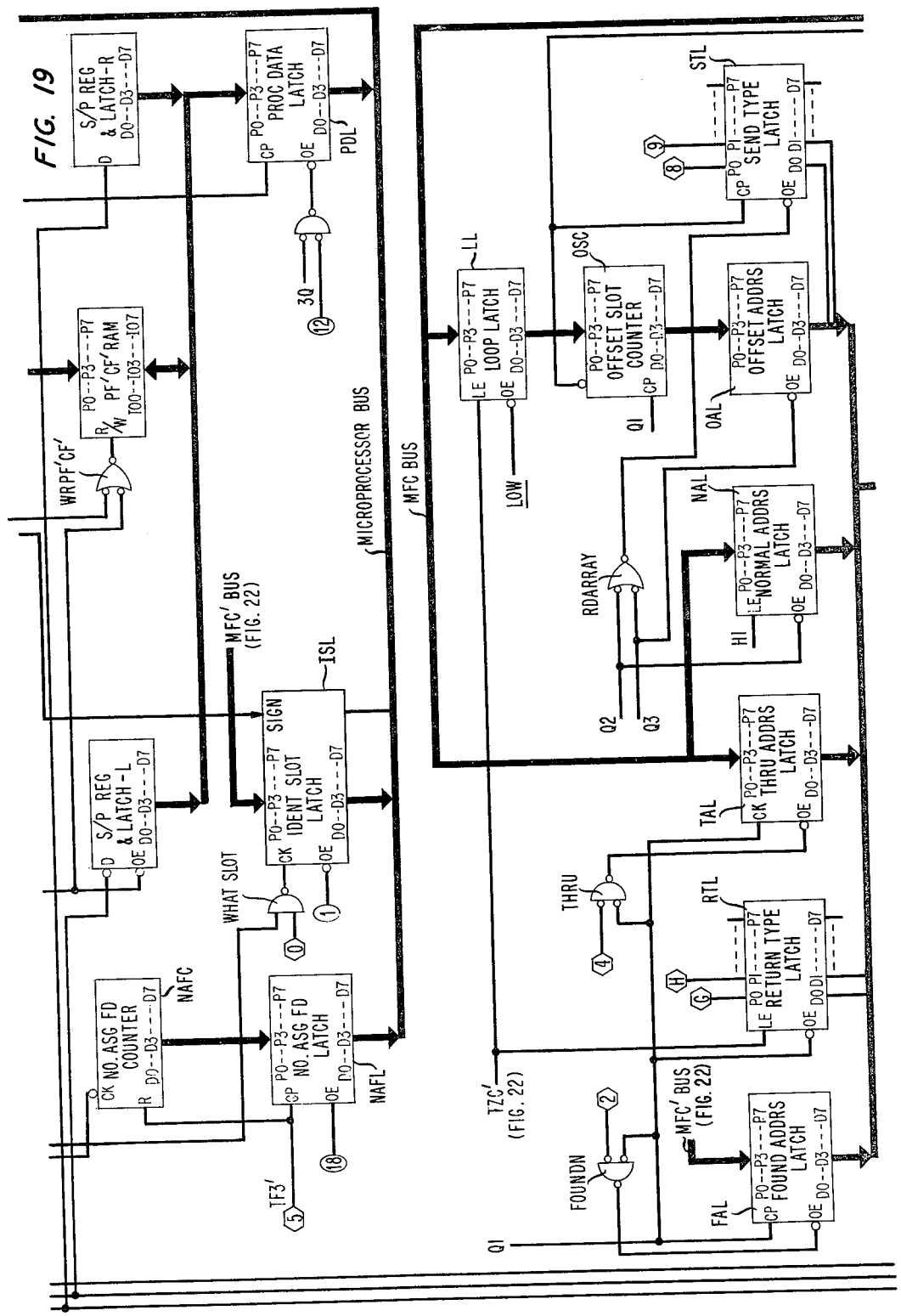

In addition to storage directly associated with the microprocessor, there are three RAMs used for handling the serial C-bits transmitted and received on the loops. C-bits that are just passed across Common Control during the Disconnect Frame, Transfer Frame, and Assignment Frame operations are left in serial form and stored temporarily in the Serial RAM (FIG. 20). Control-bit lists returned during Port Frame and Control Frame operations are converted to 8-bit parallel words and stored in the PF'CF' RAM (FIG. 19). Control-bit lists to be sent during the Control Frame are stored in the Opcode List RAM (FIG. 21). The output of the Opcode List Ram is converted to serial form for transmission.

Once the control-bit list is received and stored in the PF'CF' RAM (FIG. 19), a port interrupt signal notifies the microprocessor (FIG. 18) that some port has signaled a change of state. The processor then interrogates the identity slot latch, ISL, (FIG. 19), to obtain the Arrival Number, either directly or by computation, and reads out the Vernier Number as well as a 3-bit using-device number at the appropriate address in the PF'CF' RAM. This information identifies the interrupting port as well as the device, if multiple devices are used at the port. The next C-bit byte read-out is a status byte, which allows for 256 conditions appropriate to the type of using device.

DELAY DIRECTION CALCULATION

The predominant state requiring action by the microprocessor is a request for a connection to a called number. Upon receipt of this type of status request, the processor reads the dialed directory number stored in the PF'CF' RAM. Then the processor must use its directory translation table to convert the called number to an equipment number consisting of an Arrival Number and a Vernier Number. Using these two numbers and the calling port's pair of these numbers, the microprocessor calculates the loop sides to open on for transmission over the shortest loop scan.

Figure 17:
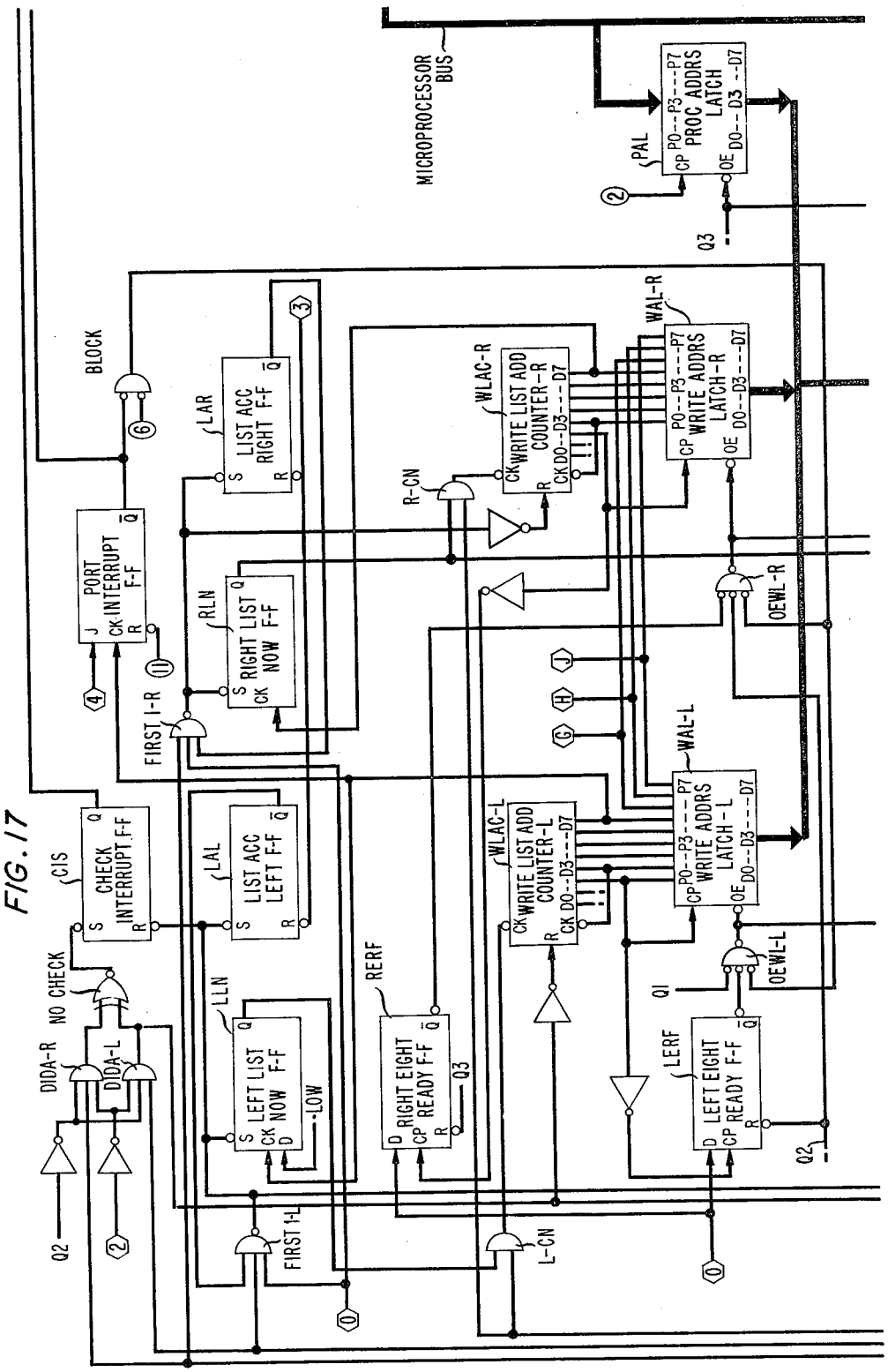
FIGS. 17–23 are to be arranged.

FIG. 17 shows a right list now flip-flop, RLN, and a left list now flip-flop, LLN. The FIRST1-R and FIRST1-L NAND gates set their respective flip-flops when the first one-state appears as a C-bit in the returning Port Frame and Control Frame. The arrival of the first one-state on the left loop causes the state of the multiplex frame counter', MFC' (FIG. 22), to be stored in the identity slot latch, ISL (FIG. 19). The state of the right list now flip-flop, RLN, also is loaded into an additional stage of the identity slot latch, ISL.

If the right list now flip-flop, RLN, has not yet been set, then the first marked C-bit appeared on the L-loop. Therefore, the sign of the Arrival Number is positive. (This is defined here as a zero state as in twos complement arithmetic.) The microprocessor subtracts the identified slot number from the number of slots that make up the total transit time around the loop to obtain the Arrival Number.

The right list now flip-flop will already have been set if the first marked C-bit appeared on the R-loop. This causes the identity slot latch sign bit to be loaded as a one, corresponding to a negative Arrival Number. The microprocessor reads and stores this number after an interrupt.

The Vernier Number is sent as five bits of a byte of the C-list (to represent a system with 17 bits per slot).

Communication from Common Control to the other ports takes place in a Control Frame pair of multiplex frames, which are part of the Super Frame (FIG. 11). These multiplex frames are identified as CF0 and CF1. The port addressing procedure requires that the TZC bit of CF0 be marked on the loop that will arrive at the port AFTER the TZC bit of Port Frame interval, PF0, on the other loop has arrived. For simultaneous arrival, either loop could be marked. However, to indicate a positive Arrival Number, the L-loop TZC is marked.

Marking of the first C-bit during CF0 on the other loop is delayed to that time slot that will appear at the addressed port first AFTER the marked TZC on the other loop has passed the addressed port. The time slot so marked will be the unsigned value of the Arrival Number. The sign is taken care of in the selection of the delay side.

Telephone directories identify ports by Directory Numbers, not by Arrival Numbers and Vernier Numbers. Therefore, it is necessary to provide a translation table to convert from a Directory Number to an equipment number, which in this system is a combination of the Arrival Number and the Vernier Number. This table entry is set up in a RAM or other memory available to Common Control at the time the station set is first installed. Updates take place during moves or other changes.

To address a port using the Arrival Number and Vernier Number, the microprocessor must first determine the loop direction in which the delayed C-list transmission will be sent. Connections between ports are normally set up so that the shortest span between ports is used. This allows the same time slot to be used for one or more other connections in the longer span.

If a connection does not cross Common Control, the closest port to Common Control on the R-loop is end-marked to Open on the R-loop. The other port is end-marked to Open on the L-side. The situation is reversed if the connection crosses Common Control. Then the closest port on the R-loop Opens on the L-side, and the other port Opens on the R-side. Under some heavy traffic conditions, a connection may cross Common Control even if both ports are adjacent to each other. This would occur if no time slot in the preferred closest direction is found during the search operation of the Assignment Frame. Rather than deny service, the program can allow long-span connections to be established.

The problem then becomes one of determining whether the connection crosses Common Control, and which port is closest to Common Control on the R-loop. This can then be translated into the delay direction to be used during Control Frame operations.

Whether the connection crosses Common Control can be determined from the Arrival Numbers. The Vernier Number can be ignored unless the Arrival Numbers are alike. Where the Arrival Numbers are alike, the connection does not cross Common Control, and the Vernier Number values then determine the direction of transmission for each port. The formula for the Arrival Number, AN, can be shown to be:

$$AN = (B - 2P - VN)/S$$

where B is the transit time around the loop in "integral bit-intervals". P is the distance from Common Control to the port via the R-loop, also in integral bit-intervals of transit time; VN is the Vernier Number, which ranges from one to seventeen bit-intervals if two 8-bit data bytes and a C-bit are used in a slot; and S is the number of bits in a time slot (17 is the number used in a system with linear addition for conference calls).

The port position then becomes:

$$P = (B - VN - AN \times S)/2.$$

Let the calling port be PING and the called port be PED. The shortest spans connection will cross Common Control if the absolute value of the difference between PING and PED is greater than half the transit time around the loop, B/2. The Arrival Numbers decrease from the total number of time slots of combined transit time around the loop, B/S, at port one to zero at a port directly opposite Common Control, i.e., at six o'clock. Then the negative numbers increase to $-B/S$ at the last port in the loop. Processor multiplication and division operations are required if the transmission directions are calculated from the port numbers. Only subtractions and comparisons need be used if the calculation is based on the Arrival Number and in some cases, the Vernier Number.

Cross if $|PING - PED > B/2|$ becomes

Cross if $|(B - VNg - ANg \times S)/2 - (B - VNd - ANg \times S)/2)| > B/2.$

Cross if $|(ANd - ANg) + (VNd - VNg)/S| > B/S$

Vernier Numbers are always positive with the largest value = S. The largest value of:

$$(VNd - VNg)/S = (S - 0)/S = 1.$$

This number is negligible except for ports that have the same Arrival Number or are relatively close together. Connections between ports with the same Arrival Number do not cross. The Vernier Number values then dictate the direction of transmission. So even the maximum value of 1 can be ignored. This gives:

Cross if $(VNd - VNg) > B/S$ = Time Slots Around Loop.

For connections that cross Common Control, the conditions are reversed. The port with the highest Arrival Number, normally the one with the positive Arrival Number, will Open on the L-loop. The lowest-numbered port usually has a negative Arrival Number and Opens on the R-loop. This leads to one of four decisions by the microprocessor when setting up the Status Word and the delay direction to be used. These are shown in FIGS. 26 and 27, and are covered in the following discussion of that flowchart.

CONTROL FRAME CALL SETUP—OVERVIEW

Figures 26, 29:
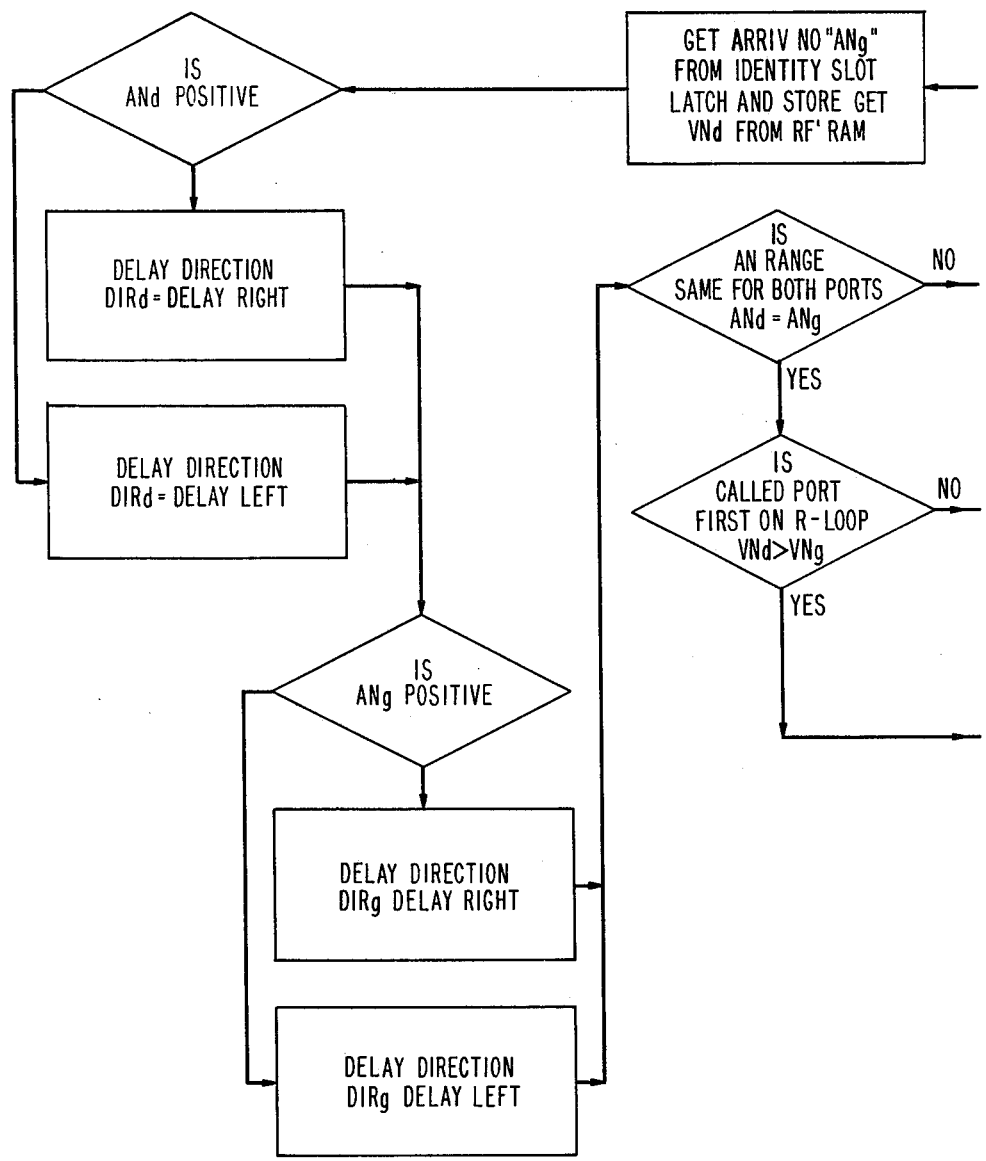
FIGS. 26–28 are a flow chart of common control port operations carried on to access a port on the loop network.
FIG. 29 shows how
Figure 27:
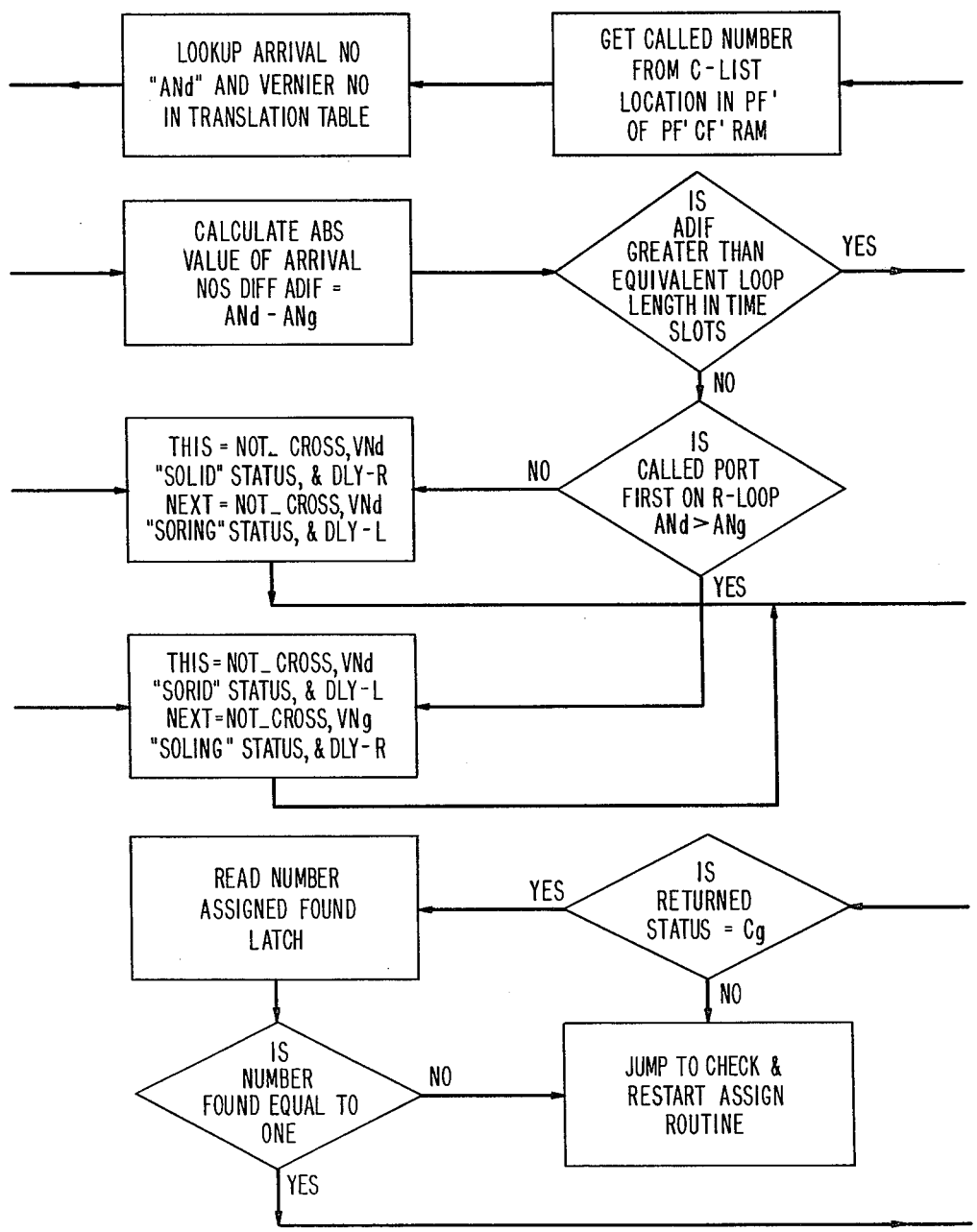

FIGS. 26 and 27 give an overview of the sequence that would be used in coding a particular microprocessor to end-mark the called and calling ports after a Port Frame Interrupt has been received from the calling port. The processor program stores address and other state bits in Port A of the Processor Interface. Information to be stored is first placed in Port B, and then moved to the destination through the Transceiver in a "send" mode. Returned bytes are sent through the Transceiver to Port B where the program reads the information as required. The actual sequence of operations is controlled by the bytes sequentially written into Port C of the Processor Interface. The bytes are coded to generate the required high or low states on one or more selected Command Decoder outputs (represented by the numbered ellipses on FIGS. 17–23).

CONTROL FRAME CALL SET-UP—CROSS CALCULATION

Figure 28:
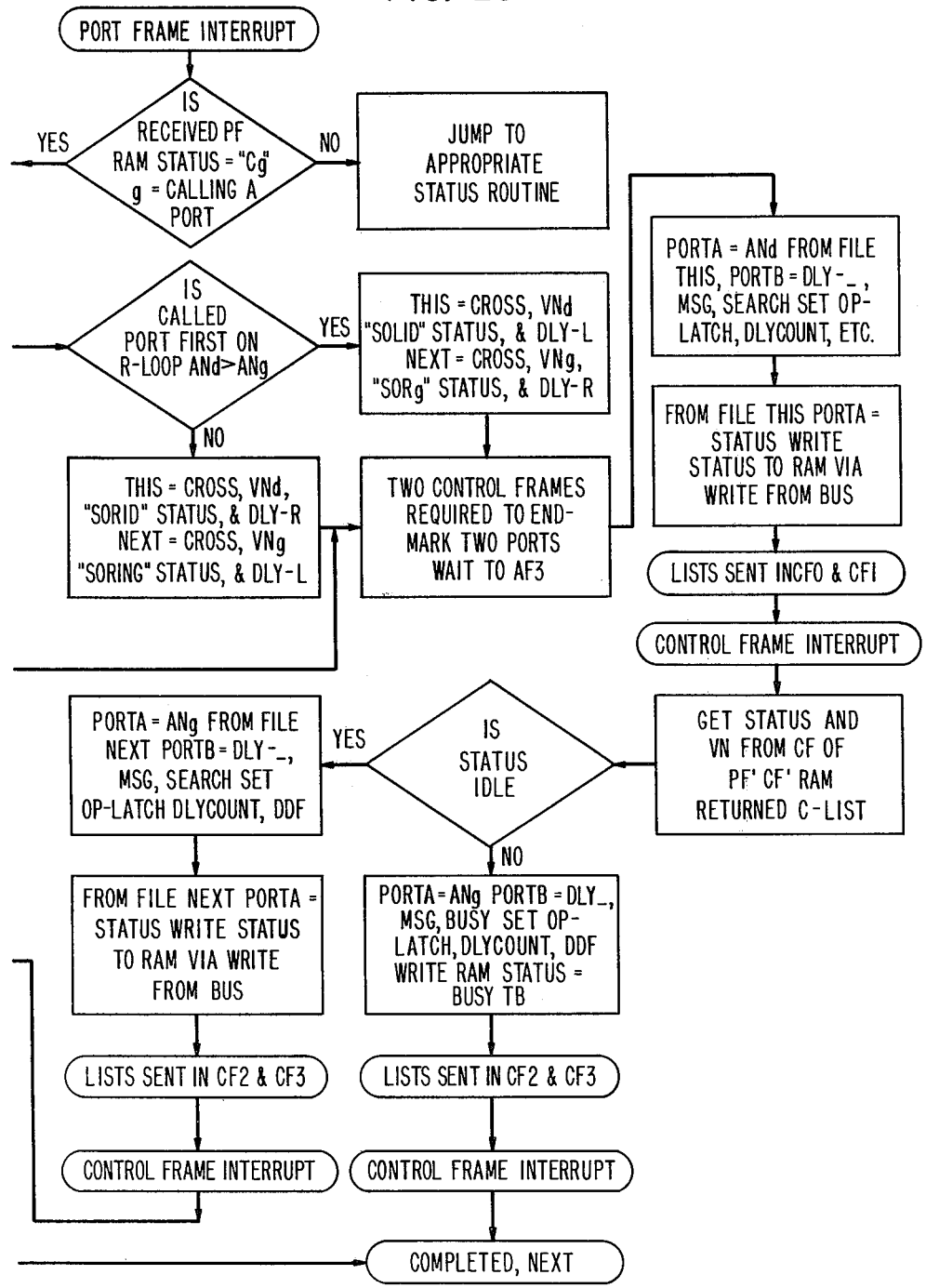

The port interrupt flip-flop PIF is set whenever a marked C-bit list is sent to Common Control by some seizing port with "HEYU" status. The HEYU status generically symbolizes the status of a port requiring access to the Common Control, such as Cg. This causes a Port Frame Interrupt (FIG. 28) to be sent to the microprocessor. At its first opportunity, the processor responds by reading the received Status byte (stored in the PF' array section of the PF'CF'RAM at the specific address stored at that time in processor Port A). The processor then executes that part of its program that is appropriate to the Status byte received. If Status = Cg = Calling port, the operations indicated on FIGS. 26 and 27 apply. The called number is retrieved from the PF'CF'RAM. The directory-to-equipment-number translation is made by looking up the number on a stored table. The result is the Arrival Number and the Vernier Number of the called number, ANd and VNd.

The program also obtains the Arrival and Vernier Numbers of the calling port, ANg and VNg, by interrogating the identity slot latch, ISL, and the Vernier Number byte stored in the PF' array of the PF'CF'RAM. The Arrival Number of the calling port, ANg, must be calculated as B/S − ISL number if the sign is positive. Otherwise, the identity slot latch, ISL, number is the unsigned value of ANg. If both ports fall within the same Arrival Number range, their Arrival Numbers will be alike, and the connection should not (normally) cross Common Control. It takes more time for the L-loop C-bit to reach the lowest-numbered ports in a range than it does to reach the highest-numbered ports. This leads to the lower-numbered ports in the range having higher Vernier Numbers than the higher-numbered ports in that range. The lowest-numbered port should transmit on the R-loop for a non-crossing connection. When two ports have the same Arrival Number, the port with the higher Vernier Number transmits on the R-loop.

Arrival Numbers that are not alike should predominate in typical connection patterns. The absolute value of the difference in Arrival Numbers, ADIF, is then calculated to determine whether the connection will cross Common Control.

A pair of decisions must then be made. If ADIF is not greater than the equivalent loop length in time slots, B/S, the connection will not cross Common Control. As noted earlier, this condition calls for the closest of the two ports on the R-loop to Open on the R-loop. The Arrival Numbers decrease from B/S adjacent to Common Control on the R-loop through zero opposite Common Control, and to $-B/S$ at the last port. As a result, the port with the higher algebraic value of Arrival Number will be first on the R-loop. This port should transmit on the R-loop for connections that do not cross Common Control. Status "SORID", Search Open Right If Idle, is assigned to the called port when VNd is greater than VNg. When VNd is less than VNg, the status condition is called "SOLID", Search Open Left If Idle.

When the called port is in the first half of the R-loop, the delayed C-list should be transmitted from Common Control to that port via the R-loop. This condition is called DLY-R. The states thus determined are stored in the THIS file for use in THIS Common Control-to-port communication. The complementary states are stored in the NEXT file to be used for end-marking the calling port during a second Control Frame. The conditions stored in the bytes of the NEXT file are Not Cross, VNd, DLY-L, and Status "SORING". Three similar sets of data are stored in the THIS and NEXT files corresponding to the decisions made FIGS. 26, 27 and 28.

CONTROL FRAME CALL SETUP—WAIT

All of the 125-microsecond interval of the Transfer Frame, TF1, is available for the foregoing operations. If the status did not require end-marking two ports, whatever information is to be sent could be sent during Control Frames CF2 and CF3. For a search operation, however, it is necessary to have both ports marked before the start of an Assignment Frame. By waiting to send to the called port during CF0 and CF1, the status returned during CF0 and CF1 can be checked to determine whether the port is actually idle. If it is, the calling port can be marked during CF2 and CF3 to complete the dual marking for the search, which follows in the Assignment Frames AF0, AF1, AF2, and AF3. A non-idle called port will not start an assignment operation. The calling port status must be converted to BUSYTB to instruct it to read the BUSY Tone Byte instead. All of the time between CF1 and most of TF1 is available for these program operations.

The resulting Wait following the initial Port Frame Interrupt extends to some point in the AF3 frame, which precedes CF0 of the next Super Frame. Note that the Port Frame is available for seizure by any requesting port so no loss of communication takes place. There is just a delay of a few multiplex frames.

The delay start counter must be set to the delay number indicated by the Arrival Number in time for the first byte to be read out of the Opcode List RAM, and latched into the parallel-to-serial registers by the time the zero time slot of the Control Frame arrives. The first bit will mark the first one on the loop side. Zeroes are sent as C-bits on the delayed side until the proper slot appears. Accordingly, the writes via Port A and Port B of the microprocessor are initiated during the frame preceding a Control Frame.

The conditions used for transmission starting at CF0 are set up by writing them into Ports A and B. ANd from the THIS file is written into Port A. This controls the initial state of the delay start counter, DSC. The byte written into Port B dictates the delay direction depending on whether the DLY-bit is a one or a zero. Another bit causes the have message flip-flop, HMF, to be set, and the remaining bits determine the array selected by the opcode latch, OCL, for both read and write. The Port A and Port B information is then transferred to the respective circuits by the Command Decoder output that results from the byte written into Port C.

Once the opcode latch, OCL, has been set to select the array, the particular byte address is stored in Port A and the Status from the THIS file is stored in Port B. Outputting a command on ellipse 13 (FIGS. 18 and 23) causes the status to be passed through the tristate write from bus latch, WFBL, to the Opcode List RAM where it is stored. The hardware causes the C-list to be sent on both sides at the appropriate time during CF0 and CF1.

The addressed port returns the first marked C-bit and the byte containing the sent Vernier Number. The following C-bits are overwritten with that port's own list, which has its Vernier Number in the first byte. The list including the port's status is stored in the Control Frame array of the PF'CF'RAM (also see FIG. 19). The microprocessor gets the Vernier Number and Status of the called port to verify that the returned Vernier Number matches the Vernier Number sent and to check the status. If the status is other than IDLE, the port will not start an assignment search. The BUSY tone condition is set up for the calling port and sent during CF2 and CF3. Any further action depends on the calling party. A normal hangup will convert the calling party's status to IDLE. Invocation of some special feature will be signaled by a corresponding status change sent in some Port Frame, as dictated by button- or hook-state changes.

CONTROL FRAME CALL SETUP—END-MARKING CALLING PORT

The procedure for marking the calling port is the same as for the called port except the NEXT file contains the appropriate bytes of setup data. The SORING or SOLING status is sent as the significant part of the C-list during CF2 and CF3. Other information useful to that particular port, such as button- and lamp-state changes, can also be sent. Entry of these into the Opcode List RAM takes place in a similar manner to that indicated. Several multiplex frames are available to perform any required write operations.

The addressed port will again overwrite the C-list following the sent Vernier Number byte. The Vernier Number byte that it sent as part of the list can be checked to see if it matches either or both the unchanged Vernier Number and the Vernier Number stored in NEXT. The returned status would still be "Cg" because the new status is not assimilated by the port logic in time to dispatch it instead. (However, it could be arranged to do so.)

The next operation for a normal search is to read the number assigned found latch, NAFL, (FIG. 19). Only one slot is required for the telephone call being set up. If the number found does not match this, an appropriate check and restart routine is invoked. A Check Interrupt could also occur. If no slot is found, the other way around the loop can be tried, or a fast busy tone pickoff can be initiated. The successful search will indicate that the connection requested has been completed. The microprocessor then waits for the next interrupt or continues what it was doing between the few operations required to establish the connection. The Arrival Number determines the 8-bit delay start count and the Vernier Number (and device designation bits, if used) is stored at the appropriate location in the Opcode List RAM (FIG. 21).

The microprocessor then stores the opcode address in the opcode latch, OCL (FIG. 21), which selects that part of the list that designates to the ports whether to search for assignment on the left loop or the right loop. The microprocessor also sets the state of the delay direction flip-flop DDF, (FIG. 23), and sends the 8-bit delay start count to the delay start counter, DSC, (FIG. 21), and outputs the commands that latch those bits. The C-bit list is automatically dispatched during CF0 and CF1.

The procedure is repeated for the other end-marked port and dispatched during CF2 and CF3. The microprocessor can then forget about the call except to verify that a slot was assigned by interrogating the number assigned found latch, NAFL, (FIG. 19).

CONTROL FRAME CALL SETUP—ADDITIONAL FEATURES

Disconnects are of interest to the microprocessor only if some call feature such as "Call Waiting Answer," which requires initiating another connection upon hang-up, is used. Such features can be implemented by changing the port status code under processor control to a status indicating this condition. Then, when the HEYU status change due to hang-up occurs, the new status will be returned to the microprocessor by the port. Thus, the memory required is internal to the port's C-bit-list memory.

It should be noted that the microprocessor can also include the directory number of the call-waiting port in the C-list it sends to the port. Thus, hang-up or recall button operation will initiate a new connection using this number in a manner as simple as an originating connection.

Two hundred fifty-six serial C-bits convert to 32 8-bit parallel words; so only the most significant five bits of the multiplex frame counter, MFC, and Delay List Counter, DLC, are required for addressing the OP-CODE LIST RAM (FIG. 21). These five bits are latched into the framed address latch, FAL, and delayed address latch, DAL, respectively.

The remaining three bits of the memory address for the Opcode List Ram are generated by microprocessor routines and stored in the opcode latch, OCL. A three-bit opcode address byte provides eight different general opcode arrays. Additional opcode addresses and corresponding memory space (either random-access or read-only) can be used to meet the requirements of the specific switching service. Specific status bytes can be written into the RAM at the appropriate general opcode array to permit many variations.

Figure 23:
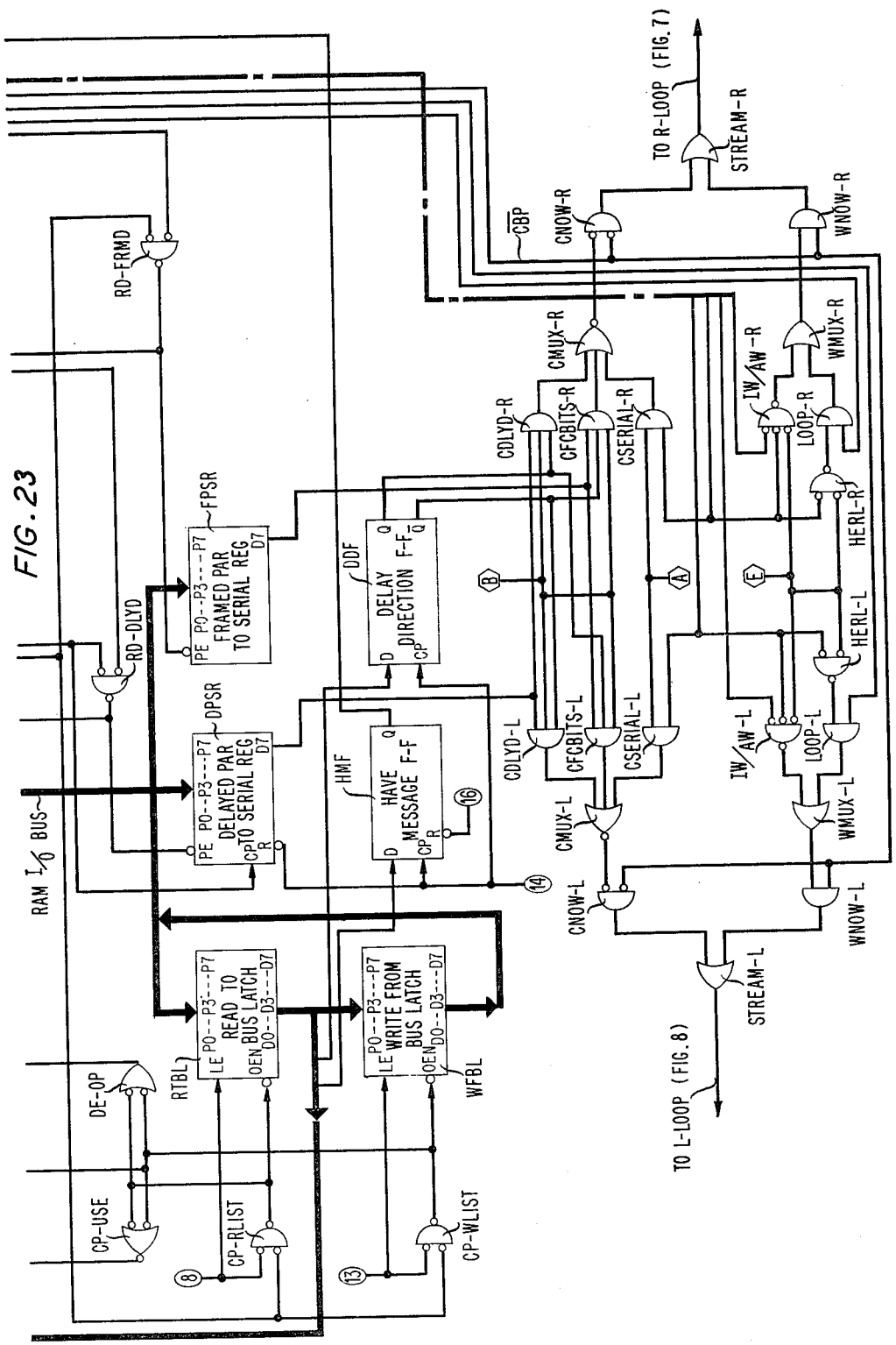
Figure 24:
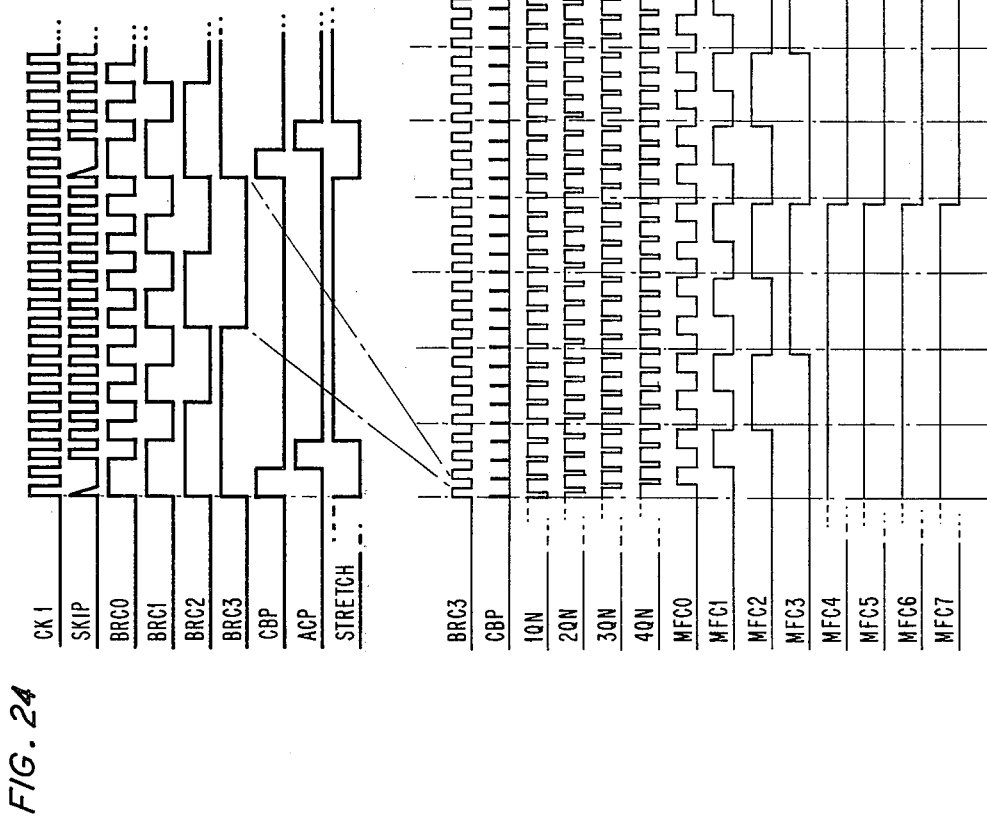
FIGS. 24 and 25 show timing waveform applicable to the common control of FIGS. 17–23.

During a Control Frame, the same opcode list is to be transmitted in each loop direction to the addressed port. As noted before, the address is determined by the difference in time of transmission of the list, i.e., the Arrival Number, and by the inclusion in that list of the Vernier Number. Common Control selects the loop over which the list will start at the zero time slot of the first Control Frame pair (CF0, CF1 or CF2, CF3) (see FIG. 11). At the next convenient interval, microprocessor action latches the Control Data Word on its I/O bus to become an 8-bit input to the write from bus latch, WFBL, (FIG. 23) for that part of the list. This is followed by the microprocessor Command Word, causing the Command Decoder, (FIG. 18) to apply a negative enabling pulse on ellipse lead 13 of the CP-WLIST gate (FIG. 23). This pulse causes the 8-bit word to be be transferred into the write from bus latch, WFBL, so that the output can be multiplexed onto the opcode list RAM I/O bus at a time determined by the CP-WLIST gate. A pulse is generated at the output of this gate during the third quarter period of the time slot that is reserved for microprocessor access to the RAM.

The same pulse also changes the normal Read level of the RAM R/W input signal to Write level, thus entering the control code bits into the RAM at the previously established address. The processor has five to seven multiplex frames of 125 microseconds each between Control Frame operations. This is sufficient to make extensive changes in the C-bit list if they are required for such things as sending a set of button- and lamp-state data in addition to the control commands.

DELAY LIST TIMING

Figure 25:
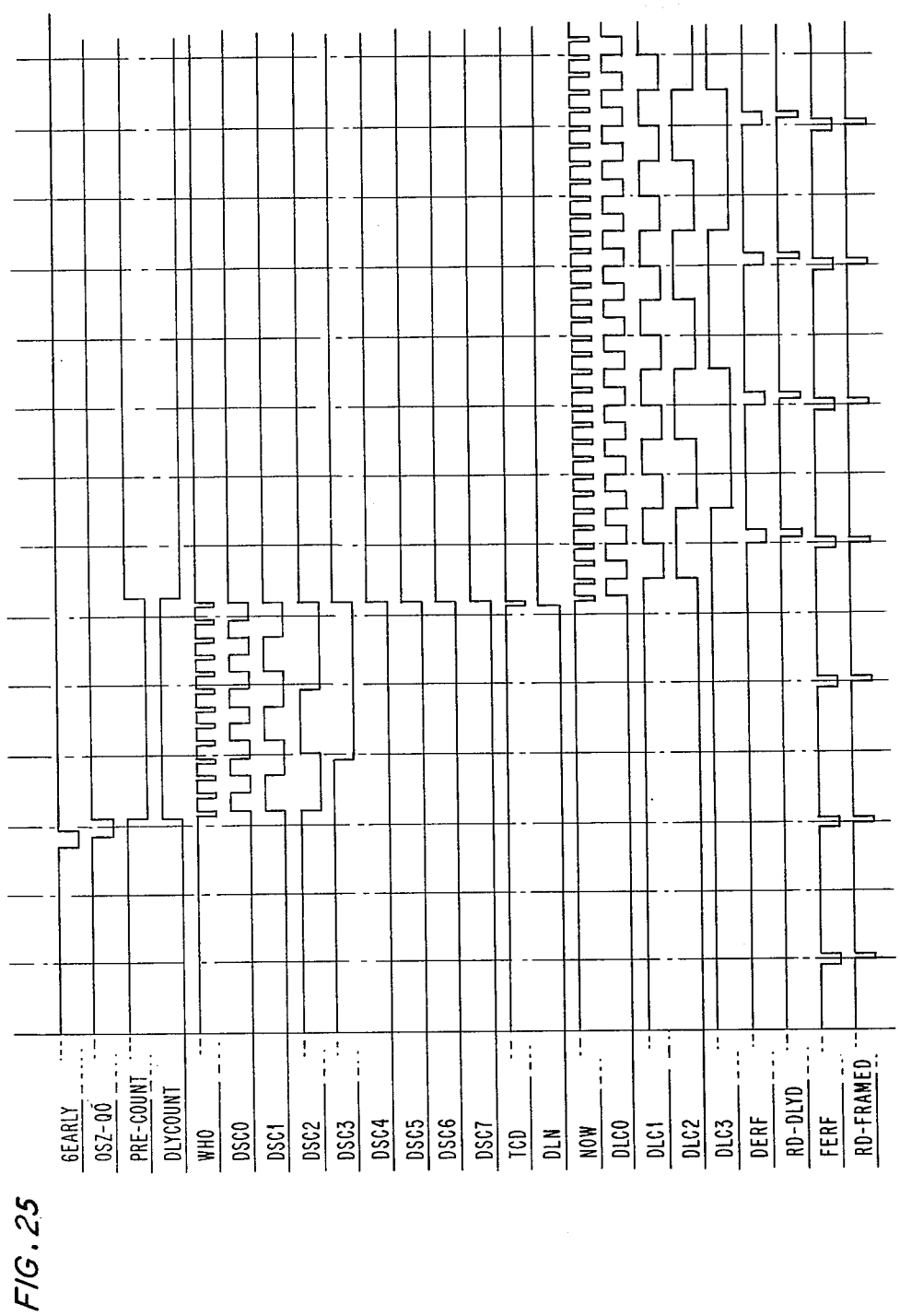

The microprocessor also must arrange to set up the time that the delayed C-bit list is to be sent on one loop, and the loop direction to be used. This is accomplished by parallel setting of the Arrival Number in the delay start counter, DSC, (FIG. 21) in a manner similar to that used to store an address in the processor address latch, PAL, (FIG. 17). Ellipse lead 4 is pulsed. The delay start counter, DSC, should be a downcounter if the Arrival Number is stored. (The complement must be used if it is an upcounter.) After the delay start counter is allowed to count time slots (also see timing diagram FIG. 25), the terminal countdown, TDC, will set the delay list now flip-flop, DLN, (FIG. 21) which, in turn, enables the NOW AND gate to apply time-slot-rate clock pulses to the delay list counter, DLC. This counter supplies the addresses to be used for selection of the 8-bit bytes of control code to be sent on the selected delay direction loop.

TIMING PARALLEL READ-OUT

Because 8-bit parallel control bytes are to be converted to a serial stream of C-bits, with one C-bit per time slot, only the five most significant stage outputs of the delay list counter, DLC, (FIG. 21) are used as addresses. (The opcode latch, OCL, supplies the remainder of each address.) The counts of eight taking place in the first three bits of the delay list counter are used to time the read and address changes (also see FIG. 25).

The positive-going transition of the output on D2 of the delay list counter clocks the delayed eight ready flip-flop (FIG. 21), to the high state, which is wired as a D input to that flip-flop. This, in turn, generates a low output state at the Q output of the delayed eight ready flip-flop, DERF This negative pulse is an enabling input to the RD-DLYD NAND gate (FIG. 23). Note that in this gate, and at some others, logic elements that are normally used as high-input-active OR and NOR gates are used as low-input-active NAND or AND gates. Similarly, logic elements normally used as high-input-active AND and NAND gates are used as low-input-active NOR and OR gates. This permits clocking, latching, and reset or set operations to be carried out normally by low state pulses as well as by the positive-going trailing edges of low-state pulses, thus eliminating the need for logic inverters.

A low-state pulse is output from the RD-DLYD gate (FIG. 23) during the 2Q pulse from the full quarters demultiplexer, FQ, (FIG. 21). This Second Quarter is reserved for use in reading the delayed C-list byte from the Opcode List RAM.

Reading occurs during 2Q as the RD-DLYD gate pulse enables the output of the delayed address latch, DAL, (FIG. 21). The five bits of the address from the delay list counter are latched into the delayed address latch, DAL, by the same positive-going transition of the output on D2 of the delay list counter, DLC, as was used to clock the delayed eight ready flip-flop, DERF. As a result, a new address is generated for every eight time slots starting at a time slot determined by the microprocessor at the time the Arrival Number was clocked into the delay start counter, DSC.

The delayed address thus multiplexed onto the Address bus of the Opcode List RAM during the Second-Quarter interval selects the desired 8-bit byte of the control bits from the Opcode List RAM. The 8 bits on the output of that RAM are latched into the delayed parallel-to-serial register, DPSR, (FIG. 23), under control of the RD-DLYD NAND gate pulse when it is applied to the parallel enable, PE, input of that shift register. The C-bits are then multiplexed into the outgoing bit stream, as will be described later.

Before leaving the discussion of the multiplexed selection of addresses for the Opcode List RAM, it is instructive to consider a problem that arises in setting the delayed eight ready flip-flop, DERF (FIG. 21), for very small Arrival Numbers. The most significant five bits of the delay list counter, DLC are parallel-loaded to the all-high state under control of the same command that loads the Arrival Number into the delay start counter, DSC. The first 3 bits are switched in by the low-state signal of the parallel enable, PE, lead. If the delayed list is to be started as early as the zero time slot on the L-loop, then the delayed eight ready flip-flop, DERF, must be clocked to a high state prior to TZC, (the control bit in the zero time slot of Port Frame PFO), with enough lead time to permit address multiplexing and allow for the read-out delay of the RAM. By presetting the first 3 bits of the delay list counter to "110", the counter is primed to make the positive-going transition at the first clock pulse. This count state is loaded because the first 8 bits of the C-list are loaded at that address for reasons of convenience in timing the framed eight ready flip-flop, FERF. The all-ones (or all-high) address is thus present at the start of the Control Frame.

For very small Arrival Numbers it is necessary to read out an 8-bit control byte before eight counts into the Control Frame. Therefore, the delayed list counter, DLC, (FIG. 21), must be started early under some conditions so that the delayed eight ready flip-flop, DERF, will be clocked by the D2 output of the delay list counter, DLC, in time to have a byte ready for transmission at the start of the Control Frame. This early start is initiated by the multiplex frame counter, MFC, five time slots early when the states of that counter enable the 5 EARLY NAND gate. The low-output state of this gate then is clocked into the 8-stage slot zero overlap shift register, OSZ (FIG. 21).

The slot zero overlap shift register, OSZ, is clocked continuously by a First-Quarter pulse from the full quarters demultiplexer, FQ. Therefore, a single low-state pulse will propagate through this register with a resulting appearance, in turn, of a low-state pulse at each of outputs D0 through D7 of duration equal to a time slot. These pulses start five slots ahead of time slot zero and continue on through time slot zero to the two slots beyond. There will be a high-signal output at all other times.

These pulses can serve, among other functions, as tone byte selection pulses for slots dedicated to this purpose. They also can be used to set up logic circuits in advance so that such circuits are ready to initiate those control-type changes that take place at the start of a multiplex frame.

The low-active pulse at output of the slot zero overlap shift register, OSZ, clocks the pre-count flip-flop, PCF (FIG. 21), to the high state during the multiplex frame that precedes a Control Frame. This happens because an output from the Programmed Logic Array (FIG. 22) forces a low state at the D input of the flip-flop. The resulting output pulse on the Q lead of pre-count flip-flop, PCF, enables the WHO AND gate (FIG. 21).

The enabled WHO gate passes Third-Quarter pulses, from the full quarters demultiplexer, FQ, to clock the delay start counter, DSC, for as long as the pre-count flip-flop, PCF, remains set. The terminal countdown, TCD, sets the delay list now flip-flop, DLN, which, in turn, enables the NOW gate to pass Fourth Quarter pulses through to clock the delay list counter, DLC. The first clock pulse increments the counter from the parallel-loaded 11011111 state to 00111111. The positive-going transition of the counter's D2 output clocks the delayed eight ready flip-flop, DERF, to initiate reading of the Opcode List RAM. This read happens at one of the eight RAM addresses indicated by the count state of the delay list counter, DLC, latched into the delayed address latch, DAL, to supply RAM address bits A0–A4. This pre-count operation allows an early count-up to 8 to take place in the delay list counter, DLC, for those ports that have an Arrival Number that is lower than a pre-set number. This first read can occur as early as just before RTZC is to be written or at any later time in the frame, as dictated by the initial setting of the delay start counter, DSC. The transition that latches the delay list counter, DLC, count into the delayed address latch, DAL, also sets delayed eight ready flip-flop, DERF, to read out another byte. This operation repeats every eight time slots until the frame of C-bits is read from the Opcode List RAM.

FAL

Framed address latch, FAL (FIG. 21), operation is similar to that of the delayed address latch, DAL, except that the framed eight ready flip-flop, FERF, generates its pulses on the positive transitions of the multiplex frame counter, MFC, stage Q2 output.

The low state appearing at the output of framed eight ready flip-flop, FERF, terminal $\overline{Q}$ enables the RD-FRMD NAND gate. This gate then passes a low-state pulse during the first quarter of a time slot to enable multiplexing the output of the framed address latch, FAL, onto the RAM Address Bus. The low-state pulse also causes the control byte thus read to be entered in parallel into the framed parallel to serial register, FPSR (FIG. 23).

Note that the framed eight ready flip-flop, FERF, pulse is generated every eighth time slot without regard to what Control Frame type exists. Thus the address of the first control byte actually to be used corresponds to the last count prior to the start of a Control Frame. At this time, the five most significant bits of the multiplex frame counter, MFC, are all one. The byte at that address is thus read out and is ready for shifting to the loop bit stream at the start of time slot zero.

Note that the word thus selected has the appropriate initial one- or zero-state to mark RZC or LZC, depending on whether some port is actually to be addressed.

DELAY DIRECTION FLIP-FLOP

Whether RZC or TZC (or both, for a particular block of possible port positions) is marked with the start of the undelayed list depends on the sign of the Arrival Number as described before.

The microprocessor forces the delay direction flip-flop, DDF (FIG. 23), to the desired condition at the same time the opcode latch, OCL (FIG. 21), is set up.

As many as seven of the eight bits that can be accommodated normally by the illustrated processor could be used for 128 possible predefined opcode combinations while still leaving one bit as the D input state of the delay direction flip-flop, DDF. Thus, the delay direction flip-flop, DDF, is clocked to the input state under control of the same pulse that latches the opcode address into the Opcode Latch.

The have message flip-flop, HMF (FIG. 23), is set when a message is to be sent. When the have message flip-flop, HMF, is not set, the returned C-bit list will not be stored in the PF'CF' RAM (FIG. 19), as described later. As a result, the list stored in the RAM during an earlier Control Frame operation is not overwritten in the event that the processor needs more time to act on the C-bit list previously returned. The have message flip-flop, HMF, is controlled in the same manner as the delay direction flip-flop, DDF (FIG. 23).

BIT STREAM MULTIPLEX AT COMMON CONTROL

One arrangement for multiplexing the control bits and data words is indicated by the combination of AND and NOR gates shown in the lower half of FIG. 23. The output of the framed parallel-to-serial shift register, FPSR, is connected to a pair of AND gates labeled CFCBITS-R and CFCBITS-L. One or the other of these two gates will be enabled as dictated by the state of the delay direction flip-flop, DDF.

At the same time, the delay direction flip-flop, DDF, enables the opposite one of the CDLYD-L and CDLYD-R AND gate pair. These have as an input the output of the delayed parallel to serial shift register, DPSR. Thus, the framed list will be passed to one loop and the identical (but delayed in accordance with Arrival Numbers) list will be sent in the opposite loop direction. Zeroes are sent on the delay loop until it is time to actually send the C-bit list. Transmission from these sources is restricted to the Control Frame by the state appearing on lead hex B. The outputs of gates CDLYD-L and CDLYD-R are applied respectively to NOR gates CMUX-L and CMUX-R. Additional inputs to these gates are outputs of the CSERIAL gates, which are used to pass the serial list of C-bits across Common Control for purposes of port-to-port communication. These operations will be described later.

AND gates PORT -L and PORT -R (not shown) allow C-bits from a local using port device to inject C-bits into the bit stream as required during an assigned time slot for some Control Frame types, e.g., the one-state for an assigned upstream port during AF∅ and AF1. The outputs of CMUX-L and CMUX-R occupy a full time slot interval except for logic delays, which depart from ideal logic behavior. These stretched-out bit states are so timed that the control bit pulse, CBP, falls at a time when a clearly established condition is present in spite of delay variations.

The control bit pulse, CBP, then gates the state of the C-bit through the CNOW-R and CNOW-L gates at the same time that it inhibits passage of any data-word-multiplexed bits appearing as one input to the WNOW-L and WNOW-R gates. The outputs of the CNOW and WNOW gates are combined into a serial bit stream in either the STREAM-L or STREAM-R OR gate.

These gates, in turn, drive the loop transmission circuit by way of line drivers or simply pass the bit stream to a trunk port equivalent of a one-stage shift register. Trunk circuits at present are usually brought to the user premises via cable pairs terminating in a cabinet. They may also be a digital multiplex or a fiber optic digital link line.

CONVERSION TO PARALLEL STORAGE OF C-LISTS

Control bits are returned to Common Control by a given port during a Control Frame pair if Common Control has been addressed in that Control Frame pair. Control bits are also sent to Common Control by a seizing port during Port Frame operations.

It is useful to convert the serial stream of C-bits interleaved at the start of each time slot to eight bit parallel words for storage and access by the parallel operating mode switching processor. One logic arrangement to accomplish this is shown principally in FIG. 20, with connections to other elements of Common Control hardware as required for input, timing, etc.

It is desirable to convert the short C-bits picked off the passing data stream to bits that occupy as much of the time slot interval as practicable. This will ease subsequent timing of logic operations as well as to allow the use of slower-speed logic elements, which will reduce power and cost. Accordingly, in this arrangement C-bits are stretched using hold C-bits-R, HCB-R, and hold C-bits-L, HCB-L, flip-flops. The respective bit streams are input at the D leads of these flip-flops. A maximum setup time for state recognition is provided by clocking the state on the D lead into the flip-flop at the trailing edge of the control bit pulse, CBP.

It should be noted that a logic circuit is provided at the point where the loops return to Common Control. This circuit pads out the loop length to one full time slot of net delay. Thus the bit rate counter, BRC, the control bit pulser, CBP, the after C-bit pulser flip-flop, ACP, and the demultiplexer quarter-slot pulses can all be shared by both the send and return logic in the loops.

A separate multiplex frame counter, designated MFC', and super frame counter, designated SFC', are required, however, because the loop length can be any number of time slots. (See FIG. 22.) Note, however, that both loop directions are padded out to the same total delay.

HOLD C-BIT

The C-bit states clocked into the hold C-Bit right, HCB-R, and hold C-Bit-left, HCB-L, flip-flops are also used in the storage operation for the serial stream that will be passed across Common Control at appropriate times. For the serial-to-parallel operation under discussion, the stretched C-bit states are input to the serial/parallel register and latch, S/P Reg-L and S/P Reg-R (FIG. 19) as well as to gates DIDA-R,L and FIRST1-R, L (FIG. 17).

WRITE LIST ADDRESS COUNTERS

Port circuits addressed during a Control Frame operation substitute their own C-bit list for the C-bit list sent by the Common Control starting after passage of the last Vernier Number bit. These new lists are returned to the Common Control to indicate the status of the port as well as any other information the designer wishes about the port devices and its condition.

One of the lists will arrive including the marked time zero C-bit, TZC, and Vernier Number. The other C-bit list is returned as required by the Arrival Number delay and on that loop side dictated by the delay direction flip-flop, DDF (FIG. 23). Since these lists are to be stored in a parallel-word RAM at locations corresponding to the slot number, the counter (FIG. 17) generating the storage addresses for each side can conveniently be framed to the time of arrival of the first C-bit with a state of one in either a Control Frame or a Port Frame of returned multiplex frame.

The Arrival Number is the most significant part of a port's address. During port-to-Common Control communication, the seizing port always changes the zero time slot C-bit on the R-loop from a zero to a one as the start of this process. Therefore, any port will mark the R list in the same slot. The first C-bit to be marked on the L-side depends on the location of the port on the loop. When this marked C-bit appears during a returned Port Frame interval, the pulse passes through the WHAT SLOT gate (FIG. 19) to clock the state of the multiplex frame counter MFC' (FIG. 22), into the identity slot latch, ISL. The state of the right list now flip-flop, RLN, is also latched as the sign bit for the Arrival Number. The number so latched is the Arrival Number of the port. Rather than generate an interrupt command at this time, it is preferable to wait until the entire list of C-bit information sent by the port has been stored. This makes all of the information available to the processor as soon as it starts the Port Interrupt Served routine.

Storage of the C-bit list will be complete when the write list address counter-L, WLAC-L (FIG. 17), completes its count as indicated by the D7 output. This output clocks the left list now flip-flop, LLN, to the low state thus stopping counting by inhibition of the L-CN gate. The D7 output also clocks the port interrupt flip-flop, PIF, low if this is a Port Frame, as indicated by the state of lead hex 4. Processor acknowledgment during the interrupt routine causes the port interrupt flip-flop, PIF, to be reset.

These Control Frame types are indicated by outputs of the logic PROM decoder on lead hex 0 which enables the FIRST1-L and FIRST 1-R NAND gates. When and if the stretched first C-bit on a loop side in these Control Frame types appears, the state is gated through the NAND gate to set the respective left-list now flip-flop, LLN, or right list now RLN, flip-flop, as well as the appropriate list accepted left, LAL, flip-flop or list accepted right, LAR, flip-flop.

Setting the list accepted flip-flop causes a low state to be output from the $\overline{Q}$ lead. This in turn inhibits the associated FIRST1 gate to prevent detection of any subsequent one-states until the list accepted flip-flop is reset via lead hex 3 at the start of the next returned multiplex frame of a different type.

Stretched control bits are shifted into the serial/parallel register and latch (FIG. 19) without regard to whether they are needed or are even intended for Common Control. Eight clock pulses are required to fill the register.

Because of the initial condition of the write list address counters, WLAC, the stage D2 output positive-going transition will have clocked the associated eight ready flip-flop by the time this shift is complete. The same stage D2 output that clocked the eight ready flip-flop also latches the five most significant bits of the write list address counters, WLAC, into the associated write address latches, WAL. Five bits of address for the PF'CF' RAM are generated by the write list address counters, WLAC, and the remaining bits are supplied by the frame type. Thus, for the example-size RAM, 32-word arrays of eight-bit bytes are stored for each of frame types AF0, AF1, AF2, AF3, CF0, CF1, CF2 and CF3. The three bits defining the Frame Type Address are present on leads hex G, hex H, and hex J.

The eight ready flip-flop output pulses repeat at intervals of eight time slots during Control Frame and Port Frame operations. These pulses enable the respective OEWL-L and OEWL-R gates to enable the tri-state output of the write address latches. OEWL-L is pulsed during the First Quarter and OEWL-R during the Second Quarter of a time slot interval. The 2Q pulse also resets the left eight ready flip-flop, LERF, and the 3Q pulse resets the right eight ready flip-flop, RERF. The eight ready flip-flop pulses multiplex the two write addresses onto the address bus of the PF'CF' RAM. Each OEWL pulse also passes through the WR PF'CF' NOR gate to switch the RAM's Read/Write lead to the Write state.

The stored control bytes are read from the PF'CF' RAM under control of the processor program at a processor-generated address, which is stored in the processor address latch, PAL (FIG. 17). The Output Enable pulse for this latch is restricted to the third Quarter of a time slot so that access can be requested by the processor at any time without interfering with Write operations. The bytes so read are stored in the processor data latch, PDL (FIG. 19) to be multiplexed onto the Microprocessor Bus when the processor forces an enabling signal level on Common Control ellipse lead 12.

C-bit lists used for Common Control-to-port and port-to-Common Control communication are thus stored in parallel RAMs for ready interface with the microprocessor and are converted from parallel to serial for transmission, and from serial to parallel for C-bit lists returned over the loop sides.

CROSSING C-LIST STORAGE

As has been described, all of the C-bits on each loop side are held in hold C-bit flip-flops, HCB-R and HCB-L (FIG. 20). Those C-bits involved in port-to-port communication are to be stored in serial form in the Serial RAM for passage across the Common Control in a later multiplex frame serving that control function.

In the self-assignment process, however, it is also necessary to identify Idle Words and Assignment Words in those time slots that have the C-bit marked as a zero indicating that they are not in active use as the Common Control is crossed. It is uneconomical to store the entire word since all words in one multiplex frame would have to be stored.

Instead, single C-bit can be stored, indicating whether the accompanying word was an Assignment Word. If it was, and the C-bit was a zero, a new Assignment Word can be reconstituted following the zero-state C-bit. Otherwise, an Idle Word can be inserted. Of course, the passing word is not modified if the associated C-bit stored is a one, indicating a time slot in use.

It is only during pass-on in the AF1 Control Frame type that the data word is ever reconstituted. The change is to the same type as was received earlier during AF0 and, at least for Idle Words, should also be passing in the frame.

It is desirable to examine the entire data word associated with a zero-state C-bit to determine whether it is an Idle Word or an Assignment Word. This protects against a C-bit appearing as a zero in error, except when by chance the accompanying word also happens to equal an Idle Word or an Assignment Word.

The held C-bits are delayed for one time slot in the delay C-bit-R and delay C-bit-L flip-flops (FIG. 20) to allow time for the identification of the Idle Words and Assignment Words. The appropriate bit pairs are then stored in the four-bit wide serial RAM at linear array locations corresponding to the frame type.

Assignment Word state bits are established by clock and set operation of the assign check right, ACR, and assign check left, ACL, flip-flops (FIG. 20). The trailing edge of the C-bit pulse, which clocks the state of the passing C-bit into the hold C-bit flip-flops also clocks that same state into the associated assign check right, ACR, and assign check left, ACL, flip-flops. Thus, if the C-bit is a one, indicating an unavailable time slot, assign check left and/or assign check right will be set. This, in turn, causes a low state to appear at the Q output of that flip-flop, which is the state that will be stored for reconstitution of the Assignment Word/Idle Word.

An arriving zero-state C-bit will be clocked into the assign check flip-flop to make the normal Q output low, and the used $\overline{Q}$ output high. If the word is an all-zero Assignment Word, the $\overline{Q}$ output will remain high to store a bit indicating a true assignment word. Any one-state appearing in the word will cause a low state to appear at the $\overline{Q}$ output of the data stream flip-flop. This sets the associated assign check flip-flop to indicate that an Assignment Word was not passing. The $\overline{Q}$ output state of the assign check flip-flop at the end of the slot is clocked into the not assignment word flip-flops, NAW-L and NAW-R, at the same time the held C-bit is clocked into the delay C-bit flip-flop.

STORING THE SERIAL C-BITS

The two pairs of bits appearing at the inputs of the Serial RAM during AF0 are stored. It is only necessary to store the serial C-bit stream during the other port-to-port communication frame types. Read and write addresses are multiplexed onto the address bus of the Serial RAM. Except for C-bit information returned during AF2, as will be described later, the control bit information and the reconstituted Assignment Word/Idle Word are passed across in the same numbered time slot as when being originated at Common Control when the returned time slot arrived back at Common Control.

Originating slot numbers are defined as the count of the primary multiplex frame counter, MFC (FIG. 21). Therefore, the eight-bit states of the counter are clocked into the thru address latch, TAL (FIG. 19), at the trailing edge of the first-quarter pulse to establish a new address once per time slot. The Serial RAM, here indicated as capable of storing 1024 bytes of 4 bits in parallel, has two additional address bits stored in the serial return type latch, RTL, or the serial send type latch, STL (FIG. 19), which are also multiplexed onto the 10-bit address bus to select that part of the RAM storage space assigned to a particular Control Frame type. Writing into the array normally occurs at the multiplex frame counter, MFC, count address latched into the thru address latch TAL. This occurs when the first-quarter pulse passes the THRU write gate to enable outputting that address to the address bus. The same first-quarter pulse will be gated through the THRU write gate during a Disconnect Frame type, DF', a returned Transfer Frame type, TF', or a returned AF0' type. AF1' may be allowed to overwrite AF0', if desired, because both frames of C-bits and NOTAW bits should be identical. Lead hex 4 dictates the acceptable intervals.

The Serial RAM Read/Write input is normally switched to Write by a short First Quarter pulse, 1QS, during AF0+DF'+TF' via the WRITE gate. The short First-Quarter pulse allows address setup initiated by First-Quarter to be stabilized before the Write condition is established. Writing is inhibited by the CONWAIT gate during AF2' and AF3', if the C-bit marking the seized time slot is required to establish a conference connection at an Enclosed port. The CONWAIT gate is activated by a decoded command pulse on ellipse lead 7.

When multiplex frame AF2 is used at the port circuit to allow sufficient time to transfer the number of the assigned slot(s) from the Close side to the Open side, the C-bits in AF2 will normally all be zeroes. Once the newly assigned time slot information has been transferred to the Open side of each port, those ports originate a C-bit as a one in their newly assigned time slot during AF3. These C-bits continue on around the loop to the Close-side port and the Common Control. At the Close-side port, the individually marked C-bit should arrive at the now-assigned time slot. This provides a check at both ports that their assignment(s) are in agreement. In addition, the so-marked C-bits should arrive at Common Control simultaneously. If this match does not occur, an interrupt is generated, which can be used to force the marked ports to restart the self-assignment operation.

Because the C-bits of AF2 are not serving any useful purpose, the system designer has the option of allowing the Close-side ports in a search mode to mark the C-bits as they leave on the Close side, thus passing "backward" (long way) around the loop. These singly marked C-bits should also arrive together at the Common Control. If they do not, the processor can initiate remedial action by employing the interrupt during AF2' instead of waiting for AF3'.

In addition, C-bits marked during AF2 may also be stored as an alternate means of adding conferees to established connections. The Common Control can send an opcode to the end-marked ports of an established connection instructing those ports to send a C-bit in their time slot(s) "backwards" (or forwards if the transfer of the slot number assignment across the port is completed prior to the start of AF2) around the loop during AF2. After these are received and stored, they can be sent on around the loop in a "proper time slot" to cause a normal "enclose assignment" at the port(s) to be enclosed during a following AF3. A "proper time slot" depends on whether the connection between end-marked ports crosses Common Control and on which side of the Common Control an enclosed port is with respect to an Open-side port at the end of the connection.

When a connection does not cross the Common Control, both end-marked ports and any enclosed ports all use a time slot with the same defined number. The Open and Close sides are, of course, using the same defined number of assigned slot. However, as noted earlier, a connection that crosses the Common Control seizes a time slot j on its Open side. When the jth time slot crosses Common Control to the Close side, the time slot number is redefined as time slot j+N, where N is the transit time around the loop expressed in numbers of time slots. Thus slot j+N is being used on the Close side and j on the Open side of each end-marked port. A corresponding adjustment must be made in the transfer of time slot assignment numbers for crossing connections.

When an Open-side port in a crossing connection sends its C-bit correctly in a jth time slot, that C-bit should be passed on in the (j+N)th slot as being defined by the multiplex frame counter, MFC. The THRU gate timing is correct for this as it is when storage of the serial C-bits is not used at the Common Control. However, if the stored C-bits of AF2 or AF3 are to be passed on by Common Control to connect an enclosed port (or an end port, if desired) in a crossing connection, the time slot number may need to be offset. The amount of offset required is equal to the number of time slots of delay around the loop, N. Since the Open-side number, j, is less than j+N this count must lead the multiplex frame counter, MFC, by the amount N. The arrangement shows one method of obtaining the proper offset of an address counter.

The eight bits of the multiplex frame counter, MFC, are input to the loop latch, LL (FIG. 19). At the time the zero time slot is returned to Common Control, the TZC' pulse latches the number N into the loop latch, LL. The output of the loop latch, LL, is permanently enabled by the wired low state. At the start of each outgoing multiplex frame, the TZC pulse jam sets the offset slot counter, OSC, to this number. Once so set, the counter should continue to count and return to the same number at each multiplex frame counter, MFC, time slot zero.

If the pulse received in the "backward" direction is sent in the j+Nth newly seized time slot from the Close side, the port to be enclosed should be assigned the same slot for pickoff and transmission on that side if its connection does not cross the Common Control as the Close-side, end-marked port, i.e., slot j+N. Enclosed ports that transmit on one side across Common Control will use the jth slot for pickoff and transmission because this slot will be converted to j+N as it crosses Common Control. One method of obtaining this number translation under control of Common Control is to store the AF2 C-bit as it arrives. The bit is stored at an address dictated by the return multiplex frame counter, MFC'. Then, either the latched offset Address Count or the originating multiplex frame counter, MFC, address can be used to read at its correct time.

Each multiplex frame counter', MFC', count is latched into the found address Latch, FAL (FIG. 19). Then, during AF2', if a search operation in this mode is going on, the FOUNDN gate will be enabled to pass the First-Quarter pulse. This sets up the Write address, which is used as the WRITE gate passes the 1QS pulse, while the 1Q pulse is enabling the tri-state output of the found address latch, FAL, to multiplex that address to the address bus of the Serial RAM. The result of this action is that the C-bits are stored at the locations corresponding to the multiplex frame counter', MFC'. In our example, therefore, the C-bit for the received (j+N)th time slot is stored at location j+N. To output this in slot j+N during AF3, a normal Read operation under the control of the multiplex frame counter is used. Thus, when the originating counter reaches j+N, it will read the C-bit to insert it into the outgoing C-bit of slot j+N.

If the marked C-bit is to be placed in slot J during Control Frame type AF3, the address of the offset address latch, OAL (FIG. 19), should be used. This count is N at time slot zero. By the time the outgoing multiplex frame counter, MFC, count has reached the jth count, the offset slot counter, OSC, will have advanced j slots to j+N which is the address location of the stored C-bit. Thus, this bit is read out in sequence with all of the other offset bit states and sent on that loop side that should have the Open side or enclosed position set up at slot j.

A combination of gates and the multiplex timing of the address latch output determine the address source to be used. The normal Read condition, as also the Write, is to use the multiplex frame counter, MFC, count as the address. The thru address latch, TAL, which has the multiplex frame counter, MFC, as its input, could serve for both Read and Write except that it is preferable to read the C-bit (and Idle Word/Assignment Word bit) to be sent next before a Write. This prevents the problem of overwriting a bit from an earlier frame before that bit has been read in the one possible case of having to store and read the same time slot C-bit. To protect against this special case, the multiplex frame counter, MFC, count is also input to the permanently enabled input of the normal address latch, NAL (FIG. 19). The output of the normal address latch, NAL, is enabled during 2Q. The trailing edge of pulse 1Q clocks the multiplex frame counter, MFC, and this same pulse edge also clocks the count (which has not had time to change) into the thru address latch, TAL. This latch, therefore, stores the list address to be used during the Write at the following 1Q while the normal address latch, NAL, has the Now Next Address ready to be multiplexed on to the bus at 2Q. RDARRAY NOR gate passes both 2Q and 3Q pulses to the output enable lead of send type latch, STL, to multiplex those bits that define the array frame type on the address bus. The frame-type bits on leads hex 8 and hex 9 are latched into the send type latch, STL, during time slot zero by a pulse from D3 of slot zero overlap shift register, OSZ (FIG. 21). This pulse also clocks the offset slot counter, (FIG. 19).

During the last half of the second quarter slot 2QS, the CREADY-R and CREADY-L NOR gates (FIG. 20) pass a pulse to the D inputs of the four flip-flops at the right-hand side of FIG. 20. The normally transmitted C-bits are stored along with the bit for recreation of its Idle Word or Assignment Word, when required during AF1.

During the Third Quarter of each time slot, the output of the offset address latch, OAL (FIG. 19), is multiplexed onto the RAM Address Bus by pulse 3Q.

If one or both C-bits to be transmitted are to be offset, the microprocessor causes a low input to be applied to the hex C and/or hex D inputs of the selected CROSS-R or CROSS-L gate, FIG. 20. This allows the following 3QS short pulse to pass thorugh the associated READY gate to again clock the selected serial C-out ready flip-flop (and incidentally the idle/assignment recreate flip-flop) thereby overwriting the state entered during 2QS. The C-bits selected by either the Normal Address or the Offset Address are now ready to be multiplexed onto the passing stream along with the reconstituted Idle/Assignment Word, when appropriate.

IDLE WORD/ASSIGNMENT WORD RECONSTITUTION

The state of the C-bit stored in each serial C-out ready flip-flop, SCOR (FIG. 20) is input to a C-Serial AND gate (FIG. 23), as well as an IW/AW NAND gate. Also input to the latter gates, for the appropriate side, is the bit defining the state of the Idle Word/Assignment Word registered in the Idle/assignment recreate flip-flops. The third input to each is the signal on lead hexE, which allows overwrite of words only during AF1.

If the C-bit state present at the output of serial C-out ready, SCOR, is high, indicating a time slot in use, the IW/AW gate is inhibited and no overwrite will occur.

When the C-bit is a zero, indicating an idle slot with either an Idle Word or an Assignment Word, the state of the idle/assignment State recreate flip-flop is controlling. If it is not an Assignment Word, the state will be low, corresponding to an Idle Word. Since all three inputs to the IW/AW gate are now low, a high output-level appears for this gate. This high level is passed through the WMUX OR gate and is, in turn, gated through the WNOW AND gate, except during the C-bit pulse interval. As a result, the all-ones Idle Word is transferred to the loop as the data word of an idle time slot.

Conversely, when the state of the idle/assignment recreate flip-flop, I/AR, is high, the output of the IW/AW gate will remain low; so only the all-zero state of an Assignment Word could pass through to the outgoing word stream. What actually gets through depends on the HERE NAND gate for that loop side. This gate is also enabled during AF1 by the low state on lead hexE. If the serial C-out ready, SCOR, bit state also input to the NAND gate is also low, indicating that the time slot is not being used to pass data words across Common Control, the HERE gate output will be low, thus inhibiting the LOOP-R and LOOP-L gates. This inhibition prevents the arriving bit-stream word, which is the other input to the LOOP gate, from being passed through to the WMUX OR gate, and thence on to the stream and the first port on the loop. The word will be passed through whenever the serial C-out ready flip-flop, SCOR, state is high, indicating an active time slot because the HERE gate is prevented from inhibiting the LOOP gate.

ASSIGNMENT CHECK

Once Common Control has sent an appropriate opcode to the end-marked ports instructing them as to the Open and Close sides for a search, no further action by Common Control is required. If the connection can not be completed or an error is made, the microprocessor should take some action, such as sending a busytone. For a possible error, the self-assignment operation would be restarted.

As described before, the ports establishing a connection mark an otherwise all-zero C-bits multiplex frame, AF3 (or AF2, in an optional alternative arrangement) with a one in the newly seized time slot on the Open side. Thus, for a one-slot connection, a single bit is sent on the Open side from each end. Because the same slot is seized and the time around the loop is the same, these bits arrive at the Common Control at the same time on each loop side. An enabling level is applied by way of lead hex2 (FIG. 17) to the DIDA-R and DIDA-L AND gates during the return of frame AF3. The respective outputs of the hold C-bit flip-flops provide a second input to these gates with a regating pulse, 2Q, as the third input. When the marked C-bit arrives, the 2Q pulse will be gated through each gate.

These two pulses are applied to the NOCHECK XNOR gate. With normal operation, either both inputs to NOCHECK will be low or, at the newly assigned slot, both will be high. Because the inputs are alike, the output of NOCHECK will remain high. However, if only one marked C-bit appears in a given slot, the input difference will cause a low state to be generated, which sets the check interrupt flip-flop, CIF. This interrupt is detected by the microprocessor using a typical interrupt routine. The appropriate processor subroutine is then invoked to start over and the check interrupt flip-flop, CIF, is reset.

The foregoing operation detects an error of assignment but does not indicate whether an assignment was made or how many slots were found in the case of a multiple-slot assignment. This can be determined by counting the number of marked C-bits returned during AF3 from just one loop side. In the arrangement shown, the DIDA-L gate output pulses serve as a clock for the number assigned found counter, NAFC, (FIG. 19). This count is clocked into the number assigned found latch, NAFL, at the end of AF3', following which time the counter is reset. The processor multiplexes the count, which is usually "1", onto its data I/O bus when it is ready for it by applying an enabling level to the output enable ellipse lead 18 via the Command Decoder.

FRAME TYPE LOGIC DECODING

Installation modification of sequential logic operation in a system is more economically handled by putting some functions into a PROM or ROM or Programmed Logic Array. The change or various options can then be implemented by programming the PROM or redefining the mask of a ROM rather than rewiring the logic circuits on the board.

Some of the logic operations already shown as specific hardware may also be incorporated into the Logic Prom operation.

This method of operation is used to develop the various control voltages for the circuits that are dependent on the particular frame type of control taking place. The originating super frame counter, SFC, and the return super frame counter, SFC', serve as address generators for the to logic PROM TLP, and from logic PROM, FLP, (FIG. 22), respectively. Each counter is incremented at the completion of the multiplex frame count.

Sixteen-frame Super Frames can be counted by a four-bit counter. A fifth stage flip-flop will be used to delineate control operations on the two halves of a data word as an extended frame where chord-law 8-bit words are used for some nonconference voice connections. The four parallel outputs of the super frame counter, SFC, serve as four address bits of to logic PROM. For the particular PROM shown in this arrangement, five additional address bits are stored in the state variable latch, SVL. The final stage of each multiplex frame counter, MFC, serves as an address to select a second or extra term. State variables input to the latch can also include such items as Message Ready, Search, etc.

The logic terms read out of the PROM in response to a specific combination of State Variables and super frame counter, SFC, or super frame counter's, SFC', counts are clocked into latches at the beginning of each multiplex frame.

In the arrangement shown, the eight output terms are individually coded to the desired high or low state, and the latch output is used directly. A second set of terms is provided by the use of a hold term latch.

At the terminal count, TC, pulse of the outgoing multiplex frame counter, MFC, the super frame counter, SFC, is incremented to generate the next super frame counter address. The terminal count, TC, pulse is also passed through the Change NAND (FIG. 22) gate with suitable guard pulse gating (from STRETCH NOR gate, FIG. 20) to protect from transient counter states. The CHANGE' pulse clocks the output states of the to logic PROM, TLP, (to the loop) into the to term latch, TTL. This causes a combination of eight high or low states to be output on the eight hex-number leads. Output of the latch is permanently enabled. These terms then control hardware logic, e.g., hex A enables the CSERIAL gates during DF, TF, AF1, and AF3.

Midway through a multiplex frame, the last-stage transition of multiplex frame counter', MFC, FIG. 21, clocks the output of the To logic PROM, TLP, FIG. 22, into the hold term latch, HTTL, and the level change of D7 then addresses the other half of the PROM array with the individual byte selected dependent on the super frame counter, SFC, count and the state variables. The selected eight terms are then output, ready to be transferred into the to term latch, TTL, at the next terminal count, TC, pulse. A similar address and latch transfer takes place for the from logic PROM, FLP, and its associated latches. As a result, four combinations of eight high or low conditions are made available for control of the hardware logic. In the example arrangement, the five State Variable conditions allow 32 different combinations of the eight high or low conditions for each of the sixteen multiplex frames contained in a Super Frame. Two outputs of one extra term latch, ETL, code the pair of frame type states used as address inputs of the serial send type latch, STL (FIG. 19) and two such outputs coded into the from logic PROM (FIG. 22) serve as the serial return latch, RTL (FIG. 19), input.

CONCLUSION

In the "counter-rotating loop" system which has been described, digital data and control bits are propagated through a string of port repeaters which may loosely be analogized to bit shift registers with read and write capability at each tap. The availability of the entire bit stream on both loops at a port location makes possible the dynamic allocation of as many bits as may be required to supply the necessary bandwidth between different ports. Transmission in opposite directions over the loops allows two-way communication between ports over only that section of the loop network which spans the distance between the ports so that a given time slot can be assigned to several independent (non-overlapping) connections at one time. The counter-rotating loop network thus behaves as if it had more time slots than would be normally available for a given bit rate. As has been described, Port Frame and Control Frame time slot seizure and addressing give highest priority to the first ports on the loop whereas in message packet switching a simple ordered demand priority system has been described in which first priority is given to the ports beyond the one just served. It will be apparent that a similar priority transfer arrangement can also be applied to port addressing. Further and other modifications may be made by those skilled in the art without, however, departing from the spirit and scope of my invention.

APPENDIX

Abbreviations and Mnemonics

MULTIPLEX FRAMES
(See FIG. 10):

APPENDIX-continued

| | |
|---|---|
| SF | The switching control sequence is timed by a four or five basic operation Super Frame, SF. Each of these basic operations, in turn, occupies one or more multiplex frames of 125 microseconds each, some of which may be consecutive. The five basic control frames and their function are: |
| PF0 thru PF2 | During the three multiplex frames of the Port Frame (PF) the ports communicate with the CC. The three contiguous sub-intervals of this frame are designated PF0 PF1 and PF2. The service requesting port able to overwrite RZC during PF1 also overwrites the C-bit of the next arriving time slot on the L-loop. This L-loop C-bit may, however, belong to a time slot in PF0. After overwriting the first C-bit the service-requesting port may overwrite up to 255 suceeding C-bits on each bus to forward its status the called number, etc., to CC. The list of C-bits thus sent on the L-loop side may commence at any time in PF0 or PF1 and will be completed during PF1 or PF2, respectively. |
| AF0 thru AF3 | During the first two multiplex frames of the four multiplex frame Assignment Frame (AF) end-marked ports searching for an available time slot send an Assignment Word on the transmit side when a zero arriving (& passed) C-bit is deleted. The end-marked ports check each passing word arriving on the receive side during AF1 and seize the first slot or slots which have a zero C-bit and an Assignment Word. A mark is returned by the seizing port during AF2 or AF3 to verify the seizure and complete assignment or conference connections. |
| CF0 thru CF3 | During the Control Frame, common control addresses the ports by sending identical sequences of C-bit lists on each of the buses separated in time by the Arrival Number of the addressed port. The addressed port returns an encoded pattern of C-bits on both buses informing CC of its status. Either the L list or the R list will start in time slot zero of CF0, and thus the return of one of the two lists will always start at time slot zero. The other list will start during CF0 or CF1, but one of the lists will be completed sometime during CF1. Accordingly, only CF0 and CF1 need be contiguous. CF2 and CF3 are similar but permit CC to address another port during the same Super Frame. |
| TF0 thru TF3 | Four evenly spaced data packet transfer frames, each is port-to-port frame used to transfer packet switching priority around the loop to the next ready port. |
| DF | The Disconnect Frame (DF) is used for automatic disconnect without intervention by the CC. The CC is notified, however, if required by a service feature. The C-bits for assigned time slots are normally marked as a one at the port Open side. An on-hook port marks the C-bit as a zero until enough of them have been detected at the other end port Close side to cause an acknowledging zero to be returned. Status of the on-hook port is then converted to IDLE. If an Enclosed port goes on-hook first, it simply abandons the slot as soon as the CC has been notified. Where an end port goes on-hook first, the disconnect operation converts the adjacent Enclosed port to an end port. |
| NUMBERS | |
| AN | An Arrival Number is the difference in arrival time at the CC of C-bit pulses injected in both directions at a port with separation of no more than VN. Time is measured in time slot intervals. |
| VN | Vernier Number - the R-loop bit number arriving when the L-Loop C bit arrives. This identifies that one of |

APPENDIX-continued 17 potential port positions which could have same AN.

WORDS

| | |
|---|---|
| AW | Assignment Word combination of idle slot all zero word or any other readily detected combination except idle word. |
| DW | Disconnect Word similar to idle word but sent from transmit (Open) side. |
| IW | Idle slot Word word sent in time slot by end marked port in place of received word preferred word is all ones. |

CONTROL BITS

| | |
|---|---|
| RZC | R-loop Zero time slot C-bit. |
| LZC | L-loop Zero time slot C-bit |
| LjC | The C-bit of the jth time slot on the L-loop. |
| RjC | The C-bit of the jth time slot on the R-loop. |
| LuC | The C-bit of an unassigned time slot on the L-loop. |
| RuC | The C-bit of an unassigned time slot on the R-loop. |
| TjC | The C-bit of assigned time slot j for either loop direction. |
| TuC | The C-bit of unassigned time slot u for either loop direction. |

COUNTERS

| | |
|---|---|
| ASC | Assigned Slot Counter |
| DWC | Disconnect Word Counter to verify disconnect. |
| MFC | Multiplex Frame Counter. |
| SFC | Super Frame Counter. |
| TDC | Transfer Down Counter. |

PULSERS

| | |
|---|---|
| R-CBP | R-loop Control Bit Pulser |
| L-CBP | L-loop Control Bit Pulser |

REGISTERS

| | |
|---|---|
| CSR | The control bit register at port. |
| DWR | Disconnect Word Register of four bits. |
| R-EXR | R-loop EXchange shift Register between loop and port. |
| L-EXR | L-loop EXchange shift Register between loop and port. |
| SAR | Slot Assignment Register |
| WRR | RCR Reversing Code C Register to convert to/from LSB first. |

DIGITAL TIME SLOTS

| | |
|---|---|
| RZ | R-loop time slot zero dedicated to control functions. |
| Lj | L-loop assigned time slot. |
| Rj | R-loop assigned time slot. |

WORDS

| | |
|---|---|
| TjW | 16 bit data word in assigned time slot j at that port. |
| TuW | 16 bit data word in unassigned time slot u at that port. |
| OPEN | (or Upstream) A connection between two or more ports only encompasses that span or arc of a loop which is (normally) the shortest distance between the ports furtherest apart. A port "Opens" a connnection on either the R or L loop if it is the first port to start transmitting on that side during the assigned time slot. |
| Close | (or Downstream) A port "Closes" a connection on either the R or L loop if it is the last port receiving on that side during the assigned time slot. |
| Enclose | A port is "Enclosed" if it is in a conference or broadcast connection, and is between the Open and Close ports using the assigned time slot. In a conference connection, the Enclosed port receives in each loop direction, and adds its bit contribution to the received signal which sum continues onto the next port or ports of the conference assigned to that time slot. The pair of picked off signals are summed separately to obtain the decoder word. |
| { | The open curly bracket symbol, {, is used to replace the word "Open" in some notations. In particular represents an Open and Assigned state. |
| } | The close curly bracket symbol, } is used to replace word "Close" in some notations. In particular it represents a Close and Assigned state. |
| { } | Both curly brackets symbols, { }, are used as a symbol for Enclose in the assigned state. |
| {ZC | This represents the control bit for time slot zero at the Open port side. |
| }RZC | The (arrival of) the control bit for the zero time slot at the Close port on the R-loop side. |
| [ | Symbol for an Open side port in the search mode as yet unassigned. |
| ] | Symbol for a Close side port in the search mode as yet unassigned. |
| [ ] | Symbol for an Enclosed port in the search mode as yet unassigned. |
| Quote | A control word is delimited by a mark of a one bit at its start and end. Continuing in a punctuation mode, this is equivalent to enclosing the control bit sequence within single quotes, ' '. |
| '=1 | The start of a control bit sequence is a one. |
| > | Arrow to the right indicates write for conditions on left of bit or word on right, e.g., TjC>0 indicates write the control bit as a 0 at the jth time slot which is assigned at that port. |
| < | Condition read from loop to port. |

I claim:

1. A loop switching system comprising,
clockwise and counterclockwise transmission loop paths,
common control means for defining recurrent frames of multi-bit time slots on each of said paths, and
a plurality of ports disposed between said transmission paths, each of said ports having means for selectively reading and altering the bits of said time slots on both of said paths, including means for recognizing an idle time slot traversing one of said transmission paths, and means for seizing an idle slot for use on a connection to another of said ports including means controlled by said recognizing means at one said port for first marking busy an identifying bit in said idle time slot on said one of said transmission paths and for thereafter marking the identifying bit of the corresponding time slot on the other of said transmission paths.

2. The invention of claim 1 wherein said means controlled by said recognizing means includes means operative at the side of said port which is upstream on one of said buses when said port is a time slot requesting port for inserting an assignment word in said idle time slot and means operative at the side of said port which is downstream on one of said buses when said port is a time slot requesting port for recognizing the appearance of said assignment word and for thereafter marking said identifying bit busy.

3. The invention of claim 2 wherein each of said ports includes assigned time slot counter means and means controlled by said assigned time slot counter means at a port intermediate said one and said another of said time slot requesting ports for disregarding said assignment word and seizing said time slot identified by said counter means.

4. A loop switching system comprising,
clockwise and counterclockwise transmission loop paths,
common control means for defining recurrent frames of multi-bit time slots on each of said paths,
each of said time slots having a control bit position and a plurality of data bit positions,
a plurality of ports disposed between said transmission paths, each of said ports having means for selectively reading and altering the bits of said time slots on both of said paths,
said common control means further including means for identifying a control bit position of a first of said time slots on one of said paths, and each of said ports further including means for counting the number of data bit positions intervening on said one of said paths between the arrival of said identified control bit position and the arrival of the control bit position of a time slot on the other of said paths.

5. A loop switching system according to claim 4 wherein each of said ports includes means for registering said number of intervening bit positions and means for encoding said registered number in the control bit position of ensuing time slot words on both said paths.

6. A loop switching system according to claim 5 each of said ports further including means responsive to the service-requesting state of said port for both overwriting said identified control bit position upon its arrival at said port and for marking the control bit position of a subsequently arriving time slot on the other of said paths.

7. A loop switching system according to claim 6 wherein said common control means further includes means for transmitting over said paths an encoded sequence of control bit positions to identify the registered number of one of said ports.

8. A loop switching system comprising clockwise and counterclockwise transmission loop paths,
common control means for defining recurrent frames of multi-bit time slots on each of said paths,
each of said time slots having a control bit position and a plurality of data bit positions,
a plurality of ports disposed between said transmission paths, each of said ports having means for selectively reading and altering the bits of said time slots on said paths,
said common control means further including means for identifying a control bit position of a first of said time slots on one of said paths, and
each of said ports further including means responsive to the service-requesting state of said port for both overwriting said identified control bit position upon its arrival at said port and for marking the control bit position of a subsequently arriving time slot on the other of said paths.

9. A loop switching system according to claim 8 wherein said common control means includes means responsive to the difference in return times of said overwritten and said marked control bits for according said service-requesting one of said ports controlling access to said common control means.

10. A loop communication system comprising a pair of communication loops, a common control and a plurality of port circuits connected to each of said loops,
said common control defining recurrent frames of plural bit time slot pulses traversing said loops in opposite directions;
means for defining a first time slot and a first bit of each time slot in each of said directions as a control time slot and a control bit, respectively; and
means responsive to the service requesting state of a first one of said port circuits for identifying said service requesting port to said common control, said responsive means including means for altering a bit of said control time slot traversing one of said loops and for altering the next traversing control bit on the other of said loops.

11. A loop communication system according to claim 10 wherein said common control includes means for registering the times of arrival at said common control of said altered bit traversing each of said loops.

12. A loop communication system according to claim 10 wherein said responsive means includes:
means for identifying the time slot bit arriving at said service-requesting port circuits on said one of said loops when said next traversing one of said control bit arrives on said other of said loops.

13. A loop communications system according to claim 12 wherein said responsive means includes means for encoding a sequence of subsequently arriving control bits with the number of said time slot bit arriving at said service-requesting port.

14. A variable bandwidth communications network comprising:
a pair of digital transmission lines for carrying digital signals in reciprocal directions,
a plurality of ports disposed along said pair of digital transmission lines, pairs of some of said ports being in a busy state and other pairs of said ports being in a service-requesting state,
means for defining recurrent frames of plural bit time slots for each of said reciprocal directions,
means at each downstream port of each busy pair of said ports using one of said time slots in each of said directions for marking said one of said time slots as idle,
means at each upstream one of each pair of said service-requesting ports for marking said idle time slots as assignable for use on a call to a downstream one of said pair of service-requesting ports, and
means at each downstream one of said pair of service-requesting ports for recognizing the arrival of said assignable time slots, and for seizing at least one of said assignable time slots for use.

15. A variable bandwidth newtork according to claim 14 wherein said means for recognizing includes means for detecting said arrival of said assignable time slots on one of said pair of transmission lines and for marking the corresponding time slot on the other of said pair of transmission lines.

16. In a network having a plurality of ports disposed along a pair of digital transmission line buses over which respective, recurrent frames of plural bit time slots are defined, apparatus for seizing a pair of corresponding by numbered time slots appearing at one of said ports, comprising:
a counter at each of said ports respective to each of said buses,
means for normally incrementing each said counter to count said plural bit time slots of a respective one of said buses and for normally resetting said counter after counting a frame of said plural bit time slots,
means operative incident to the commencement of a search for an assignable time slot for inhibiting the incrementing of each said counter, and
means operative when an assignable time slot has been found on one of said buses for resetting the counter respective to one of said buses and for disabling said inhibiting means from inhibiting said normal incrementing of said counter respective to the other of said buses.

17. In a network according to claim 16, the combination wherein said means operative when said assignable time slot has been found includes means for marking a corresponding time slot bit on each of said buses when said respective counter is reset.

18. A network comprising:
a pair of digital transmission line buses over which respective recurrent frames of plural bit time slot signals are transported,
a plurality of ports disposed along said buses,
control means at each of said ports for employing one of said buses as a receiving side bus and the other of said buses as a transmitting side bus for said time slot signals,
counter means at said ports respective to said transmitting side and said receiving side buses, each of said counters becoming reset after a count equaling a complete frame of said plural bit time slot signals,
means operative at one of said ports incident to the detection of an assignable time slot on said receiving side bus for resetting both said respective counter means and for connecting both said counters to be incremented by said time slot signals appearing on said receiving side bus,
means responsive to the end of one of said recurrent frames appearing on said receiving side bus for stopping one of said counters, and
means responsive to the start of one of said recurrent frames appearing in said transmitting side bus for said stopped one of said counters to be incremented by said time slot signals appearing on said transmitting side bus.

19. A loop switching network comprising
a plurality of ports each adapted to receive, store and transmit digital signals,
first loop means for conveying said digital signals between said ports in a first direction,
second loop means for conveying said digital signals between said ports in a direction opposite to said first direction,
clock means defining a repetitive sequence of time slots respective to said first and second loop means, each of said time slots including a plurality of bit intervals,
means for defining in each of said time slots a control bit position, each of said ports including means for detecting the arrival of said control bit position on each of said loop means, and
means for selectively comparing the contents of said control bit positions arriving over each of said loop means.

20. A loop network according to claim 19 including means for identifying the time slot bit interval obtaining on said first loop means at one of said port circuits when said control bit position arrives on said second loop means at said one of said ports.

21. A loop network according to claim 20 further including means controlled by said comparing means for receiving an encoded sequence of signals in the control bit position of successive ones of said time slots.

22. A loop switching network according to claim 20 wherein each of said ports includes input encoder and output decoder means,
means for separately summing a digital signal arriving over said first loop means with the output of said input encoding means,
means for separately summing said output of said encoding means with said digital signal arriving over said second loop means, and
third means for separately summing said digital signals arriving over first and said second loop means and delivering the result to said output decoder means.

23. A loop network according to claim 22 further comprising
means for activating said first means for separately summing and said second means for separately summing when a corresponding time slot appears at said port on said first and said second loop means.

24. A loop switching network according to claim 20 further comprising
means for assigning to a service requesting pair of said ports an idle time slot occupying a corresponding position in said sequence on said first and said second loop means whereby one of said first and said second loop means whereby one of said pair of ports transmits digital signals to the other of said pair in said time slot over said first loop means and receives digital signals transmitted by said other of said pair in said time slot over said second loop means.

25. A switching network comprising a plurality of port circuits, loop means for transporting digital signals fromm a calling one of said port circuits serially through intermediate ones of said port circuits to a called one of said port circuits, and clock means for defining recurrent sequences of time slots in which said digital signal are carried Characterized in that said loop means includes a transmission path for carrying said signals in opposite directions and wherein said clock means defines correspondingly numbered sequences of time slots exhibiting distinctive relative arrival times for each of said directions at said port circuits.

26. A switching network according to claim 25 wherein said time slots each defines a plurality of bit intervals, further characterized in that said transmission path carrying said signals includes means for separating each of said signals includes means for separating each of said port circuits from its adjacent port circuit in said opposite directions by at least one of said bit intervals.

27. A switching network according to claim 26 further characterized in that one of said port circuits in a common control port, said common control port including means for addressing any of the remaining plurality of said port circuits by marking a predetermined bit position of one of said time slots in one of said directions and a plurality of said predetermined bit positions of a succession of said time slots in the other of said directions.

28. A switching network according to claim 26 further characterized in that each of said port circuits includes means for receiving a marked addressing bit in said predetermined bit position over said transmission path in each of said opposite directions.

29. A switching network according to claim 28 further characterized in that said addressing bit receiving means includes means for storing a plurality of addressing bits arriving in one of said directions until the arrival of said succession of addressing bits from said other of said directions.

30. A switching network according to claim 29, further characterized in that said receiving means includes means for comparing said addressing bits arriving in said one of said directions with said addressing bits arriving in the other of said directions.

31. A loop switching system comprising:
a plurality of ports including a common control port and a pair of buses linking all of said ports and carrying digital signals in opposite directions between different pairs of said ports, means for defining repetitive intervals for assigning said digital signals into time slots, and means for addressing any of said ports according to the difference in propagation times taken by a pair of said digital signals transmitted over said buses.

32. A loop switching system according to claim 31 wherein said means for defining said repetitive intervals includes means for assigning predetermined bit positions of said time slots as data bit positions and a first bit position of each of said time slots as a control bit position and wherein said means for addressing includes means for marking a control bit position of one of said time slots on each of said buses.

33. A loop switching system comprising:
a plurality of ports including a common control port and a pair of buses linking all of said ports and carrying digital signals in opposite directions between different pairs of said ports, means for defining a plurality of different kinds of frames, each consisting of the same number of plural bit time slots, said frames differing from each other solely in the significance attributable to the first bit of each of said time slots, and means for assigning different data words to the remaining bit positions of each of said time slots of any of said frames.

34. A loop switching system according to claim 33 wherein said addressing means includes means for marking a single predetermined bit of one of said time slots of each of said buses.

35. A loop switching system according to claim 34 wherein said addressing means includes means at each of said ports for counting the number of bit intervals intervening between the arrival at said port of said single bit on each of said buses.

36. A loop switching system according to claim 35 wherein said addressing means includes means at each of said ports controlled by said counting means for registering said number of bit intervals and wherein said port further comprises means for encoding said registered number and for transmitting said number to said common control.

37. A port for a loop switching system having clockwise and counterclockwise loop transmission paths, comprising means for identifying time slot sequences on each of said paths, and means controlled by said identifying means for responding to the arrival within a predetermined interval of corresponding sequences on each of said paths.

38. A port circuit according to claim 37 further including means for identifying the appearance of a control bit position in a time slot on each of said paths, and means for responding to the difference in arrival times of said control bit position on each of said paths.

39. A port circuit according to claim 37 further including means for selectively overwriting said identifying control bit positions on said paths.

* * * * *